United States Patent
Kuromizu

(10) Patent No.: US 8,870,400 B2
(45) Date of Patent: Oct. 28, 2014

(54) OPTICAL MEMBER, LIGHTING DEVICE, DISPLAY DEVICE AND TELEVISION RECEIVER, AND METHOD OF MANUFACTURING THE OPTICAL MEMBER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 195 days.

(21) Appl. No.: 13/508,047

(22) PCT Filed: Oct. 21, 2010

(86) PCT No.: PCT/JP2010/068584
§ 371 (c)(1),
(2), (4) Date: May 4, 2012

(87) PCT Pub. No.: WO2011/062024
PCT Pub. Date: May 26, 2011

(65) Prior Publication Data
US 2012/0212676 A1    Aug. 23, 2012

(30) Foreign Application Priority Data
Nov. 20, 2009 (JP) ................. 2009-265350

(51) Int. Cl.
| | |
|---|---|
| F21V 8/00 | (2006.01) |
| G09F 13/04 | (2006.01) |
| F21S 2/00 | (2006.01) |
| G02F 1/1335 | (2006.01) |
| F21V 3/00 | (2006.01) |
| F21V 3/02 | (2006.01) |
| G09F 9/00 | (2006.01) |
| H04N 5/66 | (2006.01) |

(52) U.S. Cl.
CPC ............. *F21S 2/00* (2013.01); *G02F 1/133602* (2013.01); *G02B 6/0088* (2013.01); *F21V 3/00* (2013.01); *F21V 3/02* (2013.01); *G09F 9/00* (2013.01); *H04N 5/66* (2013.01)
USPC ........................... 362/97.1; 362/619; 362/330

(58) Field of Classification Search
CPC .................... G02F 1/133602; G02F 1/133606; G02F 1/133611; G02B 5/0226; G02B 6/0016; G02B 6/004; G02B 6/006; G02B 6/0088; G02B 2006/12083

USPC ............... 362/97.1, 97.2, 97.3, 330, 619, 88; 385/129, 52; 264/2.7, 1.24
See application file for complete search history.

(56) References Cited

U.S. PATENT DOCUMENTS 6,991,358 B2 *   1/2006   Kokogawa ..................... 362/619
7,207,708 B2 *   4/2007   Tanaka et al. .................. 362/619
(Continued)

FOREIGN PATENT DOCUMENTS

CN    101424754 A    5/2009
CN    101435884 A    5/2009
(Continued)

OTHER PUBLICATIONS

Official Communication issued in International Patent Application No. PCT/JP2010/068584, mailed on Feb. 1, 2011.

*Primary Examiner* — Peggy Neils
(74) *Attorney, Agent, or Firm* — Keating & Bennett, LLP

(57) ABSTRACT

An object of the present invention is to configure a lighting device to discriminate the front and back sides of a substrate at low costs. In the lighting device of the present invention, a diffuser plate 30 as an optical member 15 includes: a light-transmissive substrate 32; an optical pattern 33 formed on the substrate 32 and applying an optical action to light; and a discrimination pattern 34 configured to discriminate between a first position (normal position) of the substrate 32 and a second position (non-normal position) of the substrate 32 reversed from the first position, formed on a first plane 30a that is a surface of the substrate 32 on which the optical pattern 33 is formed, and made of the same material as that of the optical pattern 33.

10 Claims, 33 Drawing Sheets

(56) References Cited

U.S. PATENT DOCUMENTS

| | | | |
|---|---|---|---|
| 7,531,776 B2 * | 5/2009 | Koide | 250/205 |
| 7,539,384 B2 * | 5/2009 | Fujii et al. | 385/129 |
| 7,651,241 B2 * | 1/2010 | Lee | 362/223 |
| 8,189,136 B2 * | 5/2012 | You et al. | 349/62 |
| 8,317,384 B2 * | 11/2012 | Chung et al. | 362/607 |
| 2006/0215386 A1 | 9/2006 | Hatanaka et al. | |
| 2007/0086181 A1 | 4/2007 | Hatanaka et al. | |
| 2009/0130340 A1 | 5/2009 | Chang | |
| 2010/0074585 A1 * | 3/2010 | Shimizu et al. | 385/129 |

FOREIGN PATENT DOCUMENTS

| | | |
|---|---|---|
| JP | 2005-117023 A | 4/2005 |
| JP | 3899483 B2 | 3/2007 |

\* cited by examiner

OPTICAL MEMBER, LIGHTING DEVICE, DISPLAY DEVICE AND TELEVISION RECEIVER, AND METHOD OF MANUFACTURING THE OPTICAL MEMBER

TECHNICAL FIELD

The present invention relates to an optical member, a lighting device, a display device, a television receiver, and a method of manufacturing the optical member.

BACKGROUND ART

Liquid crystal panels for use in liquid crystal display devices, for example, do not emit light by themselves, and thus need backlight units as separate lighting devices. The backlight units are well known for being mounted on the back surface of a liquid crystal panel (opposite to a display surface), and are configured to include a chassis having an opening on the surface of the liquid crystal panel side; a large number of light sources (for example, cold cathode tubes) stored as lamps in the chassis; an optical member (diffuser plate or the like) that is disposed in the opening of the chassis and through which light emitted from the light sources efficiently exit toward the liquid crystal panel; and a reflection sheet that is laid in the chassis and reflects light from the light sources toward the optical member and the liquid crystal panel.

If the light sources emit linear light, the backlight unit is configured to convert linear light by the optical member into planar light, thereby achieving even illumination light. However, if the conversion into planar light is not sufficient, a stripe lamp image according to alignment of the light sources is generated to deteriorate a liquid crystal display device in display quality.

To achieve even illumination light at the backlight unit, it is desired to increase the number of light sources arranged, thereby to shorten a distance between the adjacent light sources or raise the degree of diffusion by the diffuser plate, for example. However, increasing the number of light sources leads to increase in cost and power consumption of the backlight unit. In addition, if the degree of diffusion by the diffuser plate is made higher, it is not possible to raise brightness, which causes the need to increase the number of light sources. To solve the problem, there is a known backlight unit that maintains even brightness while suppressing power consumption, as is disclosed in Patent Document 1.

The backlight unit disclosed in Patent Document 1 includes a diffuser plate disposed on the light output side of a plurality of light sources. The diffuser plate has a light-controlling dot pattern printed with an all-ray transmittance (opening ratio) of 62 to 71% and a haze of 90 to 99%. In particular, the dot pattern is configured such that the diameter of the dots is larger immediately above the light sources and is smaller with increasing distance from the light sources. According to the foregoing configuration, it is possible to efficiently use light emitted from the light sources to radiate light with a sufficient and even brightness value without increasing power consumption of the light sources.

Patent Document 1: Japanese Unexamined Patent Publication No. 2005-117023

Problem to be Solved by the Invention

The foregoing diffuser plate has a pair of plate surfaces of a substrate, one of which has a light-controlling dot pattern, and is attached to the backlight unit such that a surface of the diffuser plate with the light-controlling dot pattern is facing the light source side of the backlight unit. However, if the diffuser plate is attached to the backlight unit such that the surface of the diffuser plate with the light-controlling dot pattern is on a side opposite to the light source side of the backlight unit, the substrate of the diffuser plate intervenes between the light sources and the light-controlling dot pattern, which causes a problem that the diffuser plate cannot provide desired optical performance.

To handle the foregoing problem, it is conceived that the diffuser plate is formed with a notch or a protrusion at an end thereof, for example. Therefore, the front and back sides of the diffuser plate can be discriminated using the notch or protrusion as a mark. However, to form the notch or protrusion in the diffuser plate, it is necessary to add another formation step to a manufacturing process of the diffuser plate. This requires modification of a manufacturing device and lengthens a manufacturing cycle time, which may result in cost increase.

DISCLOSURE OF THE INVENTION

The present invention is completed in view of the foregoing circumstances. An object of the invention is to allow discrimination between the front and back sides of a substrate at low costs.

Means for Solving the Problem

An optical member of the present invention includes: a light-transmissive substrate; an optical pattern formed on the substrate and applying an optical action to light; and a discrimination pattern that is configured to discriminate between a first position of the substrate and a second position of the substrate reversed from the first position, and is formed on a surface where the optical pattern is formed, and is made of the same material as the material for the optical pattern.

Accordingly, it is possible to discriminate between the first position of the substrate and the second position of the substrate reversed from the first position, through visual checking of the discrimination pattern. The discrimination pattern is formed on the surface of the substrate where the optical pattern is formed, and is made of the same material as the material for the optical pattern. This makes it possible to form the discrimination pattern at the step of forming the optical pattern in the manufacturing process of the optical member. Therefore, it is not needed to add any special step or device for forming the discrimination pattern, which allows formation of the discrimination pattern at low costs.

An embodiment of the optical member according to the present invention is preferably configured as follows:

(1) The discrimination pattern is formed so as to be non-line-symmetric with respect to a line extending in parallel with at least one of a first line passing through a center of the substrate and extending in a direction parallel to a side of the substrate and a second line passing through the center of the substrate and extending in a direction perpendicular to the first line. Accordingly, it is possible to discriminate between the first position of the substrate and the second position of the substrate reversed from the first position around at least one of the first line and the second line.

(2) The discrimination pattern is formed so as to be non-line-symmetric with respect to both a line extending in parallel with the first line and a line extending in parallel with the second line. Accordingly, it is possible to discriminate the first position of the substrate and the second position of the substrate reversed from the first position around the first line. It is also possible to discriminate the first position of the substrate and the second position of the substrate reversed from the first position around the second line.

(3) The optical pattern is formed at the center of the substrate, whereas the discrimination pattern is formed at one of a pair of ends sandwiching the center of the substrate. Accordingly, the orientation of the discrimination pattern is reversed across the center between the case where the substrate is in the first position and the case where the substrate is in the second position reversed from the first position around a line passing through the center of the substrate and being perpendicular to the direction of the center and the one end. This allows the position of the substrate to be discriminated in a further easy manner.

(4) The optical pattern is formed at the center of the substrate, whereas the discrimination pattern is formed by a first discrimination pattern formed at one of a pair of ends sandwiching the center of the substrate, and a second discrimination pattern formed at the other end. Accordingly, forming the discrimination pattern at the both ends of the substrate makes it possible to achieve further improvement in visibility.

(5) The first discrimination pattern and the second discrimination pattern are formed so as to be non-line-symmetric with respect to a line passing through the center of the substrate and being perpendicular to the direction of alignment of the center, the one end, and the other end. Accordingly, the first discrimination pattern and the second discrimination pattern are reversed in orientation and are changed in shape between the case where the substrate is in the first position and the case where the substrate is in the second position reversed from the first position around a line passing through the center of the substrate and being perpendicular to the direction of alignment of the center, the one end, and the other end, which further facilitates discrimination between the first position and the second position.

(6) The optical pattern is formed so as to be line-symmetric with respect to a line passing through the center of the substrate and being perpendicular to the direction of alignment of the center and the pair of ends. Accordingly, the optical pattern makes no change between the case where the substrate is in the first position and the case where the substrate is in the second position reversed from the first position around a line passing through the center of the substrate and being perpendicular to the direction of alignment of the center and the pair of ends. However, discrimination can be made through visual checking of the changing discrimination pattern.

(7) The discrimination pattern has a straight-line portion extending along a side of the substrate. Accordingly, the discrimination pattern can be recognized more easily by the straight-line portion extending along the side of the substrate, as compared to the case where the discrimination pattern is formed as a point-like pattern, which makes it possible to improve workability in relation to the discrimination. In addition, the discrimination pattern with the straight-line portion can be easily formed on the substrate at manufacture of the optical member.

(8) The straight-line portion passes over the substrate from one end edge to the other end edge on an opposite side of the one end edge. Accordingly, the discrimination pattern can be recognized more easily, which makes it possible to further improve workability in relation to the discrimination.

(9) The straight-line portion continues for an entire length. Accordingly, the discrimination pattern can be recognized much more easily, which makes it possible to further improve workability in relation to the discrimination.

(10) The straight-line portion is formed by a plurality of intermittently disposed line segments. Accordingly, the discrimination pattern can be formed with a smaller amount of material as compared to the case where the straight-line portion continues for an entire length, which makes it possible to form the discrimination pattern at low costs.

(11) The substrate has a horizontally long rectangular shape, and the straight-line portion extends along a longer side of the substrate. Accordingly, the discrimination pattern can be recognized more easily by the straight-line portion configured to extend along the longer side of the substrate, which makes it possible to further improve workability in relation to discrimination.

(12) The discrimination pattern has a branch portion protruding sideways from the straight-line portion. Accordingly, the discrimination pattern has the straight-line portion and the branch portion protruding sideways from the straight-line portion, and thus can be more likely to be recognized on discrimination, which results in further improvement of workability.

(13) A plurality of branch portions is disposed parallel to each other at equal space therebetween. Accordingly, the discrimination pattern can be recognized more easily by forming a plurality of the branch portions with equal space therebetween. In addition, the discrimination pattern having a plurality of branch portions on the substrate can be formed easily at manufacture of the optical member.

(14) The plurality of branch portions has the same shape. Accordingly, the discrimination pattern having a plurality of the branch portions can be formed easily.

(15) The branch portions protrude from the straight-line portion toward one side. Accordingly, the discrimination pattern can be placed in a smaller space on the substrate, as compared to the case where the branch portions protrude from the straight-line portion toward the both sides.

(16) The optical pattern is disposed at the center of the substrate, whereas the discrimination pattern is disposed on an end of the substrate. The branch portions protrude from the straight-line portion toward ends. Accordingly, it is possible to reduce a possibility that the branch portions have optical influence on light to which an optical action is applied, as compared to the case where the branch portions protrude from the straight-line portion toward the center, that is, toward the optical pattern. This allows the optical member to provide favorable optical performance.

(17) The branch portions are formed so as to be non-line-symmetric with respect to a line passing through the center of the branch portion and being perpendicular to the straight-line portion. Accordingly, the branch portions change in shape between the case where the substrate is in the first position and the case where the substrate is in the second position reversed from the first position, which further facilitates the discrimination.

(18) The branch portions are angled to the straight-line portion. Accordingly, the discrimination pattern can be recognized more easily by the branch portions angled to the straight-line portion.

(19) The branch portions are formed by a plurality of intermittently disposed line segments. Accordingly, the discrimination pattern can be formed by a smaller amount of material, as compared to the case where the branch portions continue for an entire length, which allows the discrimination pattern to be formed at low costs.

(20) The branch portions are each formed in the shape of a triangle having a first side along the straight-line portion and second and third sides intersecting with the straight-line portion, and the second and third sides being different in length. Accordingly, the second side and the third side intersecting with the straight-line portion are different in length, which makes it possible to discriminate the position of the substrate by a relation in position between the second side and the third side.

(21) The branch portions are each formed in the shape of a right-angled triangle in which the second side is perpendicular to the straight-line portion and the third side is angled to the straight-line portion. Accordingly, the second side and the third side can be distinguished more easily, thereby further improving workability of the discrimination.

(22) The branch portions each have an L shape including a part perpendicular to the straight-line portion and a part parallel to the straight-line portion. Accordingly, the discrimination pattern can be recognized more easily by the L-shaped branch portion including the part perpendicular to the straight-line portion and the part parallel to the straight-line portion.

(23) The optical pattern and the discrimination pattern are made from a light-reflective material. Accordingly, light reflectance on a surface of the substrate where the optical pattern is formed can be controlled by a design of the optical pattern.

(24) The optical pattern is formed by a large number of approximately point-like dots on the surface of the substrate where the optical pattern is formed. Accordingly, light reflectance on the surface of the substrate where the optical pattern is formed can be easily controlled by an aspect of the dots (area, distribution density, and the like).

(25) The optical pattern and the discrimination pattern are colored in white. This achieves favorable light reflectance. In addition, the discrimination pattern can be easily recognized.

Next, to solve the foregoing problem, a lighting device of the present invention includes: the foregoing optical member; a chassis having an opening on the light output side and the optical member disposed so as to cover the opening; and a light source housed in the chassis and configured to radiate light to the optical member.

According to the lighting device, the optical member passing light from the light source therethrough makes it possible to discriminate between the front and back sides of the substrate at low costs, thereby achieving reduction in manufacturing cost.

An embodiment of the lighting device according to the present invention is preferably configured as follows:

(1) The chassis has a portion facing the optical member that is divided into a light source placement region where the light source is disposed and a light source non-placement region where the light source is not disposed, whereas the optical member has the optical pattern made of a light-reflective material and is formed such that a part overlapping the light source placement region is larger in light reflectance provided by the optical pattern than a part overlapping the light source non-placement region. Accordingly, light emitted from the light source first reaches the part of the optical member with relatively large light reflectance given by the optical pattern, and therefore most of the light is reflected by the optical pattern (that is, not passed through), whereby the brightness of illumination light is suppressed with respect to an amount of light emitted from the light source. Meanwhile, the light reflected here can be reflected in the chassis so as to reach the light source non-placement region. The part of the optical member overlapping the light source non-placement region is relatively small in light reflectance given by the optical pattern, and therefore much more light can be passed through, thereby obtaining desired brightness of illumination light.

(2) The optical member is divided into an effective light-emitting region overlapping the entire light source placement region and the most part of the light source non-placement region adjacent to the light source placement region and using efficiently emitted light; and a non-effective light-emitting region overlapping part of the light source non-placement region. The optical pattern is formed in the effective light-emitting region, whereas the discrimination pattern is formed in the non-effective light-emitting region. Accordingly, the optical pattern is formed in the effective light-emitting region of the optical member, and therefore desired emitted light can be obtained by subjecting light from the light source to an optical action by the optical pattern. Meanwhile, the discrimination pattern is disposed in the non-effective light-emitting region of the optical member, whereby it is possible to prevent the discrimination pattern from exercising optical influence on the emission light in the effective light-emitting region and assure favorable emitted light.

(3) The optical member has light reflectance given by the optical pattern that becomes smaller with increasing distance from the light source. Accordingly, it is possible to achieve even brightness of illumination light in the light source placement region and the light source non-placement region.

(4) The chassis has a part facing the optical member that is divided at least into a first end portion; a second end portion opposite to the first end portion; and a central portion sandwiched between the first end portion and the second end portion. The central portion is the light source placement region, and the first end portion and the second end portion are the light source non-placement regions. Accordingly, it is possible to provide sufficient brightness at the central portion of the lighting device, and thus provide sufficient brightness at a central portion of display at the display device including the lighting device, thereby obtaining favorable visibility.

Next, to solve the foregoing problem, a display device of the present invention includes the foregoing lighting device; and a display panel providing display by the use of light from the lighting device.

According to the thus configured display device, the lighting device supplying light to the display panel is manufactured at low costs, which leads to reduction in costs of manufacturing the entire display device.

An embodiment of the lighting device according to the present invention is favorably configured as follows:

(1) The display panel is divided into a display region at a center displaying an image and a non-display region on end sides of the display region. In the optical member, the optical pattern is formed at a part overlapping the display region, whereas the discrimination pattern is formed at a part overlapping the non-display region. Accordingly, favorable display quality can be obtained by subjecting light supplied to the display region of the display panel to an optical action by the optical pattern. Meanwhile, it is possible to prevent that the discrimination pattern exerts optical influence on light supplied to the display region of the display panel, thereby assuring high display quality.

(2) The display panel is a liquid crystal panel with liquid crystal encapsulated between a pair of substrates. Accordingly, the display panel is applicable to displays of televisions and personal computers and the like, for example, and is favorably suited to large-sized screens.

Next, to solve the foregoing problem, a method of manufacturing the optical member of the present invention including: a light-transmissive substrate; an optical pattern formed on the substrate and applying an optical action to light; and a discrimination pattern configured to discriminate the first position of the substrate and the second position of the substrate reversed from the first position, the method including extruding the substrate; and forming the optical pattern and the discrimination pattern by the same material on the same surface of the substrate.

According to the method of manufacturing the optical member, at the pattern forming step, it is possible to form the optical pattern and the discrimination pattern by the same material on the same surface of the substrate obtained through the protruding step. Therefore, there is no need to add any special step or device for formation of the discrimination pattern, which allows the discrimination pattern to be formed at low costs. In addition, it is possible to discriminate the first position of the manufactured substrate and the second position of the substrate reversed from the first position by visual checking of the discrimination pattern.

An embodiment of the method of manufacturing the optical member according to the present invention is favorably configured as follows:

(1) In the method of manufacturing the optical member in which the discrimination pattern has the straight-line portion extending along the side of the substrate, the substrate is transferred along a direction in which the straight-line portion extends. Accordingly, at the pattern forming step, the discrimination pattern is formed on the transferred substrate. At that time, the direction in which the straight-line portion of the discrimination pattern extends and the direction in which the substrate is transferred, are aligned to each other, which facilitates formation of the discrimination pattern.

Advantageous Effect of the Invention

According to the present invention, it is possible to discriminate between the front and back sides of the substrate at low costs.

BEST MODE FOR CARRYING OUT THE INVENTION

<First Embodiment>

A first embodiment of the present invention will be described with reference to FIGS. 1 to 12. First, a configuration of a television receiver TV including a liquid crystal display device 10 will be described.

Figure 1:
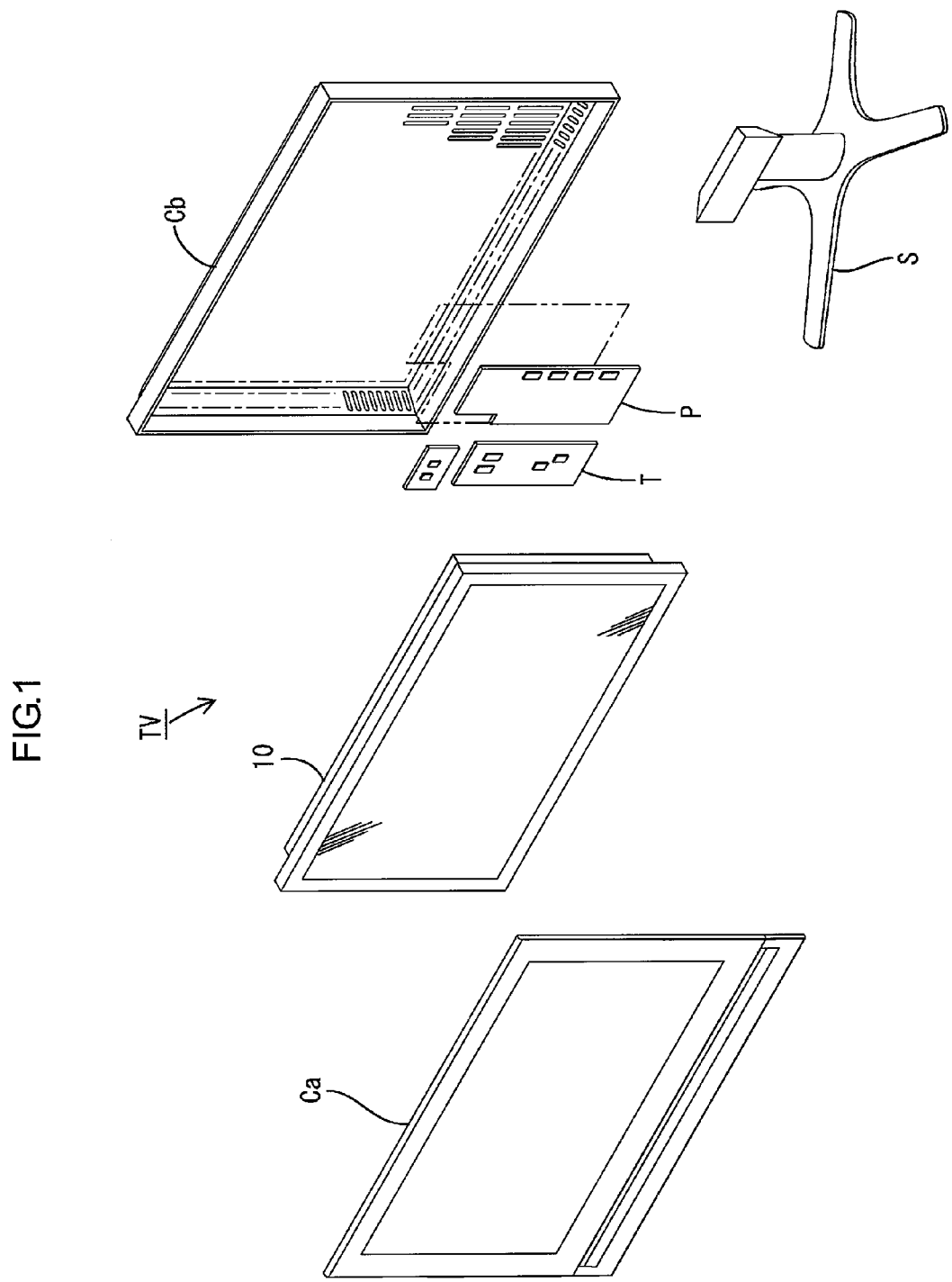
FIG. 1 is an exploded perspective view of a television receiver according to a first embodiment of the present invention.
Figure 2:
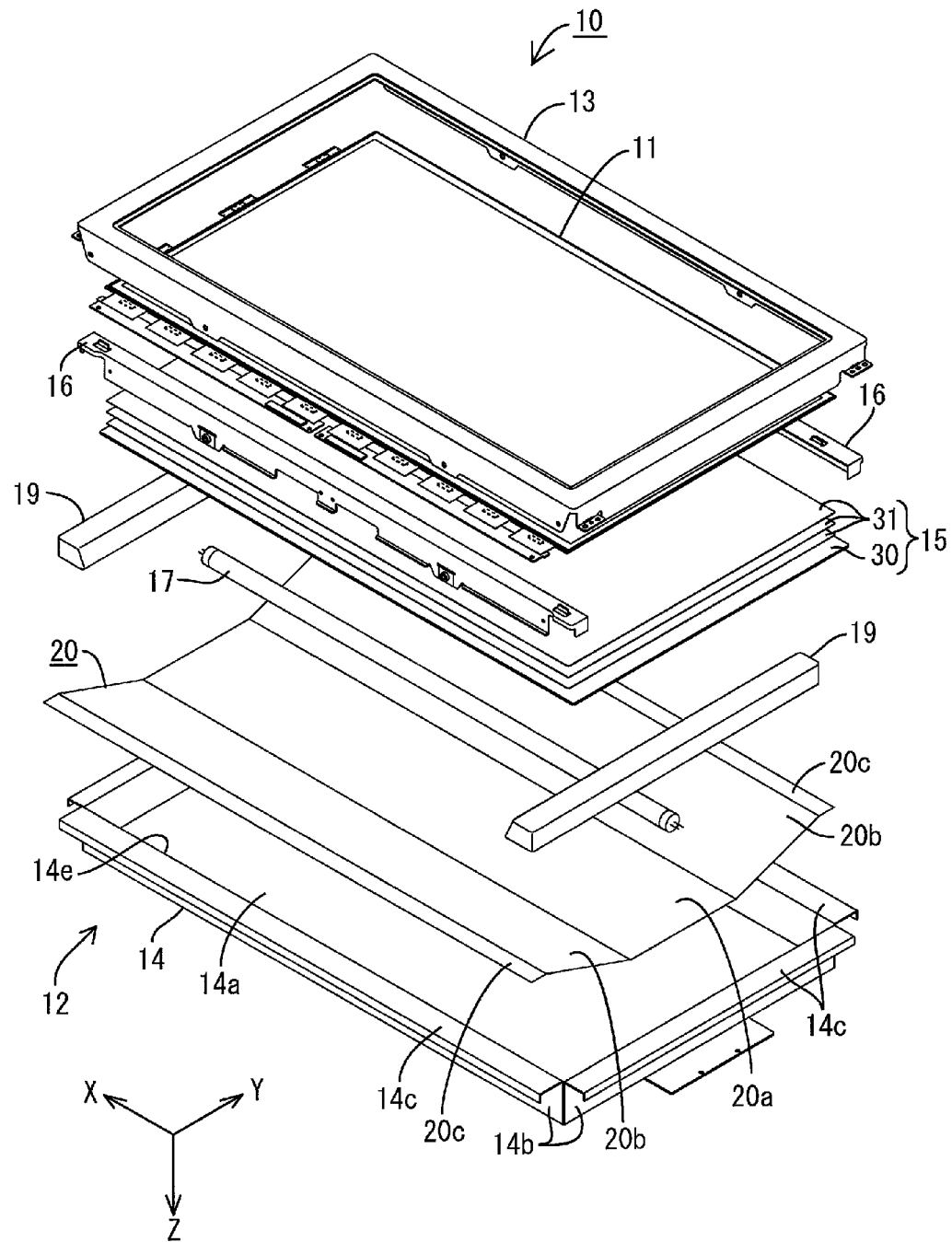
FIG. 2 is an exploded perspective view of a liquid crystal display device included in the television receiver.
Figure 3:
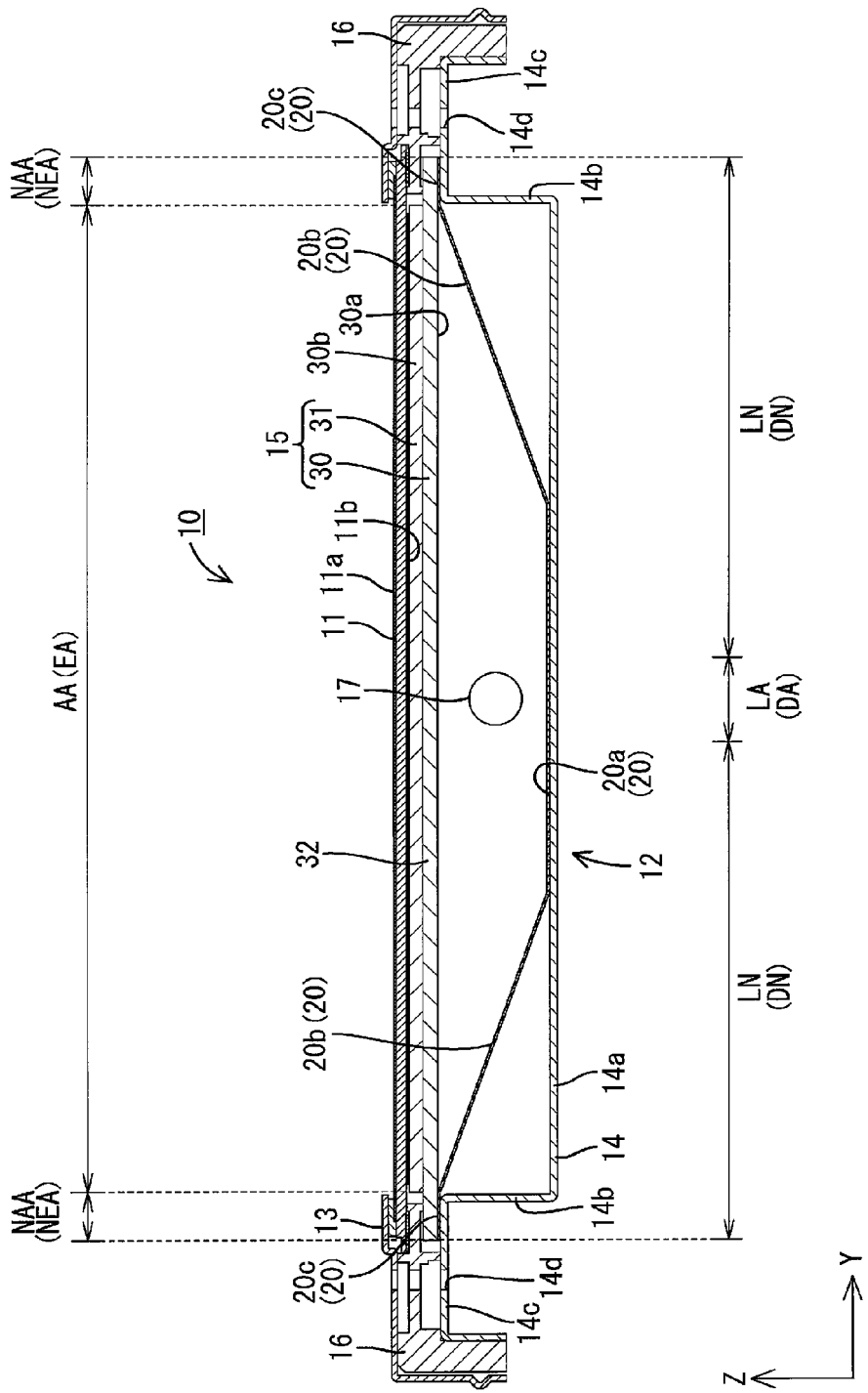
FIG. 3 is a cross section view of the liquid crystal display device along a shorter side.
Figure 4:
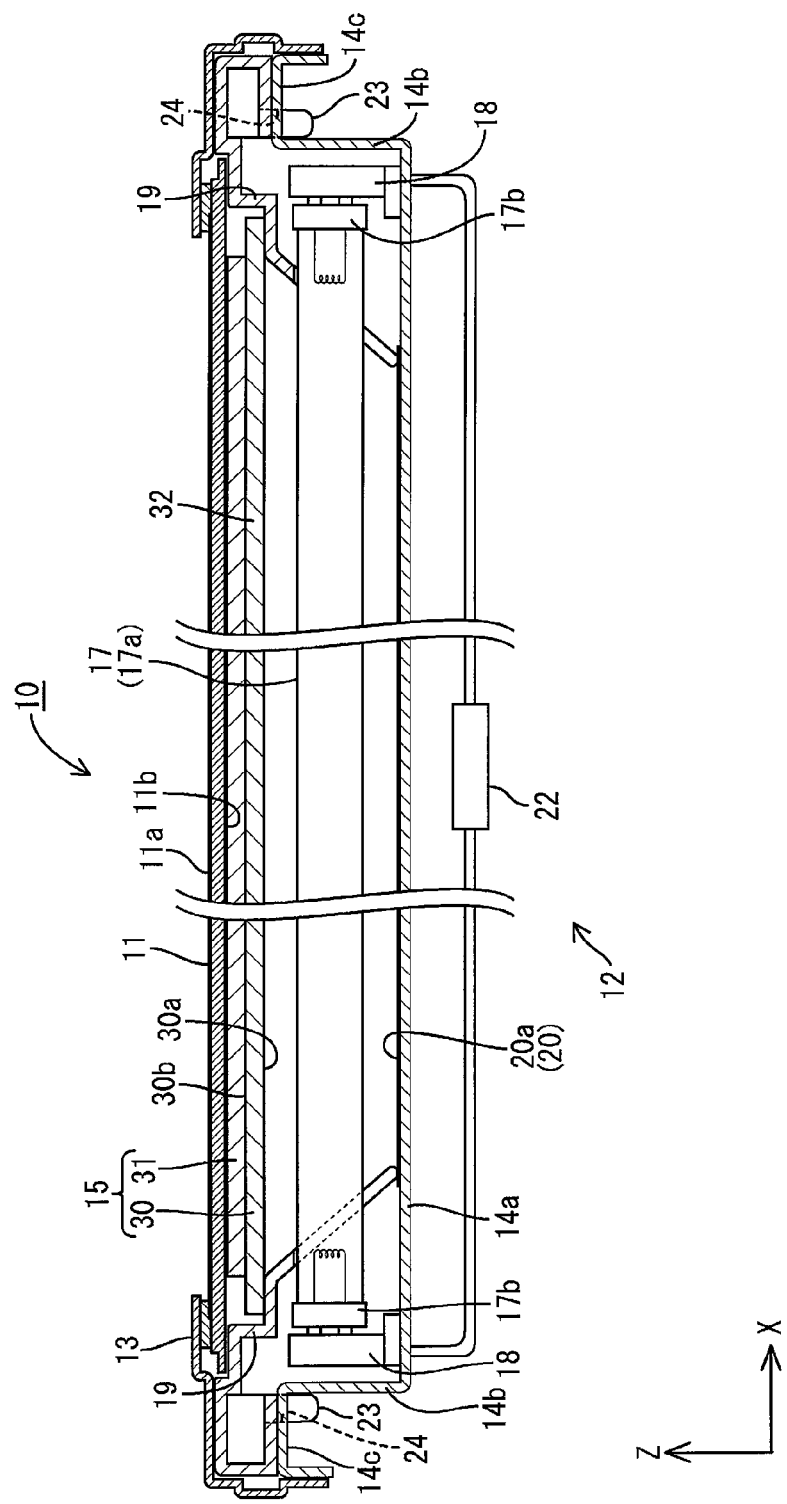
FIG. 4 is a cross section view of the liquid crystal display along a longer side.
Figure 5:
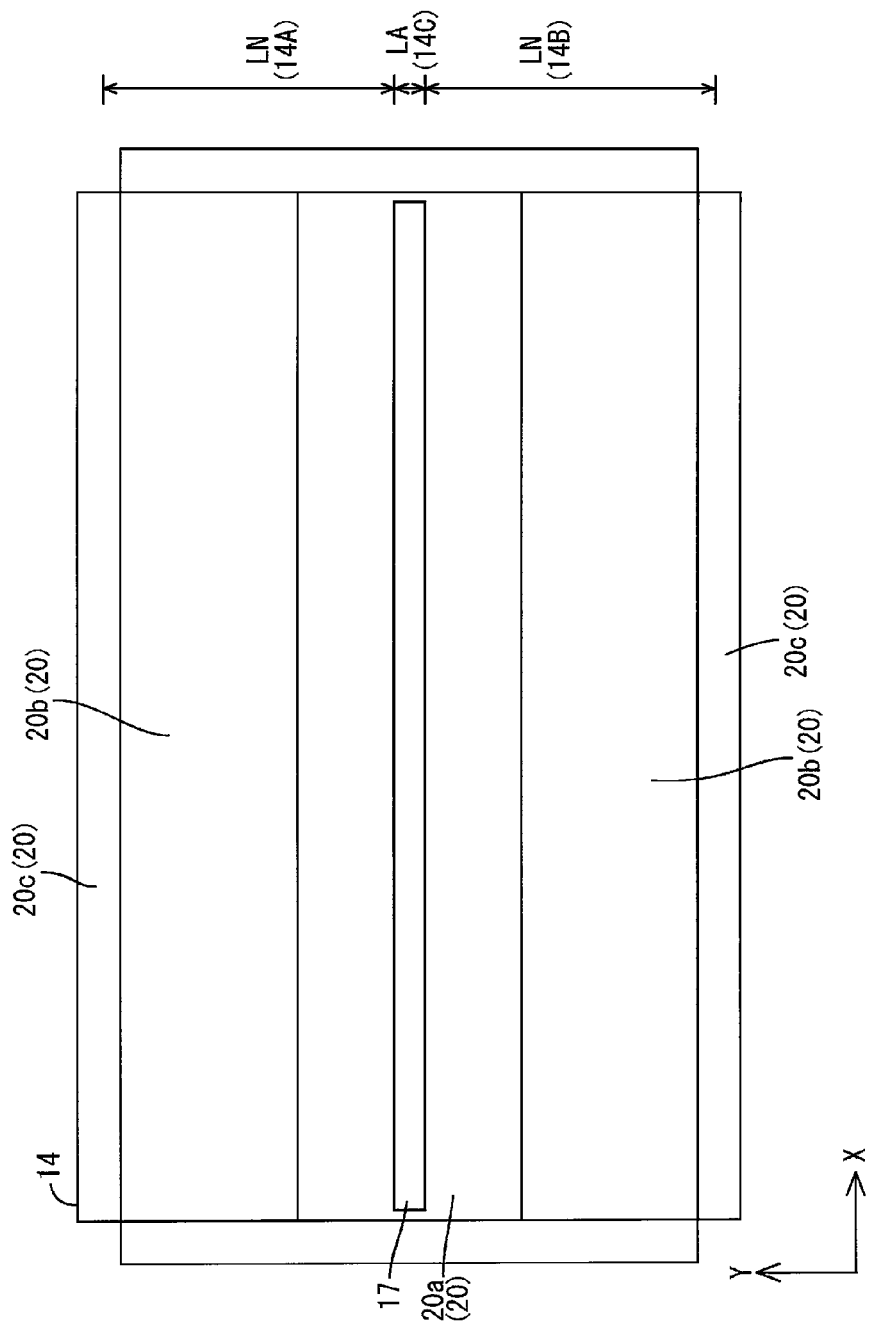
FIG. 5 is a plane view of layout of a hot cathode tube and a reflection sheet in a chassis included in the liquid crystal panel.

FIG. 1 is an exploded perspective view showing a schematic configuration of a television receiver according to the present embodiment, FIG. 2 is an exploded perspective view showing a schematic configuration of a liquid crystal display device included in the television receiver of FIG. 1, FIG. 3 is a cross section view of the liquid crystal display device of FIG. 2 along a shorter side, FIG. 4 is a cross section view of the liquid crystal display device of FIG. 2 along a longer side, FIG. 5 is a plane view of layout of a hot cathode tube and a reflection sheet in a chassis included in the liquid crystal display device of FIG. 2. In FIG. 5, the chassis has a longer side along an X-axis direction and a shorter side along a Y-axis direction.

The television receiver TV according to the present embodiment is configured to include the liquid crystal display device 10; front and back cabinets Ca and Cb sandwiching and storing the liquid crystal display device 10; a power source P; a tuner T; and a stand S, as shown in FIG. 1. The liquid crystal display device (display device) 10 has a horizontally long square shape (rectangular and elongated) as a whole and is stored in portrait orientation. The liquid crystal display device 10 includes a liquid crystal panel 11 as a display panel and a backlight unit (lighting device) 12 as an external light source, and these components are integrally held by a frame-like bezel 13 or the like, as shown in FIG. 2. In the present embodiment, the television receiver TV has a screen size of 32 inches with an aspect ratio of 16:9 as an example. More specifically, the horizontal dimension of the screen (along the X-axis direction) is about 698 mm, for example, and the vertical dimension of the screen (along the Y-axis direction) is about 392 mm, for example.

Next, the liquid crystal panel 11 and the backlight unit 12 constituting the liquid crystal display device 10 will be described (refer to FIGS. 2 to 4).

The liquid crystal panel (display panel) 11 is configured such that a pair of glass substrates is attached together with a predetermined gap therebetween and liquid crystal is encapsulated between the glass substrates. One of the glass substrates has a switching component (TFT, for example) connected to a source wiring and a gate wiring perpendicular to each other, pixel electrodes connected to the switching component, an alignment film, and the like. The other glass substrate has color filters in which color sections of R (red), G (green), B (blue), and the like are arranged in predetermined alignment, counter electrodes, an alignment film, and the like. Of the liquid crystal panel 11, a central portion of the screen is set as a display region AA configured to display an image, and ends of an outer picture frame-shaped (frame) surrounding the display region AA are set as non-display regions NAA. The non-display regions NAA each include a part of the liquid crystal panel 11 received by the frame 16 (FIG. 3), a part of the liquid crystal panel 11 received by a stepped surface of the holder 19 (FIG. 4), and a part of the liquid crystal panel 11 covered by a bezel 13 from the front side (FIGS. 3 and 4). Polarizing plates 11a and 11b are disposed outside the two substrates (refer to FIGS. 3 and 4).

As shown in FIG. 2, the backlight unit 12 includes an approximately box-shaped chassis 14 with an opening 14e on the front side (the light output side and the liquid crystal panel 11 side); an optical member 15 group (a diffuser plate (light diffuser member) 30 and a plurality of optical sheets 31 disposed between the diffuser plate 30 and the liquid crystal panel 11) disposed to cover the opening 14e of the chassis 14; and a frame 16 that is disposed along the longer side of the chassis 14 so as to sandwich and hold a longer side edge portion of the optical member 15 group together with the chassis 14. Further, the chassis 14 contains a hot cathode tube 17 as a light source (linear light source); sockets 18 for relaying of electrical connection at end portions of the hot cathode tube 17; and holders 19 covering collectively the end portions of the hot cathode tube 17 and the sockets 18. Moreover, the chassis 14 has a reflection sheet 20 laid therein for reflection of light.

The chassis 14 is made of synthetic resin, and is formed by a bottom plate 14a, side plates 14b rising forward from the end portion of each side of the bottom plate 14a, and receiving plates 14c jutting outward from the rising end portions of the side plates 14b, and has an approximately shallow box shape as a whole, as shown in FIGS. 3 and 4. The bottom plate 14a has a rectangular shape (elongated shape) with a longer side and a shorter side aligned to the liquid crystal panel 11 and the optical member 15, and has a range of formation so as to be almost the same in size as the liquid crystal panel 11 and the optical member 15 in a planar view. In addition, the bottom plate 14a has insertion holes for insertion of the sockets 18 at the both end portions along the longer side. The side plates 14b are provided in a pair at both end portions of the bottom plate 14a along the longer side and the shorter side, and the side plates 14b rise from the bottom plate 14a at an almost right angle. The receiving plates 14c each are formed at the side plates 14b, and are bent at an almost right angle with respect to the side plates 14b, and are configured to be parallel to the bottom plate 14a. The outer end portions of the reflection sheet 20 and the optical member 15 are placed on the receiving plates 14c which are configured to receive these components from the back side. In addition, as shown in FIG. 3, the receiving plate 14c has fixed holes 14d through which the bezel 13, the frame 16, the chassis 14, and others, can be integrated by screws or the like, for example.

The reflection sheet 20 is made of synthetic resin (foam PET, for example), and has a surface of a white color excellent in light reflectivity. As shown in FIG. 2, the reflection sheet 20 is laid on the inner surface of the chassis 14 (facing the hot cathode tube 17) so as to cover the almost entire surface. The reflection sheet 20 allows light emitted from the hot cathode tube 17 to be reflected toward the optical member 15. The reflection sheet 20 has a rectangular shape (elongated shape) with a longer side and a shorter side aligned to the chassis 14 as a whole, and is made symmetrical along the shorter side. The reflection sheet 20 is configured to have a bottom portion 20a disposed along the bottom plate 14a of the chassis 14; a pair of rising portions 20b rising forward from the end portion of the bottom portion 20a (toward the light output side and the optical member 15 side); and a pair of extending portions 20c extending outward from the rising leading end portions of the rising portions 20b (opposite to the bottom portion 20a side).

Specifically, the bottom portion 20a is disposed on the central side of the bottom plate 14a in the chassis 14 along the shorter side in a planar view (at a position overlapping the central portion 14C), and is configured to be parallel to the plate surface of the bottom plate 14a. The rising portions 20b are disposed in a pair at positions sandwiching the bottom portion 20a along the shorter side, and are positioned on the both sides of the bottom plate 14a of the chassis 14 along the shorter side in a planar view (overlapping the both end portions 14A and 14B). The rising portions 20b are inclined with a constant gradient from rising proximal portions (on the bottom portion 20a side) to rising distal portions (opposite to the bottom portion 20a side (on the extending portion 20c side)). The extending portions 20c are disposed to extend outward from the rising distal portions of the rising portions 20b, and are overlapping the receiving plates 14c in the chassis 14 in a planar view. The extending portions 20c are sandwiched between the receiving plates 14c and outer edge portions of the diffuser plate 30.

As shown in FIG. 2, the optical member 15 has a horizontally long square shape (rectangular) in a planar view, as with the liquid crystal panel 11 and the chassis 14. The optical member 15 intervenes between the liquid crystal panel 11 and the hot cathode tube 17, and is formed by the diffuser plate 30 disposed on the back side (opposite to the hot cathode tube 17 side and the light output side) and an optical sheet 31 disposed on the front side (the liquid crystal panel 11 side and the light output side). The diffuser plate 30 is formed by dispersing a large number of diffusing particles in an almost transparent resin substrate 30a with a predetermined thickness. The diffuser plate 30 has the function of diffusing transmitted light, and also has the function to reflect light emitted from the hot cathode tube 17 as described later in detail. The optical sheet 31 is formed by a thinner sheet as compared to the diffuser plate 30, and has a three-layered structure. Specifically, the optical sheet 31 has a diffuser sheet, a lens sheet, and a reflection type polarizing sheet in this order from the diffuser plate 30 side (back side).

Figure 6:
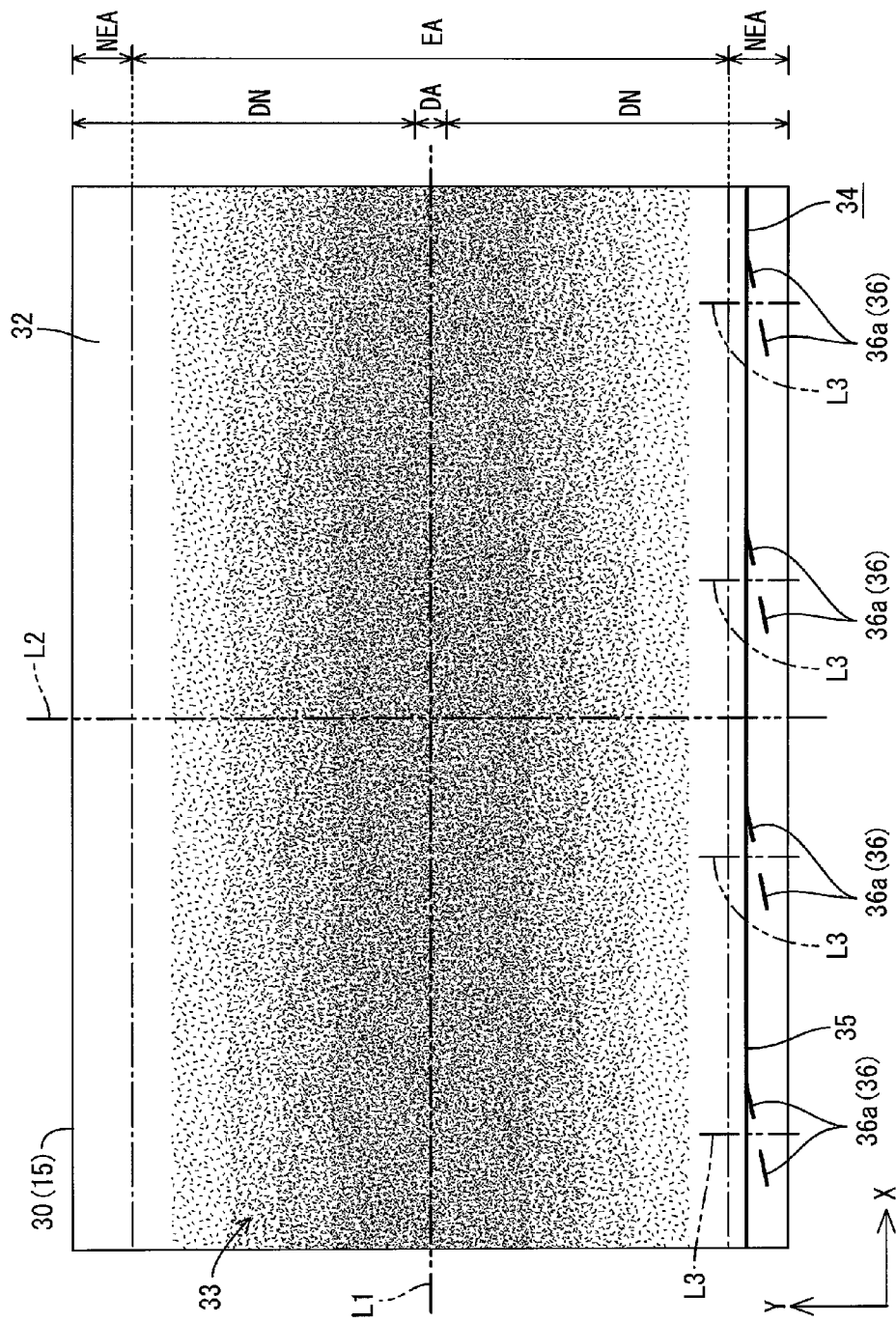
FIG. 6 is a plane view of an optical pattern and a discrimination pattern on a diffuser plate.

Of the optical member 15 (diffuser plate 30), a central portion overlapping the display region AA of the foregoing liquid crystal panel 11 is the effective light-emitting region EA where emitted light is effectively used for image display on the liquid crystal panel 11, and end portions of an outer picture-frame form (frame) overlapping the non-display regions NAA in the liquid crystal display device 11 and surrounding the effective light-emitting region EA are the non-effective light-emitting regions NEA, as shown in FIGS. 3 and 6. FIG. 6 illustrates only the shorter sides (along the Y-axis direction) of the effective light-emitting region EA and the non-effective light-emitting regions NEA, and shows boundaries between the effective light-emitting region EA and the non-effective light-emitting regions NEA by alternate long and short dash lines. The non-effective light-emitting regions NEA include parts of the optical member 15 (diffuser plate 30) received by the receiving plates 14c of the chassis 14 (FIG. 3), parts of the optical member 15 received by the stepped surfaces of the holders 19 (FIG. 4), and parts covered by the bezel 13 and the frame 16 from the front side (FIGS. 3 and 4).

The hot cathode tube 17 is tubular (linear) as a whole, and includes a hollow glass tube 17a and a pair of electrodes 17b disposed on both end portions of the glass tube 17a, as shown in FIGS. 3 and 4. The glass tube 17a has mercury and rare gas or the like encapsulated therein and has a fluorescent material coating an inner wall surface thereof. Light-emitting surface of the hot cathode tube 17 is configured to constitute an outer circumferential surface of the glass tube 17a and emit light radially from an axial center thereof. Each of the electrodes 17b includes a filament and a pair of terminals connected to both end portions of the filament. The hot cathode tube 17 has sockets 18 fitted over the both end portions thereof. The foregoing terminals are connected via the sockets 18 to the inverter board 22 attached to the outer surface (back side) of the bottom plate 14a in the chassis 14. The hot cathode tube 17 is supplied with drive power from the inverter board 22, and is configured to control a tube current value, that is, brightness (lighting status) by the inverter board 22. The hot cathode tube 17 intervenes between the diffuser plate 30 and the bottom plate 14a (reflection sheet 20) of the chassis 14, and is disposed closer to the bottom plate 14a of the chassis 14 than the diffuser plate 30. The outer diameter of the hot cathode tube 17 is larger than the outer diameter of a cold cathode tube (about 4 mm, for example), and is about 15.5 mm, for example.

The thus structured hot cathode tube 17 is stored by only one in the chassis 14 such that the length direction (along an axial direction) of the hot cathode tube 17 is aligned to the longer side direction of the chassis 14, and is positioned at an approximately center of the chassis 14 along the shorter side, as shown in FIGS. 3 and 5. Specifically, assuming that a part of the chassis 14 facing the diffuser plate 30 of the optical member 15, that is, the entire bottom plate 14a and parts of the receiving plates 14c (proximal portions) are divided into the first end portion 14A along the shorter side (along the Y-axis direction), the second end portion 14B positioned opposite to the first end portion 14A, and a central portion 14C sandwiched between the first and second end portions, the hot cathode tube 17 is located at the central portion 14C, thereby to form a light source placement region LA. Meanwhile, the hot cathode tube 17 is not placed at the first end portion 14A or the second end portion 14B of the chassis 14, thereby to form light source non-placement regions LN. That is, the hot cathode tube 17 forms the light source placement region LA eccentrically located at the central portion 14C of the bottom plate 14a of the chassis 14 along the shorter side, and the area of the light source placement region LA (the length along the Y-axis direction) is smaller than the area of the light source non-placement regions LN (the length along the Y-axis direction). The ratio of the area of the light source placement region LA (the length along the Y-axis direction) to the area of the entire screen (the vertical dimension of the screen (shorter side dimension)) is about 4%, for example. In addition, the light source non-placement regions LN in a pair have almost the same area. In addition, the entire light source placement region LA and most parts of the light source non-placement regions LN on the central side adjacent to the light source placement region LA overlap the effective light-emitting region EA of the diffuser plate 30, and parts of ends of the light source non-placement regions LN (outer parts) overlap the non-effective light-emitting regions NEA of the diffuser plate 30.

The holders 19 covering the end portions of the hot cathode tube 17 and the sockets 18 are made of white-colored synthetic resin. As shown in FIG. 2, the holders 19 each have a long and narrow, approximately box-like shape extending along the shorter side of the chassis 14. As shown in FIG. 4, the holders 19 each have a stepped front surface on which the optical member 15 and the liquid crystal panel 11 can be placed in different levels, and partially overlap the receiving plates 14c of the chassis 14 along the shorter side, thereby to form side walls of the backlight unit 12 together with the receiving plates 14c. The holders 19 have insertion pins 23 protruding from surfaces facing the receiving plates 14c of the chassis 14, and when the insertion pins 23 are inserted into insertion holes 24 in upper surfaces of the receiving plates 14c of the chassis 14, the holders 19 are attached to the chassis 14.

Next, a configuration of the diffuser plate 30 in relation to a light reflecting feature will be described in detail.

Figure 7:
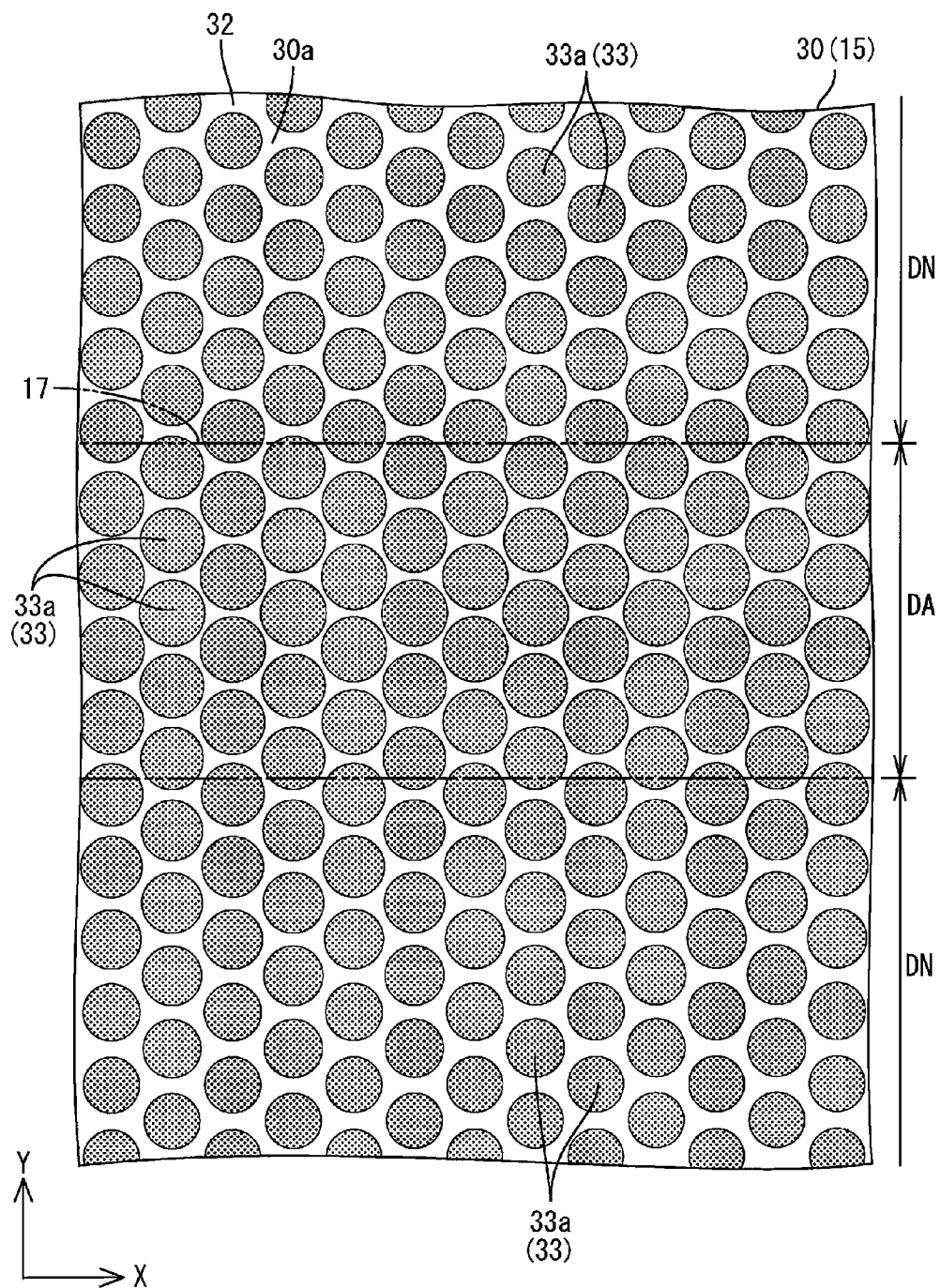
FIG. 7 is a partially enlarged planar view of the optical pattern on the diffuser plate.
Figure 8:
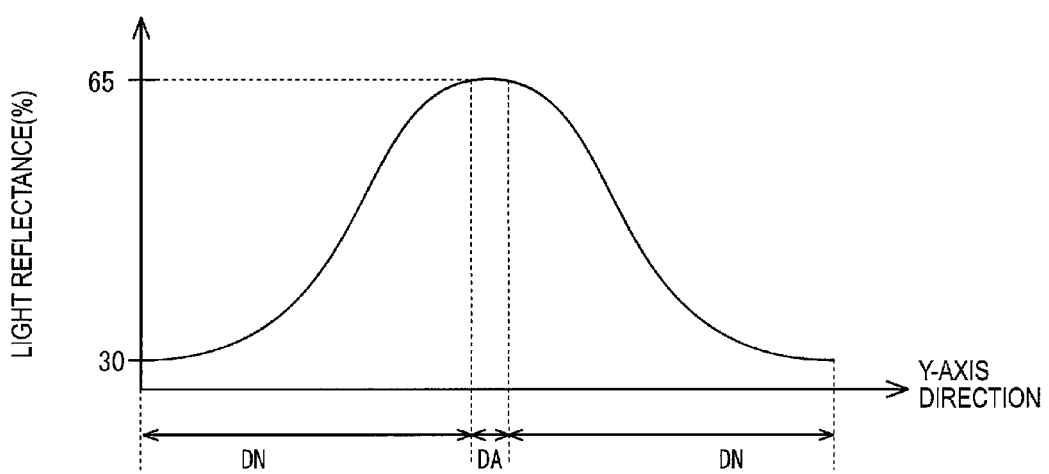
FIG. 8 is a graph showing changes in light reflectance along a shorter side of the diffuser plate.
Figure 9:
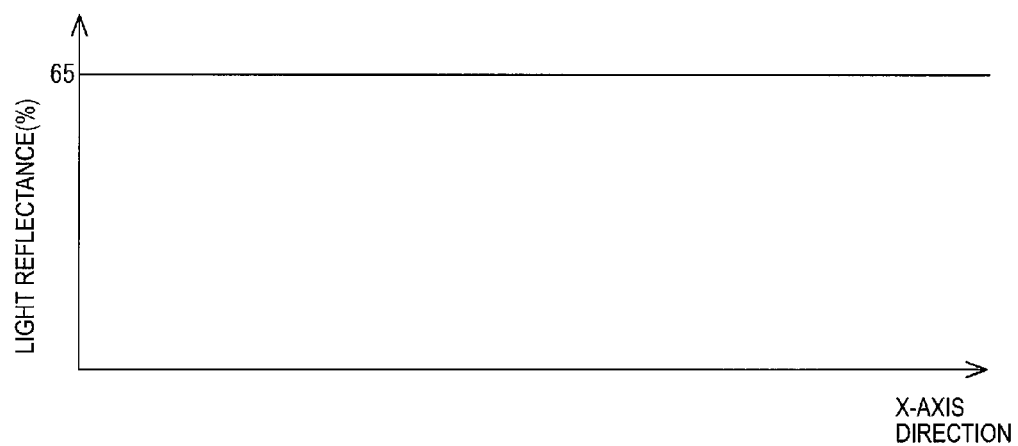
FIG. 9 is a graph showing changes in light reflectance along a longer side of the diffuser plate.

FIG. 6 is a plane view for illustrating an optical pattern and a discrimination pattern in a diffuser plate, FIG. 7 is a partially enlarged plane view of main parts of the optical pattern in the diffuser plate of FIG. 6, FIG. 8 is a graph showing changes in light reflectance on the diffuser plate of FIG. 6 along a shorter side, and FIG. 9 is a graph showing changes in light reflectance on the diffuser plate of FIG. 6 along a longer side. In FIGS. 8 and 9, the longer side of the diffuser plate is along the X-axis direction, and the shorter side of the same is along the Y-axis direction. FIG. 8 shows a lateral axis indicative of the Y-axis direction (the shorter side) and represents a graph plotting light reflectance along the Y-axis direction in the effective light-emitting region of the diffuser plate from the forward end portion to the backward end portion shown in FIG. 6. Similarly, FIG. 9 shows a lateral axis indicative of the X-axis direction (the longer side) and represents a graph plotting light reflectance along the Y-axis direction from the left end portion to the right end portion shown in FIG. 6.

The diffuser plate 30 is formed by dispersing and mixing a predetermined amount of diffusing particle diffusing light, into an almost transparent horizontally long rectangular substrate 32 made of synthetic resin (polystyrene, for example), and has almost even light transmittance and light reflectance as a whole in a planar view. Specifically, the light transmittance and light reflectance on the substrate 32 of the diffuser plate 30 (excluding an optical pattern 33 and a discrimination pattern 34 described later) are preferably about 70% and about 30%, respectively, for example. The diffuser plate 30 (substrate 32) has a surface facing the hot cathode tube 17 (hereinafter, referred to as first plane 30a) and a surface located opposite to the first plane 30a and facing the liquid crystal panel 11 (hereinafter, referred to as second plane 30b). The first plane 30a is set as a light incident plane into which light from the hot cathode tube 17 is entered, whereas the second plane 30b is set as a light output plane from which light (illumination light) is output toward the liquid crystal panel 11.

In addition, the optical pattern 33 made of a light-reflective material is formed on the first plane 30a constituting the light incident plane of the diffuser plate 30 (substrate 32), as shown in FIGS. 6 and 7. The optical pattern 33 is selectively formed in the effective light-emitting region EA (central portion) of the diffuser plate 30, and is capable of reflecting light from the hot cathode tube 17 toward the backside at a stage prior to incidence on the substrate 32. The optical pattern 33 is formed by printing a paste containing a metal oxide, for example, on the surface of the substrate 32, and has a white-colored surface. The preferred means for printing is screen-printing, ink-jet printing, or the like. The optical pattern 33 is configured to have a plurality of round dots 33a disposed in a zigzag alignment (staggered and alternating manner) on the surface of the substrate 32 at a predetermined distribution density (alignment distance) in a planar view (FIG. 7). The dots 33a constituting the optical pattern 33 has a light reflectance of about 75%, for example, which is larger as compared to in-plane light reflectance of about 30% of the diffuser plate 30. In the embodiment, the light reflectance of each material is an average light reflectance in a measurement diameter of the CM-3700d LAV (with a measurement diameter of φ25.4 mm) manufactured by Konica Minolta Holdings, Inc. In addition, the light reflectance on the optical pattern 33 is measured in a manner that the optical pattern 33 is formed on one entire surface of a glass substrate and the formation surface is measured by the foregoing measurement means.

The diffuser plate 30 has a longer side (along the X-axis direction) and a shorter side (along the Y-axis direction). When patterning (distribution density) of the large number of dots 33a in the optical pattern 33 is changed, light reflectance on the first plane 30a facing the hot cathode tube 17 in the effective light-emitting region EA of the diffuser plate 30 varies along the shorter side as shown in FIG. 8 (refer to FIG. 6). That is, the diffuser plate 30 is generally configured such that a part of the first plane 30a of the effective light-emitting region EA overlapping the hot cathode tube 17 (hereinafter, referred to as light source superimposed portion DA) has larger light reflectance than parts of the first plane 30a of the same not overlapping the hot cathode tube 17 (hereinafter, referred to as light source non-superimposed portion DN), as shown in FIG. 6. In addition, light reflectance on the first plane 30a in the effective light-emitting region EA of the diffuser plate 30 hardly varies along the longer side and is maintained almost uniform as shown in FIG. 9 (refer to FIG. 6).

Distribution of light reflectance given by the optical pattern 33 in the effective light-emitting region EA of the diffuser plate 30 will be described in detail. Light reflectance in the effective light-emitting region EA of the diffuser plate 30 becomes continuously smaller along the shorter side (Y-axis direction) with increasing distance from the hot cathode tube 17, and becomes larger with increasing proximity to the hot cathode tube 17, and the distribution of the light reflectance is normal distribution (drawing a bell-shaped curve), as shown in FIGS. 6 to 8. Specifically, the light reflectance in the effective light-emitting region EA of the diffuser plate 30 becomes maximum at a central position along the shorter side (aligned to the center of the hot cathode tube 17), and becomes minimum at both end positions along the shorter side. The maximum value of the light reflectance is about 65%, for example, and the minimum value of the same is about 30%, for example, which is equal to the light reflectance of the diffuser plate 30. Therefore, it can be said that the optical pattern 33 is less disposed or hardly disposed at the both end positions of the effective light-emitting region EA of the diffuser plate 30 along the shorter side. The optical pattern 33 is patterned so as to be line-symmetric with respect to a first line L1 passing through the center of the diffuser plate 30 and being parallel to the longer side (along the X-axis direction) of the diffuser plate 30 and a second line L2 passing through the center of the diffuser plate 30 and perpendicular to the first line L1 (parallel to the Y-axis direction along the shorter side). FIG. 6 shows the first line L1 and the second line L2 by alternate long and two short dashes lines.

To obtain the foregoing distribution of the light reflectance, the optical pattern 33 is formed in a manner as described below. Specifically, the dots 33a constituting the optical pattern 33 have a maximum area at the central portion in the effective light-emitting region EA of the diffuser plate 30 along the shorter side, that is, the central portion of the hot cathode tube 17. The area of the dots 33a becomes gradually smaller with increasing distance from the central portion, and becomes smallest at the endmost parts in the effective light-emitting region EA of the diffuser plate 30 along the shorter side. That is, the area of the dots 33a is set smaller with increasing distance from the center of the hot cathode tube 17. According to the thus configured diffuser plate 30, it is possible to obtain gentle brightness distribution of illumination light on the entire effective light-emitting region EA of the diffuser plate 30, and therefore realize gentle brightness distribution of illumination light on the entire backlight unit 12. The large number of the dots 33a constituting the optical pattern 33 is formed so as to be line-symmetric with respect to the first line L1 and the second line L2. In addition, as a means for adjusting the light reflectance, the dots 33a of the optical pattern 33 may be unified in area but changed in space therebetween.

Incidentally, the diffuser plate 30 is optically designed on the premise that the diffuser plate 30 is used in a position where the optical pattern 33 faces the back side, that is, the hot cathode tube 17 side (hereinafter, referred to as normal position). In the normal position, light from the hot cathode tube 17 comes into contact with the optical pattern 33 and reflected at a stage prior to entrance into the substrate 32 containing diffusing particles. If the diffuser plate 30 is used in a position reversed from the normal position (hereinafter, referred to as non-normal position), light from the hot cathode tube 17 passes through the substrate 32 containing diffusing particles and then comes into contact with the optical pattern 33 and is reflected. Accordingly, light is subjected to an optical action, applied by the diffuser plate 30, different from that in the case of the normal position, which causes a possibility that the diffuser plate 30 cannot provide expected optical performance. Therefore, when attaching the diffuser plate 30 into the backlight unit 12, the diffuser plate 30 is to be surely placed in the normal position and is not to be placed in the non-normal position by mistake.

Accordingly, it is conceivable to form a partial notch or protrusion at an end portion of the diffuser plate 30, for example, to be able to discriminate the front and back sides of the diffuser plate 30 by the use of the notch or protrusion as a mark. However, to form such a notch or protrusion on the diffuser plate 30, there is a need to add another step of forming the notch or protrusion to the manufacturing process for the diffuser plate 30. This may require modification of a manufacturing device and lengthen a cycle time involved in the manufacture, thereby leading to cost increase.

In light of the foregoing problem, the diffuser plate 30 according to the present embodiment is formed such that a discrimination pattern 34 made of the same material as that for the optical pattern 33 is formed on a first plane 30a of the substrate 32 as a formation surface of the optical pattern 33, as shown in FIG. 6. The discrimination pattern 34 is formed by printing a paste containing a metal oxide, for example, on the surface of the substrate 32, as with the optical pattern 33, and has a surface of a white color. Therefore, on formation of the discrimination pattern 34 on the substrate 32, the manufacturing device (printing device described later) used at the step of forming the optical pattern 33 as an existing step in the manufacturing process for the diffuser plate 30 can also be used, which realizes manufacture of the discrimination pattern 34 at low costs without the need for modifying the manufacturing device or lengthening the cycle time. Layout and configuration of the discrimination pattern 34 will be described below in detail.

First, layout of the discrimination pattern 34 will be described. The discrimination pattern 34 is selectively formed in a formation region of the optical pattern 32 of the substrate 32, that is, a region outside the effective light-emitting region EA, that is, the non-effective light-emitting regions NEA. Accordingly, it is prevented that the discrimination pattern 34 made of a material with light reflectivity exerts influence on light headed toward the effective light-emitting region EA. The discrimination pattern 34 is formed at only one of a pair of end portions (non-effective light-emitting regions NEA) sandwiching the central portion (effective light-emitting regions EA) of the substrate 32 along the shorter side (the Y-axis direction), and is not formed at the other end portion of the same. Specifically, the discrimination pattern 34 is formed at a lower end portion shown in FIG. 6 where the diffuser plate 30 is in the normal position, and the discrimination pattern 34 is not formed an upper end portion shown in FIG. 6. From the foregoing matter, it can be said that the discrimination pattern 34 is formed so as to be non-line-symmetric with respect to the first line L1 passing through the center of the diffuser plate 30 and being parallel to the longer side of the diffuser plate 30 (along the X-axis direction). Therefore, if the diffuser plate 30 is placed in the non-normal position reversed from the normal position around the first line L1 (FIG. 11), the discrimination pattern 34 is disposed at an end portion (the upper side shown in FIG. 11) opposite to that in the normal position. This facilitates discrimination between the normal position of the diffuser plate 30 and the non-normal position of the diffuser plate 30 reversed from the normal position around the first line L1.

A specific configuration of the discrimination pattern 34 will be described. The discrimination pattern 34 is formed by a straight-line portion 35 extending along the longer side of the substrate 32 (along the X-axis direction); and branch portions 36 protruding from the straight-line portion 35 sideways along a direction intersecting with a direction in which the straight-line portion 35 extends. The straight-line portion 35 passes over the entire substrate 32 along the longer side. The straight-line portion 35 is configured to be continuous in a seamless manner from one end edge of the substrate 32 along the longer side to the other end edge on the opposite side.

The branch portions 36 protrude from the straight-line portion 35 only toward one side, not toward the both sides. Specifically, the branch portions 36 protrude from the straight-line portion 35 toward an end of the substrate 30 along a direction parallel to the shorter side, that is, toward a side of the substrate 30 away from the optical pattern 33 (effective light-emitting region EA) side. Therefore, it can be surely prevented that the branch portions 36 configured to protrude from the straight-line portion 35 exert influence on light on the effective light-emitting region EA side. The branch portions 36 are inclined at a predetermined angle with respect to the direction of extension of the straight-line portion 35 (X-axis direction). Specifically, the branch portions 36 each have a right end shown in FIG. 6 as a protruding proximal portion from the straight-line portion 35 and a left end shown in FIG. 6 as a protruding distal portion from the straight-line portion 35, when the diffuser plate 30 is in the normal position. In other words, the branch portions 36 each have a gradient descending leftward (rising rightward) shown in FIG. 6 when the diffuser plate 30 is in the normal position.

The branch portions 36 are each formed by two line segments 36a intermittently disposed along the direction of extension. Of the line segments 36a, the line segment 36a on the protruding proximal side is connected to the straight-line portion 35, whereas the line segment 36a on the protruding distal side is separated from the straight-line portion 35 and the line segment 36a on the protruding proximal side. The two line segments 36a are the same in length, and space between the two line segments 36a is also the same as the length of the line segment 36a. The branch portions 36 are disposed at four locations in parallel along the X-axis direction, and space between the adjacent branch portions 36 (alignment pitch) is almost equal. The branch portions 36 are formed in the same shape so as to be all identical in inclined angle with respect to the straight-line portion 35 and length.

The branch portions 36 are each formed so as to be non-line-symmetric with respect to a third line L3 passing through the center of the branch portion 36 and extending to be perpendicular to the straight-line portion 35 (along the Y-axis direction), as seen, for example, in FIG. 6. Therefore, when the diffuser plate 30 is placed in the non-normal position reversed from the normal position around the second line L2 parallel to the Y-axis direction (FIG. 12), the branch portions 36 are inclined in a direction opposite to that in the normal position, and thus the discrimination pattern 34 is changed in outer shape. This facilitates discrimination between the normal position of the diffuser plate 30 and the non-normal position of the diffuser plate 30 reversed from the normal position around the second line L2. FIG. 6 shows the third line L3 by alternate long and two short dashes lines.

Figure 10:
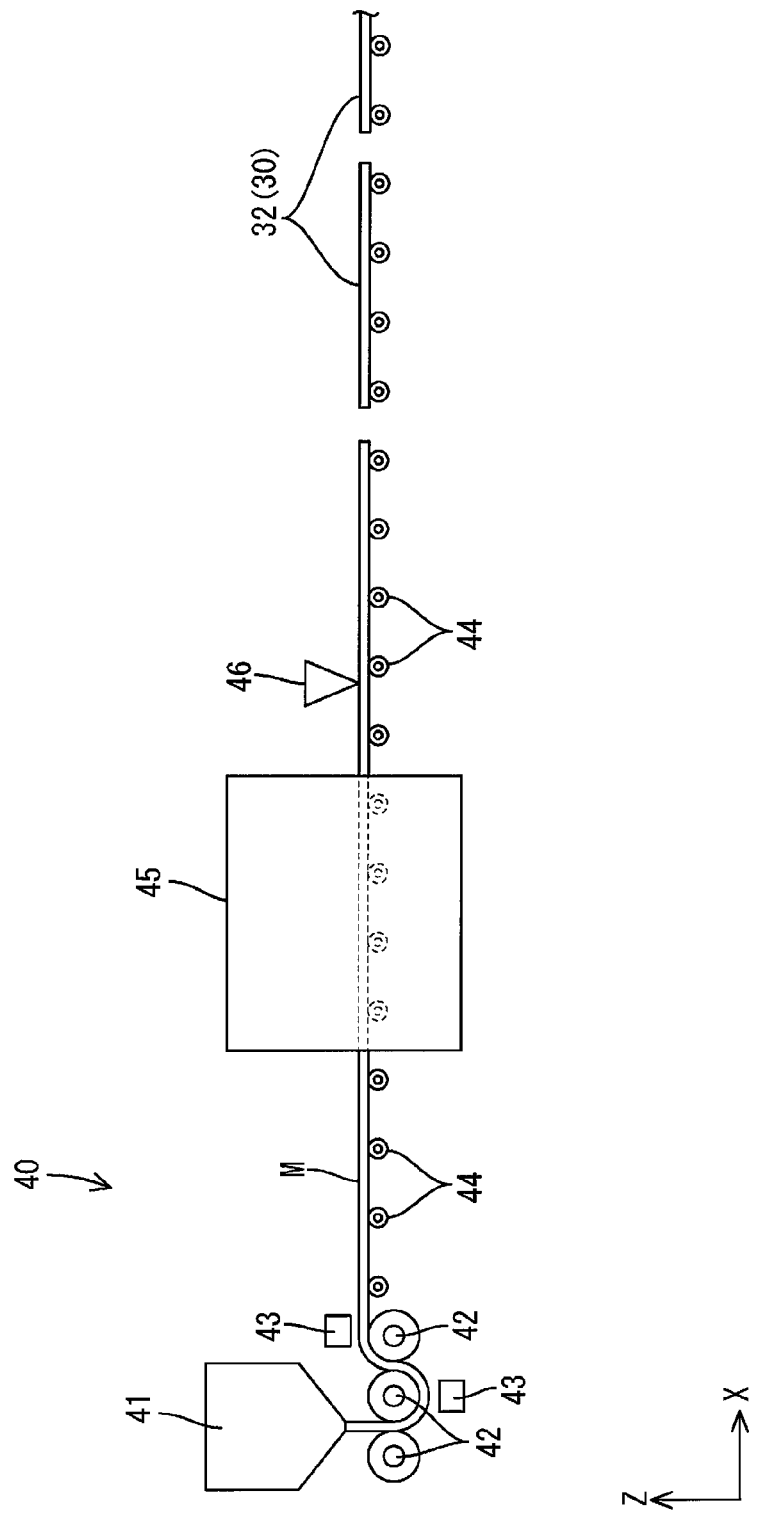
FIG. 10 is a schematic side view of a device for manufacturing the diffuser plate.

Subsequently, a method of manufacturing the thus configured diffuser plate 30 will be described below. The method of manufacturing the diffuser plate 30 includes extruding a parent material M as a material for the substrate 32; forming the optical pattern 33 and the discrimination pattern 34 by the same material on the same surface (the first plane 30a) of the parent material M (substrate 32); and cutting the patterned parent material M to obtain the substrate 32. A manufacturing device 40 for use in manufacture of the diffuser plate 30 is formed by an extruder 41 extruding the parent material M of the substrate 32; a plurality of (three in FIG. 10) rollers 42 sandwiching and transferring the extruded parent material M with thickness unified; a heater 43 heating the parent material M sandwiched by the rollers 42; a transfer roller 44 transferring the parent material M formed by the extruder 41 and the rollers 42; a pattern printer 45 ink-jet printing the optical pattern 33 and the discrimination pattern 34 on the parent material M; and a cutter 46 cutting the parent material M on which the optical pattern 33 and the discrimination pattern 34 are patterned by predetermined length, as shown in FIG. 10. Direction of transfer of the parent material M (substrate 32) at the manufacturing device 40 is aligned to the X-axis direction, that is, the longer side of the diffuser plate 30. Although not shown, the components 41 to 46 constituting the manufacturing device 40 each have a depth adapted to the shorter side of the diffuser plate 30.

At manufacture of the diffuser plate 30, first, at the extruding step, a raw material for the substrate 32 (with thermal flexibility) is heated and mixed, and is extruded from the extruder 41, and then is sandwiched between the rollers 42 and transferred while being formed with an uniform thickness. At that time, the parent material M can be kept in a softened state (melted state) by heating the parent material M as appropriate by the heater 43. Therefore, the parent material M can be formed by the rollers 42. The parent material M formed in a plate-like shape with a uniform thickness is cooled and solidified in the course of transfer by the transfer roller 44.

Subsequently, at the pattern forming step, the pattern printer 45 prints concurrently the optical pattern 33 and the discrimination pattern 34 in a ink-jet manner using the same material, on a plate surface of the parent material M opposite to the transfer roller 44 side. Thus, the optical pattern 33 and the discrimination pattern 34 can be collectively formed by the same pattern printer 45 at the same step, which makes it possible to reduce costs related to the manufacturing device 40 and shorten a cycle time involved in manufacture, as compared to the case where the pattern printer 45 is set as a device dedicated to the optical pattern 33 and a separate device dedicated to the discrimination pattern 34 is prepared. The discrimination pattern 34 has the straight-line portion 35 configured to extend along the X-axis direction, that is, the direction in which the parent material M (substrate 32) is transferred, which facilitates driving of an ink-jet head (not shown) included in the pattern printer 45 on ink-jet printing, without the need for a complicated driving operation. Therefore, the pattern printer 45 is less prone to cause trouble or the like, which contributes to reduction in manufacturing cost. At the cutting step, the parent material M on which the optical pattern 33 and the discrimination pattern 34 are formed through the pattern forming step, is cut by the cutter 46 by predetermined length, thereby obtaining the diffuser plate 30 (substrate 32).

The thus manufactured diffuser plate 30 is assembled into the backlight unit 12 manufactured according to the following procedure. On manufacture of the backlight unit 12, first, the reflection sheet 20 is laid in the chassis 14, and then the hot cathode tube 17 is housed in the chassis 14. Subsequently, a pair of holders 19 is attached to the end portions of the chassis 14 along the longer side so as to cover the both end portions of the hot cathode tube 17 by the holders 19 (FIGS. 3 and 4). After that, the diffuser plate 30 and the optical sheet 31 constituting the optical member 15 are subsequently attached to the chassis 14 so as to cover the opening 14e.

Figure 11:
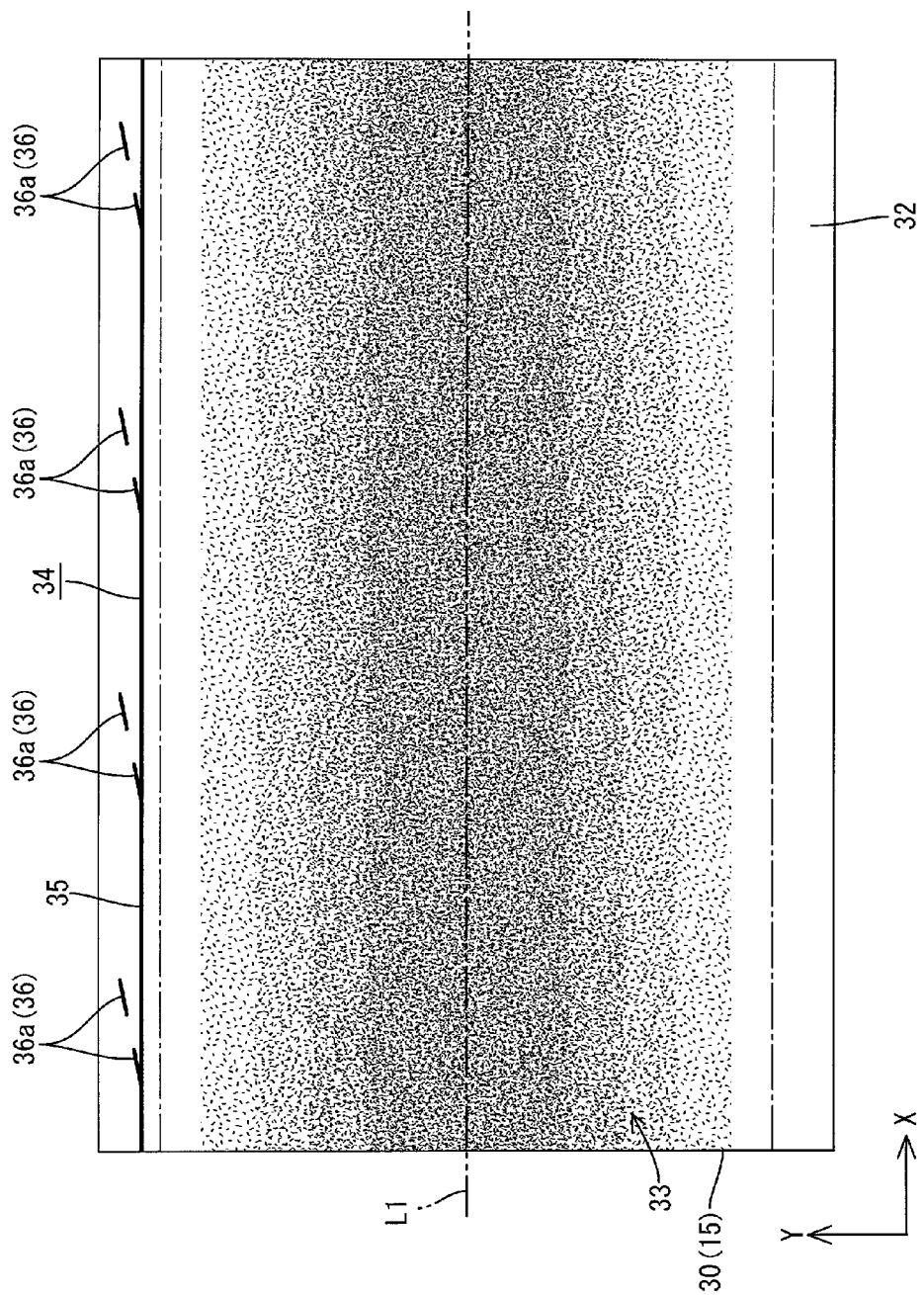
FIG. 11 is a plane view of the diffuser plate in a non-normal position reversed around a first line along an X-axis direction from a normal position.
Figure 12:
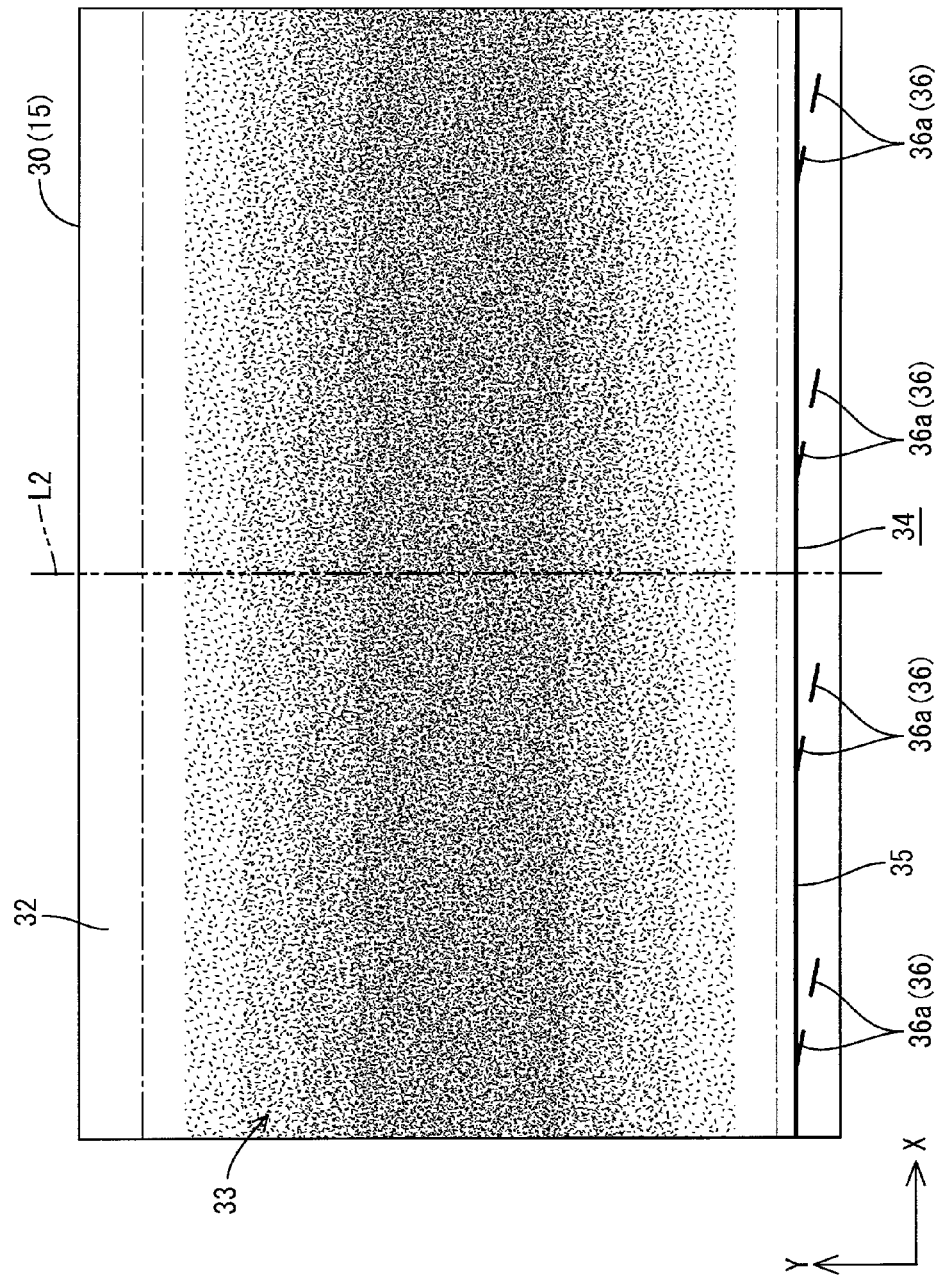
FIG. 12 is a plane view of the diffuser plate in a non-normal position reversed around a second line along a Y-axis direction from a normal position.

In the present embodiment, on attachment of the diffuser plate 30, the front and back sides of the diffuser plate 30 are discriminated such that the diffuser plate 30 is in the normal position. Specifically, when the diffuser plate 30 (substrate 32) is in the normal position, as shown in FIG. 6, the discrimination pattern 34 is disposed at the lower end portion of the diffuser plate 30, and the branch portions 36 are inclined with a gradient descending leftward (rising rightward) in FIG. 6. If the diffuser plate 30 is in the non-normal position reversed from the normal position around the first line L1 parallel to the longer side (X-axis direction), as shown in FIG. 11, the optical pattern 33 line-symmetric with the first line L1 does not change, whereas the discrimination pattern 34 is disposed at the upper end portion of the diffuser plate 30 shown in FIG. 11, that is, at the end portion opposite to that in the normal position, and therefore the discrimination pattern 34 is vertically reversed. Meanwhile, if the diffuser plate 30 is in the non-formal position reversed from the normal position around the second line L2 parallel to the shorter side (Y-axis direction), as shown in FIG. 12, the optical pattern 33 line-symmetric with respect to the second line L2 does not change, whereas the discrimination pattern 34 is disposed on the lower side shown in FIG. 12, as in the normal position, but the discrimination pattern 34 is horizontally reversed. Accordingly, the branch portions 36 are inclined with a gradient descending rightward (rising leftward) shown in FIG. 12, that is, with a gradient opposite to that in the normal position. Therefore, if "the discrimination pattern 34 is recognized at the end portion opposite to that in the normal position" or if "the branch portions 36 are recognized as inclined lines with a gradient opposite to that in the normal position", it is revealed that "the diffuser plate 30 is in the non-normal position reversed from the normal position", which allows an operator to return the diffuser plate 30 to the normal position and attach the same correctly to the chassis 14. Accordingly, it is possible to discriminate between the normal position of the diffuser plate 30 and the non-normal position of the diffuser plate 30 reversed from the normal position, through visually checking of the discrimination pattern 34. This prevents that the diffuser plate 30 in the incorrect position is attached to the backlight unit 12. Accordingly, it is possible to provide normal optical performance of the diffuser plate 30 and assure appropriate light emitted from the backlight unit 12.

After attaching the optical members 15 to the chassis 14, the frame 16 is assembled into the chassis 14 to obtain the backlight unit 12. Subsequently, the liquid crystal panel 11 and the bezel 13 are assembled into the backlight unit 12 to obtain the liquid crystal display device 10. When the hot cathode tube 17 is illuminated for use of the liquid crystal display panel 10, light emitted from the hot cathode tube 17 is entered directly into the first plane 30a (formation surface of the optical pattern 33) of the diffuser plate 30 or is reflected on the members (the holders 19, the reflection sheet 20, and the like) disposed in the chassis 14 and indirectly entered into the first plane 30a of the diffuser plate 30. After passing through the diffuser plate 30, the light is output toward the liquid crystal panel 11 through the optical sheet 31.

The light reflecting feature of the diffuser plate 30 will be described in detail. The first plane 30a of the diffuser plate 30 into which light emitted from the hot cathode tube 17 enters, has the optical pattern 33 with in-plane light reflectance varying by region as shown in FIG. 6, which makes it possible to control appropriately the light incident efficiency for each region. Specifically, the light source superimposed portion DA of the first plane 30a overlapping the hot cathode tube 17 receives much direct light from the hot cathode tube 17 and thus has relatively larger quantity of light than that in the light source not-superimposed portions DN. Accordingly, by making the light reflectance (area of the dots 33a) of the optical pattern 33 relatively large at the light source superimposed portion DA (refer to FIGS. 6 and 8), it is possible to suppress (regulate) the incidence of light on the first plane 30a and reflect and return much light to the chassis 14. Meanwhile, the light source non-superimposed portions DN of the first plane 30a not overlapping the hot cathode tube 17 receive less direct light from the hot cathode tube 17, and thus have relatively smaller quantity of light than that in the light source superimposed portion DA. Accordingly, by making the light reflectance (area of the dots 33a) of the optical pattern 33 relatively small at the light source non-superimposed portions DN (refer to FIGS. 6 and 8), it is possible to facilitate incidence of light on the first plane 30a. At that time, light reflected toward the chassis 14 by the optical pattern 33 of the light source superimposed portion DA is guided by the reflection sheet 20 or the like to the light source non-superimposed portions DN for compensating the quantity of light, which makes it possible to provide sufficient quantity of light incident on the light source non-superimposed portions DN.

The light emitted from the hot cathode tube 17 is subjected to the foregoing optical action in the course of passing through the diffuser plate 30, and is converted into almost even planar light without unevenness in the plane of the diffuser plate 30, and then is further subjected to an optical action through the optical sheets 31 and radiated to the liquid crystal panel 11. Thus, the light emitted from the backlight unit 12 is less prone to cause uneven brightness, which makes it possible to improve display quality of the liquid crystal display device 10.

As described above, the diffuser plate 30 as the optical member 15 according to the present embodiment, includes: the transmissive substrate 32; the optical pattern 33 formed on the substrate 32 and applying an optical action to light; and the discrimination pattern 34 configured to discriminate the first position (normal position) of the substrate 32 and the second position (non-normal position) of the substrate 32 reversed from the first position, and formed on the first plane 30a as a formation surface of the optical pattern 33 of the substrate 32, and made of the same material as that for the optical pattern 33.

Accordingly, it is possible to discriminate between the first position (normal position) of the substrate 32 and the second position (non-normal position) of the substrate 32 reversed from the first position, through visual checking of the discrimination pattern 34. The discrimination pattern 34 is formed on the first plane 30a as a formation surface of the optical pattern 33 of the substrate 32, and is made of the same material as that for the optical pattern 33, whereby the discrimination pattern 34 can be formed at the step of forming the optical pattern 33 on manufacture of the diffuser plate 30. Therefore, there is no need to add any special step or device for formation of the discrimination pattern 34, which allows the discrimination pattern 34 to be formed at low costs. According to the present embodiment, the front and back sides of the substrate 32 can be discriminated at low costs.

In addition, the discrimination pattern 34 is formed so as to be non-line-symmetric with respect to at least one of the first line L1 passing through a center of the substrate 32 and being parallel to a side (longer side) of the substrate 32 and the second line L2 passing through the center of the substrate 32 and being perpendicular to the first line L1. Accordingly, it is possible to discriminate between the first position of the substrate 32 and the second position of the substrate 32 reversed from the first position around at least one of the first line L1 and the second line L2.

The discrimination pattern 34 is formed so as to be non-line-symmetric with respect to both the first line L1 and the second line L2. Accordingly, it is possible to discriminate the first position of the substrate 32 and the second position of the substrate 32 reversed from the first position around the first line L1. It is also possible to discriminate the first position of the substrate 32 and the second position of the substrate 32 reversed from the first position around the second line L2.

The optical pattern 33 is formed at the center of the substrate 32 (effective light-emitting region EA), whereas the discrimination pattern 34 is formed at one of a pair of ends (non-effective light-emitting regions NEA) sandwiching the center of the substrate 32. Accordingly, the orientation of the discrimination pattern 34 is reversed across the center between the case where the substrate 32 is in the first position and the case where the substrate 32 is in the second position reversed from the first position around a line passing through the center of the substrate 32 and being perpendicular to the direction in which the center and the one end are aligned (Y-axis direction). This allows the position of the substrate 32 to be discriminated in a much easier manner.

The optical pattern 33 is formed so as to be line-symmetric with respect to the L1 passing through the center of the substrate 32 and being perpendicular to the direction in which the central portion and a pair of ends are aligned (Y-axis direction). Accordingly, the optical pattern 33 makes no change between the case where the substrate 32 is in the first position and the case where the substrate 32 is in the second position reversed from the first position around the line L1 passing through the center of the substrate 32 and being perpendicular to the direction of alignment of the central portion and the pair of ends (Y-axis direction). However, discrimination can be made through visual checking of the changing discrimination pattern 34.

The discrimination pattern 34 has a straight-line portion 35 extending along a side of the substrate 32. Accordingly, the discrimination pattern 34 can be recognized more easily by the straight-line portion 35 configured to extend along the side of the substrate 32, as compared to the case where the discrimination pattern is formed as a point-like pattern, which makes it possible to improve workability in relation to the discrimination. In addition, the discrimination pattern 34 with the straight-line portion 35 can be easily formed on the substrate 32 at manufacture of the diffuser plate 30.

The straight-line portion 35 passes over the substrate 32 from one end edge to the other end edge on an opposite side of the one end edge. Accordingly, the discrimination pattern 34 can be recognized in an easier manner, which makes it possible to further improve workability in relation to the discrimination.

The straight-line portion 35 continues for the entire length. Accordingly, the discrimination pattern 34 can be recognized in a much easier manner, which makes it possible to further improve workability in relation to the discrimination.

The substrate 32 has a horizontally long rectangular shape, and the straight-line portion 35 extends along a longer side of the substrate 32. Accordingly, the discrimination pattern 34 can be recognized more easily by the straight-line portion 35 configured to extend along the longer side of the substrate 32, which makes it possible to further improve workability in relation to discrimination.

The discrimination pattern 34 has branch portions 36 protruding sideways from the straight-line portion 35. Accordingly, the discrimination pattern 34 has the straight-line portion 35 and the branch portions 36 protruding sideways from the straight-line portion 35, and thus can be more likely to be recognized on discrimination, which results in further improvement of workability.

A plurality of branch portions 36 is disposed parallel to each other at equal space therebetween. Accordingly, the discrimination pattern 34 can be more likely to be recognized by forming a plurality of the branch portions 36 with equal space therebetween. In addition, the discrimination pattern 34 having a plurality of branch portions 36 on the substrate 32 can be formed at manufacture of the diffuser plate 30.

The plurality of branch portions 36 has the same shape. Accordingly, the discrimination pattern 34 having a plurality of the branch portions 36 can be easily formed.

The branch portions 36 protrude from the straight-line portion 35 toward one side. Accordingly, the discrimination pattern 34 can be placed in a smaller space on the substrate 32, as compared to the case where the branch portions protrude from the straight-line portion 35 toward the both sides. Therefore, this helps to make the liquid crystal display device 10 smaller in its frame.

The optical pattern 33 is disposed at the center of the substrate 32, whereas the discrimination pattern 34 is disposed on an end of the substrate 32. The branch portions 36 protrude from the straight-line portion 35 toward ends. Accordingly, it is possible to reduce a possibility that the branch portions 36 have optical influence on light to which an optical action is applied by the optical pattern 33, as compared to the case where the branch portions 36 protrude from the straight-line portion 35 toward the center, that is, toward the optical pattern 33. This allows the diffuser plate 30 to provide favorable optical performance.

The branch portions 36 are formed so as to be non-line-symmetric with respect to the line L2 passing through the center of the branch portions 36 and being perpendicular to the straight-line portion 35. Accordingly, the branch portions 36 change in shape between the case where the substrate 32 is in the first position and the case where the substrate 32 is in the second position reversed from the first position, which further facilitates the discrimination.

The branch portions 36 are angled to the straight-line portion 35. Accordingly, the discrimination pattern 34 can be recognized more easily by the branch portions 36 angled to the straight-line portion 35.

The branch portions 36 are formed by a plurality of intermittently disposed line segments 36a. Accordingly, the discrimination pattern 34 can be formed by a smaller amount of material, as compared to the case where the branch portions continue for the entire length, which allows the discrimination pattern 34 to be formed at low costs.

The optical pattern 33 and the discrimination pattern 34 are made from a light-reflective material. Accordingly, light reflectance on a formation surface of the optical pattern 33 in the substrate 32 can be controlled by a design of the optical pattern 33.

The optical pattern 33 is formed by a large number of approximately point-like dots 33a on the first plane 30a as the formation surface of the optical pattern 33 in the substrate 32. Accordingly, light reflectance on the formation surface of the optical pattern 33 in the substrate 32 can be easily controlled by an aspect of the dots 33a (area, distribution density, and the like).

The optical pattern 33 and the discrimination pattern are colored in white. This achieves favorable light reflectance. In addition, the discrimination pattern 34 can be easily recognized.

Next, to solve the foregoing problem, a backlight unit 12 of the present embodiment includes: the diffuser plate 30; the chassis 14 having the opening 14e on the light output side and the diffuser plate 30 disposed so as to cover the opening 14e; and the hot cathode tubes 17 as a light source housed in the chassis 14 and configured to radiate light to the diffuser plate 30. According to the backlight unit 12, front and back sides of the substrate 32 can be discriminated by the diffuser plate 30 passing light emitted from the hot cathode tube 17 at low costs, which leads to reduction in costs of manufacturing the backlight unit 12.

The chassis 14 has a portion facing the diffuser plate 30 that is divided into the light source placement region LA where the hot cathode tube 17 is disposed and the light source non-placement regions LN where the hot cathode tube 17 is not disposed, whereas the diffuser plate 30 has the optical pattern 33 made of a light-reflective material and is formed such that a part overlapping the light source placement region LA (light source superimposed portion DA) is larger in light reflectance provided by the optical pattern 33 than parts overlapping the light source non-placement regions LN (light source non-superimposed portions DN). Accordingly, light emitted from the hot cathode tube 17 first reaches the part of the diffuser plate 30 with relatively large light reflectance given by the optical pattern 33 (light source superimposed portion DA), and therefore most of the light is reflected by the optical pattern 33 (that is, not passed through), whereby the brightness of illumination light is suppressed with respect to an amount of light emitted from the hot cathode tube 17. Meanwhile, the light reflected here can be reflected in the chassis 14 so as to reach the light source non-placement regions LN. The parts of the diffuser plate 30 overlapping the light source non-placement regions LN (light source non-superimposed portions DN) is relatively small in light reflectance given by the optical pattern 33, and therefore much more light can be passed through, thereby obtaining desired brightness of illumination light.

The diffuser plate 30 is divided into an effective light-emitting region EA overlapping the entire light source placement region LA and the most part of the light source non-placement regions LN adjacent to the light source placement region LA and using efficiently emitted light; and non-effective light-emitting regions NEA overlapping part of the light source non-placement regions LN. The optical pattern 33 is formed in the effective light-emitting region EA, whereas the discrimination pattern 34 is formed in the non-effective light-emitting regions NEA. Accordingly, the optical pattern 33 is formed in the effective light-emitting region EA of the diffuser plate 30, and therefore desired emitted light can be obtained by subjecting light from the hot cathode tube 17 to an optical action by the optical pattern 33. Meanwhile, the discrimination pattern 34 is disposed in the non-effective light-emitting regions NEA of the diffuser plate 30, whereby it is possible to prevent the discrimination pattern 34 from exercising optical influence on the emitted light in the effective light-emitting region EA and assure favorable emitted light.

The diffuser plate 30 has light reflectance given by the optical pattern 33 that becomes smaller with increasing distance from the hot cathode tube 17. Accordingly, it is possible to achieve even brightness of illumination light in the light source placement region LA and the light source non-placement regions LN.

The chassis 14 has a part facing the diffuser plate 30 that is divided at least into a first end portion 14A; a second end portion 14B opposite to the first end portion 14A; and a central portion 14C sandwiched between the first end portion 14A and the second end portion 14B. The central portion 14C is the light source placement region LA, and the first end portion 14A and the second end portion 14B are the light source non-placement regions LN. Accordingly, it is possible to provide sufficient brightness at the central portion of the backlight unit 12, and thus provide sufficient brightness at a central portion of display at the liquid crystal display device 10 including the backlight unit 12, thereby obtaining favorable visibility.

The liquid crystal display device 10 according to the present embodiment includes the backlight unit 12, and a liquid crystal display panel 11 providing display utilizing light from the backlight unit 12. According to the liquid crystal display panel 10, the backlight unit 12 supplying light to the liquid crystal panel 11 is manufactured at low costs, which leads to reduction in costs of manufacturing the entire display device. In addition, the liquid crystal display device 10 is also suitable for large-screen display devices.

The liquid crystal panel 11 is divided into a display region AA at a center displaying an image and a non-display region NAA on end sides of the display region AA. In the diffuser plate 30, the optical pattern 33 is formed at a part overlapping the display region AA, whereas the discrimination pattern 34 is formed at parts overlapping the non-display regions NAA. Accordingly, favorable display quality can be obtained by subjecting light supplied to the display region AA of the liquid crystal panel 11 to an optical action by the optical pattern 33. Meanwhile, it is possible to prevent that the discrimination pattern 34 exerts optical influence on light supplied to the display region AA of the liquid crystal panel 11, thereby assuring high display quality.

A method of manufacturing the diffuser plate 30 of the present embodiment including: extruding the substrate 32; and forming the optical pattern 33 and the discrimination pattern 34 by the same material on the same surface of the substrate 32. Accordingly, in the pattern forming step, the optical pattern 33 and the discrimination pattern 34 can be formed by the same material on the first plane 30a as the same surface of the substrate 32 obtained in the extruding step. Therefore, there is no need to add any special step or device for formation of the discrimination pattern 34, which allows the discrimination pattern 34 to be formed at low costs. In addition, it is possible to discriminate the first position of the manufactured substrate 32 and the second position of the same reversed from the first position by visual checking of the discrimination pattern 34.

In the foregoing manufacturing method, the substrate 32 is transferred along a direction in which the straight-line portion 35 extends. Accordingly, at the pattern forming step, the discrimination pattern 34 is formed on the transferred substrate 32. At that time, the direction in which the straight-line portion 35 of the discrimination pattern 34 extends and the direction in which the substrate 32 is transferred, are aligned to each other, which facilitates formation of the discrimination pattern 34.

As in the foregoing, the first embodiment of the present invention is described above. However, the present invention is not limited to the foregoing embodiment, and may include modifications described below, for example. In the following modifications, the same members as those in the foregoing embodiment are given the same reference codes as those in the foregoing embodiment, and illustrations and descriptions of those members are omitted.

<First Modification of the First Embodiment>

A first modification of the first embodiment will be described with reference to FIG. 13. In the first modification, a discrimination pattern 34-1 is modified in mode.

Figure 13:
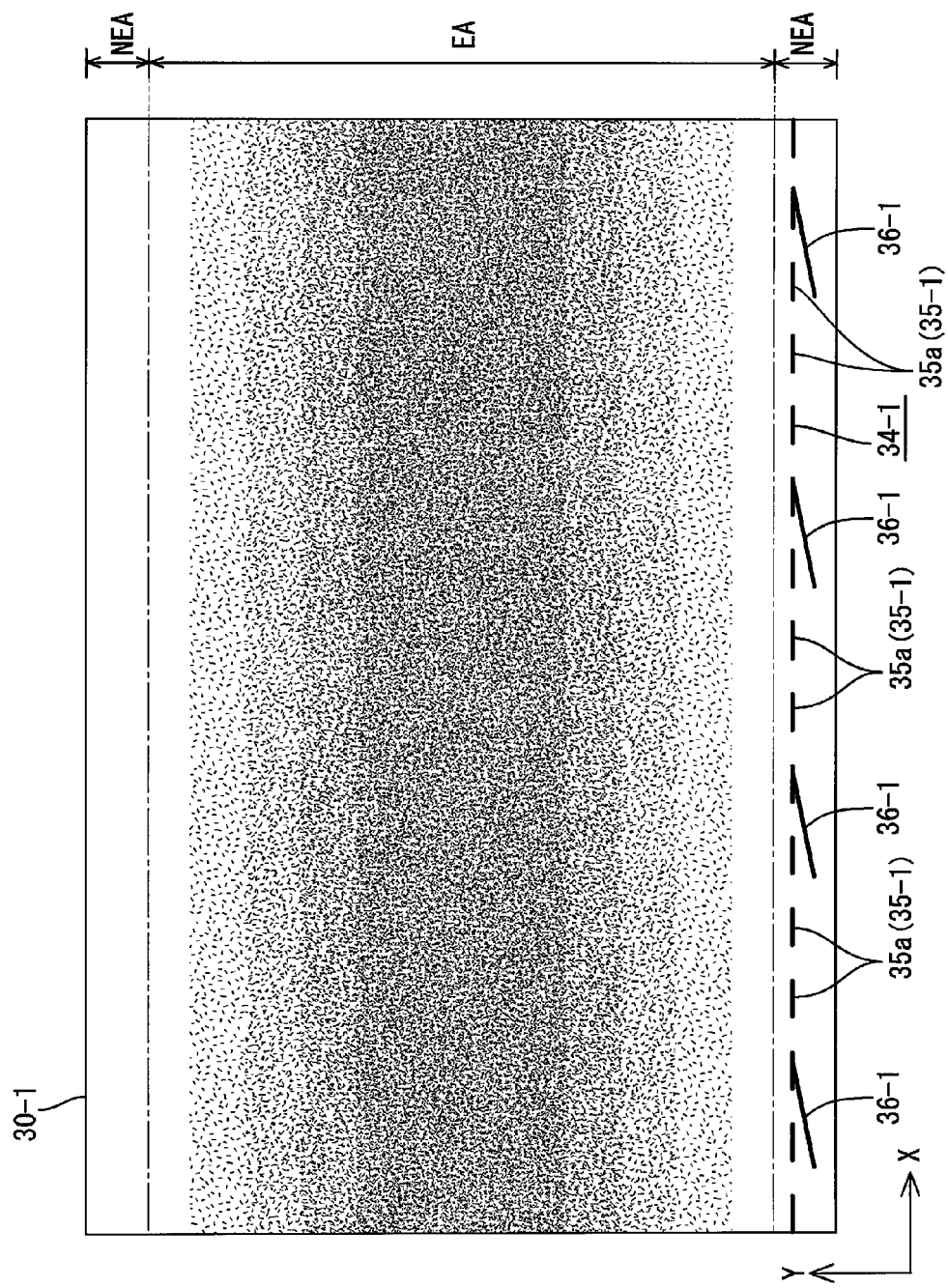
FIG. 13 is a plane view of a discrimination pattern on a diffuser plate according to a first modification of the first embodiment.

A straight-line portion 35-1 constituting the discrimination pattern 34-1 is formed by a plurality of intermittently disposed line segments 35a, as shown in FIG. 13. The line segments 35a are formed in a straight line along the X-axis direction in which the straight-line portion 35-1 extends. Meanwhile, branch portions 36-1 continue for the entire length in a seamless manner. That is, in the present modification, the straight-line portion 35-1 and the branch portions 36-1 are reversed in form (continuous/discontinuous) from those in the first embodiment. Accordingly, it is possible to reduce material costs for formation of the straight-line portion 35-1 requiring a larger amount of material as compared to the branch portions 36-1, which is more preferred to reduction in manufacturing cost for a whole diffuser plate 30-1.

According to the present modification as described above, the straight-line portion 35-1 is formed by a plurality of intermittently disposed line segments 35a. Accordingly, the discrimination pattern 34 can be made by a smaller amount of material as compared to the case where the straight-line portion continues for the entire length, which makes it possible to form the discrimination pattern 34 at low costs.

<Second Modification of the First Embodiment>

A second modification of the first embodiment will be described with reference to FIG. 14. In the present modification, of a discrimination pattern 34-2, a straight-line portion 35-1 is the same as that in the first modification, and the branch portions 36 are the same as those in the first embodiment.

Figure 14:
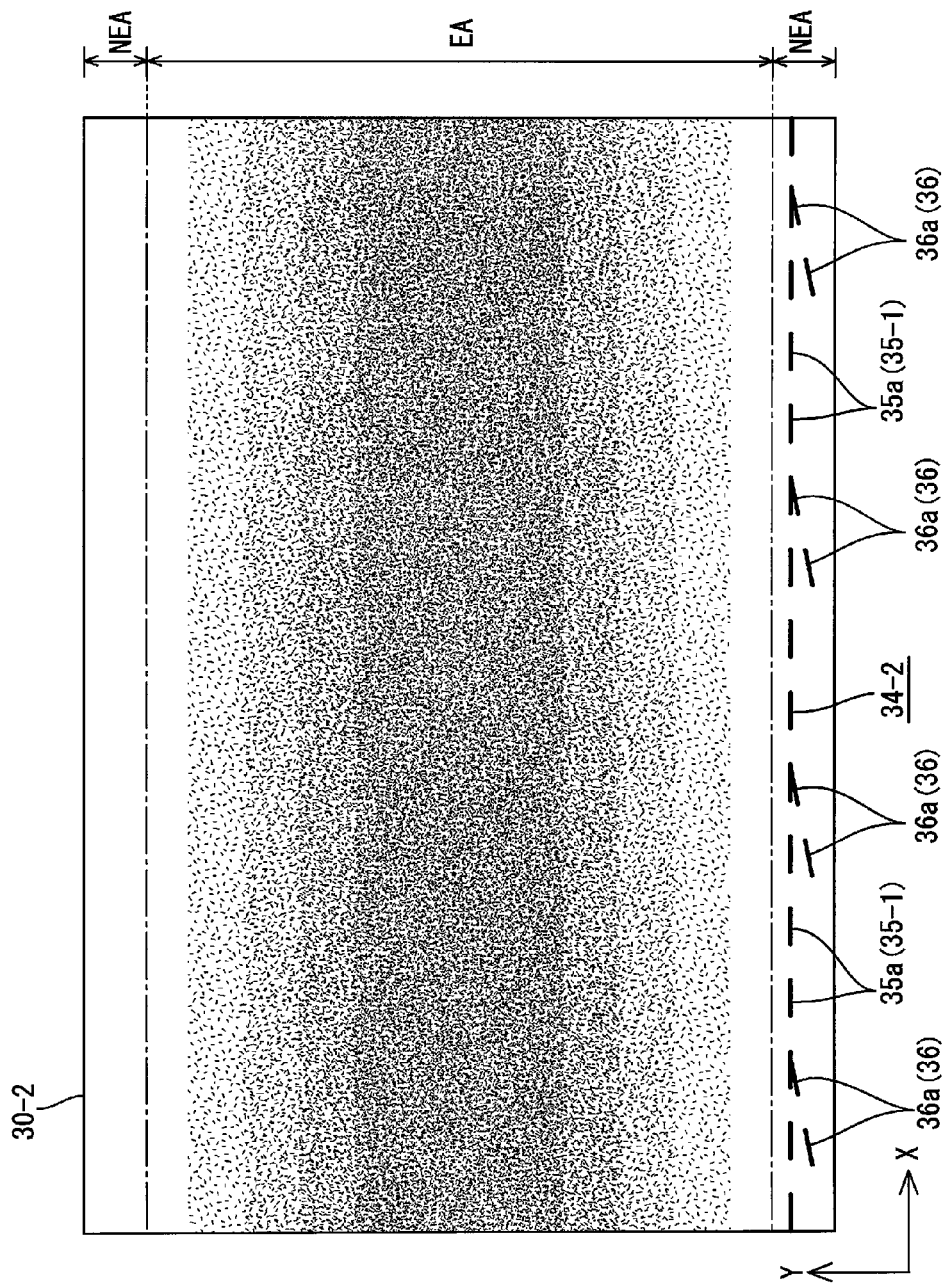
FIG. 14 is a plane view of a discrimination pattern on a diffuser plate according to a second modification of the first embodiment.

The straight-line portion 35-1 and the branch portions 36 constituting the discrimination pattern 34-2 are formed by a plurality of intermittently disposed line segments 35a and 36a as shown in FIG. 14. Accordingly, it is possible to further reduce material costs for formation of the discrimination pattern 34-2 as compared to the first modification, which makes it possible to reduce manufacturing costs for a whole diffuser plate 30-2 in a more preferable manner.

<Third Modification of the First Embodiment>

A third modification of the first embodiment will be described with reference to FIG. 15. In the present modification, a pair of discrimination patterns 34-3 is formed.

Figure 15:
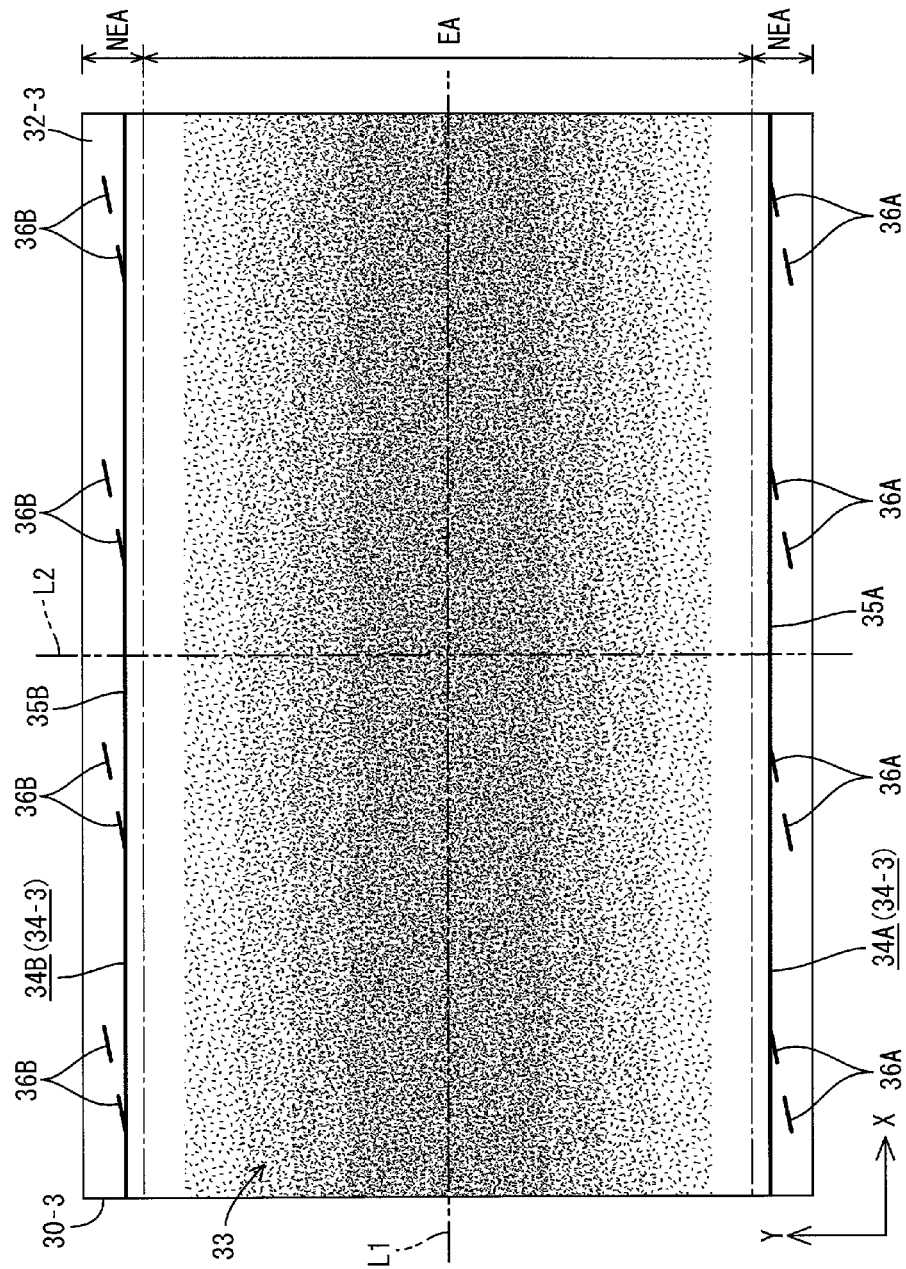
FIG. 15 is a plane view of a discrimination pattern on a diffuser plate according to a third modification of the first embodiment.

As shown in FIG. 15, the discrimination patterns 34-3 are formed at both end portions (both non-effective light-emitting regions NEA) sandwiching the central portion (effective light-emitting region EA) of a diffuser plate 30-3 (substrate 32-3) along the shorter side. The discrimination patterns 34-3 are formed by a first discrimination pattern 34A disposed at a lower end portion shown in FIG. 15 and a second discrimination pattern 34B disposed at an upper end portion shown in FIG. 15. The first discrimination pattern 34A is the same in shape as the discrimination pattern 34 in the first embodiment, and therefore detailed description of the same is omitted here. The second discrimination pattern 34B is formed by a straight-line portion 35B configured to pass over the entire substrate 32-3 along the longer side (X-axis direction); and four branch portions 36B protruding from the straight-line portion 35B toward end sides, that is, sides opposite to the effective light-emitting region EA, as with the first discrimination pattern 34A. The branch portions 36B are the same in shape and layout as the branch portions 36A of first discrimination pattern 34A, and are also the same in gradient with respect to the straight-line portion 35B as the branch portions 36A (descending leftward in FIG. 15). In addition, the first discrimination pattern 34A and the second discrimination pattern 34B are formed so as to be non-line-symmetric with respect to both the first line L passing through the center of the diffuser plate 30-3 and being parallel to the longer side of the diffuser plate 30-3 and the second line L2 passing through the center of the diffuser plate 30-3 and being perpendicular to the first line L1. Therefore, if the diffuser plate 30-3 is placed in the non-normal position reversed from the normal position shown in FIG. 15 around the first line L1, and if the diffuser plate 30-3 is placed in the non-normal position reversed from the normal position around the second line L2, the branch portions 36A and 36B in the both discrimination patterns 34A and 34B each have a gradient descending rightward, which is opposite to that in the normal position. This makes it easy to discriminate between the normal position of the diffuser plate 30-3 and the non-normal position of the diffuser plate 30-3 reversed from the normal position.

According to the present modification as described above, the optical pattern 33 is formed at the central portion of the substrate 32-3, whereas the discrimination pattern 34-3 is formed by the first discrimination pattern 34A formed at one of a pair of end portions of the substrate 32-3 sandwiching the central portion and the second discrimination pattern 34B formed at the other end portion. Accordingly, the discrimination pattern 34-3 can be further improved in visibility by forming the same at the both end portions of the substrate 32-3.

In addition, the first discrimination pattern 34A and the second discrimination pattern 34B are formed so as to be non-line-symmetric with respect to the line L1 passing through the center of the substrate 32-3 and being perpendicular to the direction in which the central portion, the one end portion, and the other end portion are aligned (Y-axis direction). Accordingly, the first discrimination pattern 34A and the second discrimination pattern 34B are reversed in orientation and changed in shape between the case where the substrate 32-3 is in the first position (normal position) and the case where the substrate 32-3 is in the second position (non-normal position) reversed from the first position around the line L1 passing through the center of the substrate 32-3 and being perpendicular to the direction in which the central portion, the one end portion, and the other end portion are aligned, which further facilitates discrimination between the first position and the second position.

<Fourth Modification of the First Embodiment>

A fourth modification of the first embodiment will be described with reference to FIG. 16. In the present modification, the number of branch portions 36B-4 is modified from that in the third modification.

Figure 16:
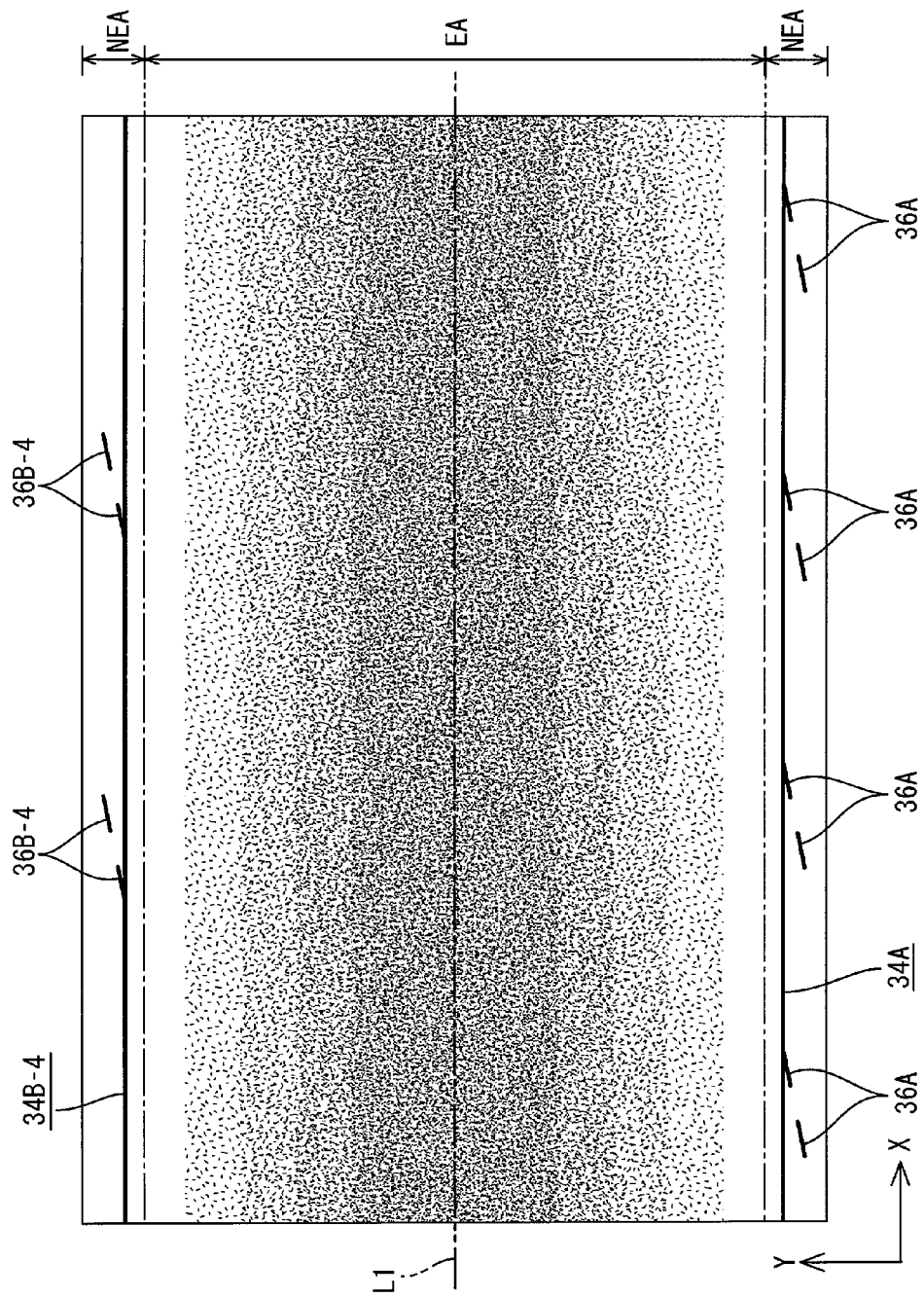
FIG. 16 is a plane view of a discrimination pattern on a diffuser plate according to a fourth modification of the first embodiment.

The branch portions 36B-4 constituting a second discrimination pattern 34B-4 are formed by two each as shown in FIG. 16, which is different from the (four) branch portions 36A of the first discrimination pattern 34A. Accordingly, if a diffuser plate 30-4 is in the non-normal position by reversing from the normal position around the first line L1, the numbers of the branch portions 36A and 36B-4 are changed from those in the normal position at upper and lower end portions of the diffuser plate 30-4, which further facilitates discrimination between the normal position and the non-normal position with excellent workability.

<Fifth Modification of the First Embodiment>

A fifth modification of the first embodiment will be described with reference to FIG. 17. In the present modification, the numbers of branch portions 36A-5 and 36B-5 are further modified from those in the fourth modification.

Figure 17:
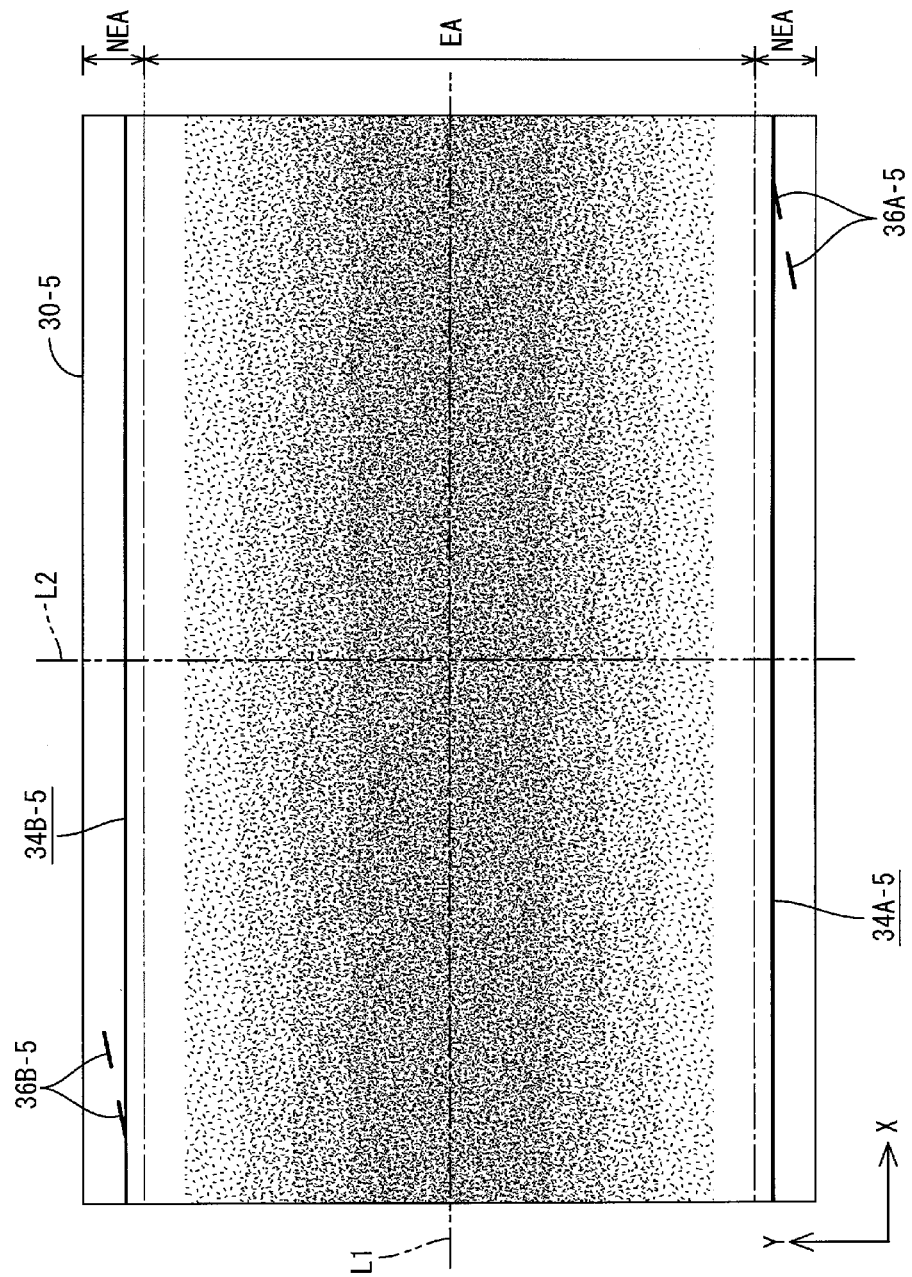
FIG. 17 is a plane view of a discrimination pattern on a diffuser plate according to a fifth modification of the first embodiment.

The branch portion 36A-5 constituting a first discrimination pattern 34A-5 and the branch portion 36B-5 constituting a second discrimination pattern 34B-5, are formed by one each as shown in FIG. 17. The branch portion 36A-5 of the first discrimination pattern 34A-5 is disposed closer to the right end shown in FIG. 17, that is, at a lower right corner of a diffuser plate 30-5, whereas the branch portion 36B-5 of the second discrimination pattern 34B-5 is disposed closer to the left end shown in FIG. 17, that is, at an upper left corner of the diffuser plate 30-5. Therefore, if the diffuser plate 30-5 is placed in the non-normal position by reversing from the normal position around the first line L1, and if the diffuser plate 30-5 is placed in the non-normal position by reversing from the normal position around the second line L2, the branch portions 36A-5 and 36B-5 of the discrimination patterns 34A-5 and 34B-5 each have a gradient descending rightward, which is opposite to that in the normal position, and the branch portions 36A-5 and 36B-5 are disposed at the upper right corner and lower left corner of the diffuser plate 30-5, respectively, which are opposite to those in the normal position. Accordingly, it is possible to further facilitate discrimination between the normal position of the diffuser plate 30-5 and the non-normal position of the diffuser plate 30-5 reversed from the normal position, with excellent workability.

<Sixth Modification of the First Embodiment>

A sixth modification of the first embodiment will be described with reference to FIG. 18. In the present modification, branch portions 36B-6 constituting a second discrimination pattern 34B-6 are modified in gradient from that in the third modification.

Figure 18:
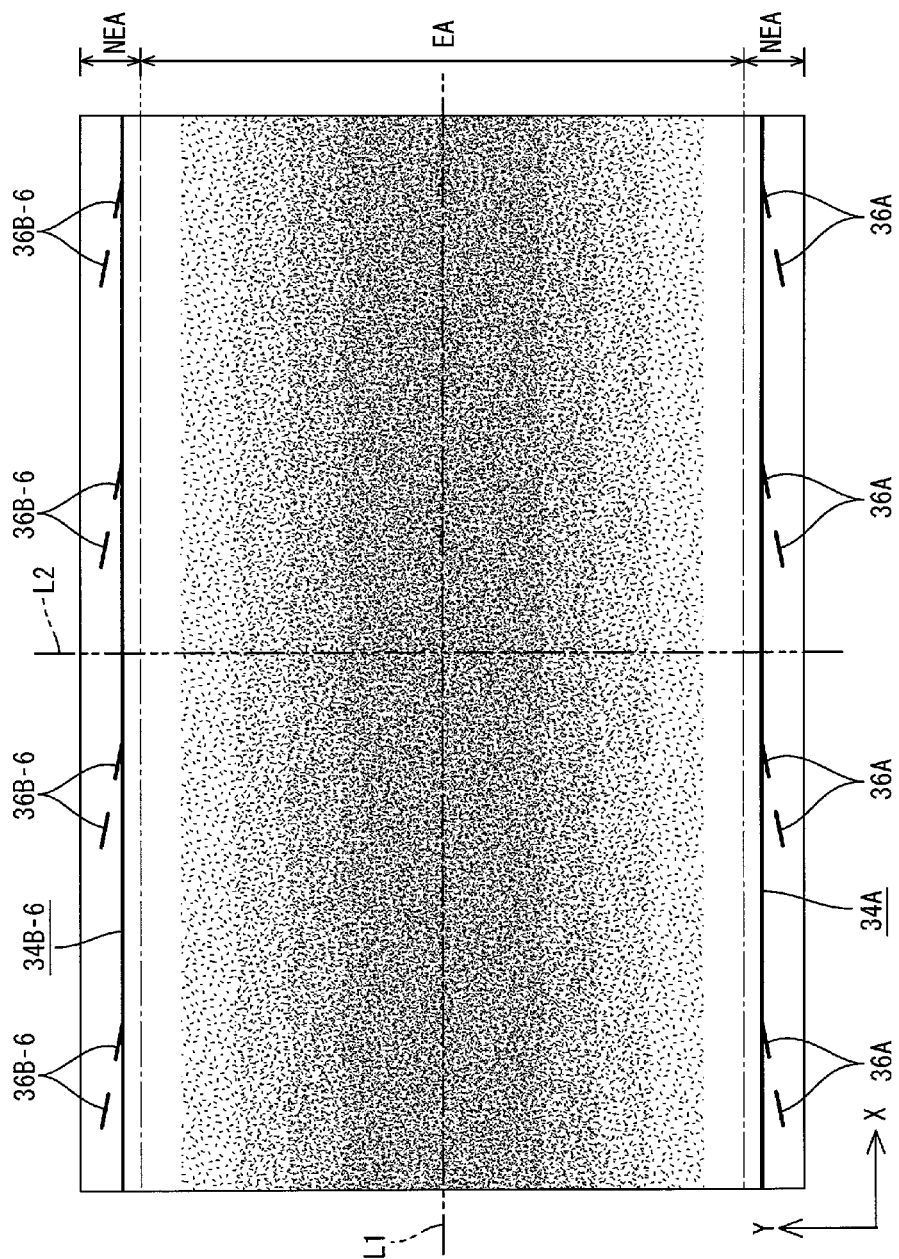
FIG. 18 is a plane view of a discrimination pattern on a diffuser plate according to a sixth modification of the first embodiment.

The branch portions 36B-6 constituting the second discrimination pattern 34B-6 have each a gradient rising leftward as shown in FIG. 18, which is opposite to the gradient (descending leftward) of the branch portions 36A of the first discrimination pattern 34A. Therefore, the first discrimination pattern 34A and the second discrimination pattern 34B-6 are line-symmetric with respect to the first line L1. In the foregoing configuration, the first discrimination pattern 34A and the second discrimination pattern 34B-6 are non-line-symmetric with respect to the second line L2, which makes it possible to discriminate the non-normal position of the diffuser plate reversed from the normal position around the second line L2.

<Second Embodiment>

A second embodiment of the present invention will be described with reference to FIG. 19. In the second embodiment, branch portions 37 of a discrimination pattern 134 are modified in form from that in the first embodiment. The same structures, operations, and advantages as those in the first embodiment are not redundantly described here.

Figure 19:
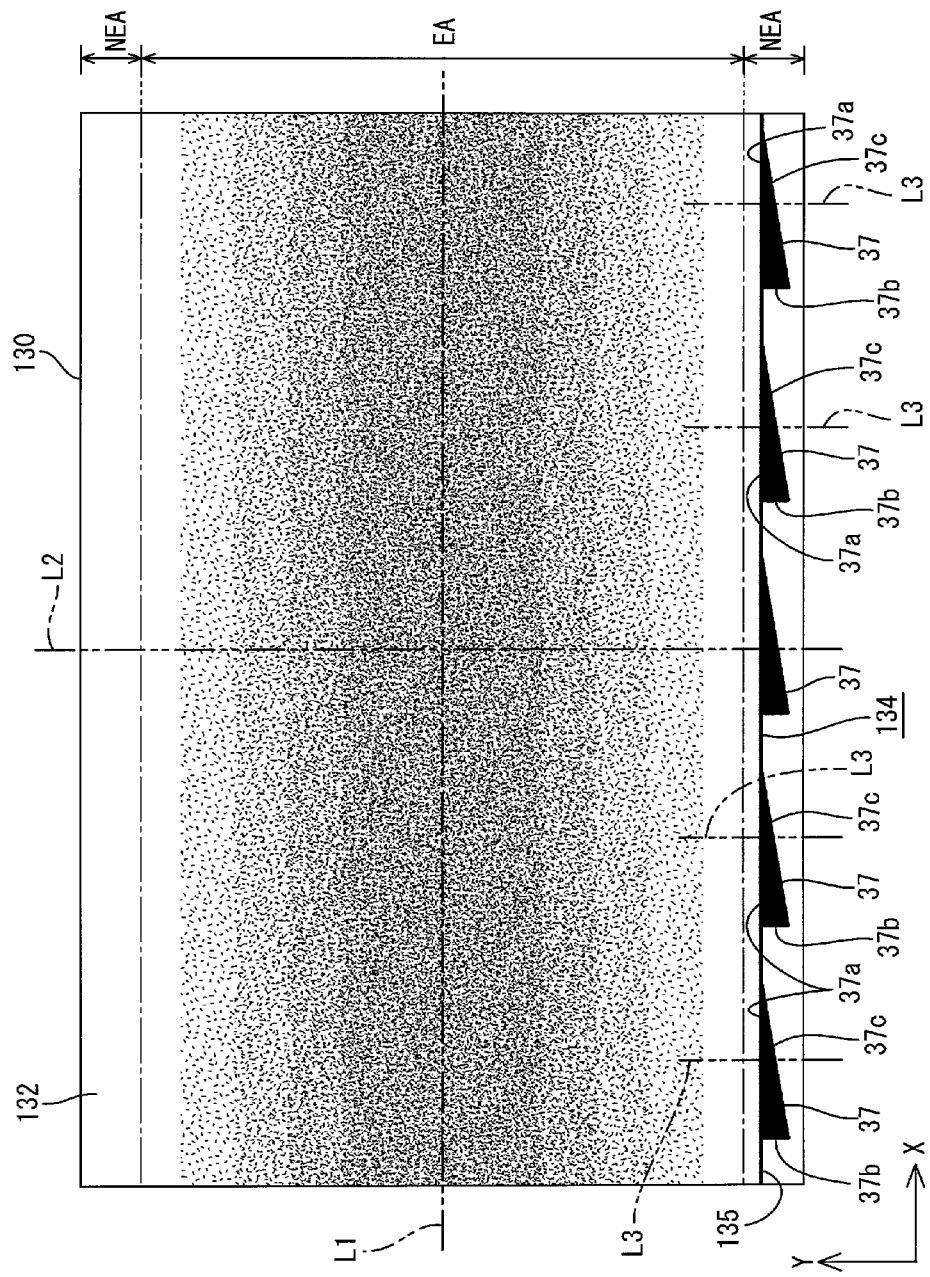
FIG. 19 is a plane view of a discrimination pattern on a diffuser plate according to a second embodiment of the present invention.

As shown in FIG. 19, the branch portions 37 each have a triangular shape protruding from a straight-line portion 135 toward an end side (one side), that is, a side opposite to the effective light-emitting region EA, and are disposed in five locations parallel to each other at regular intervals along the straight-line portion 135. Specifically, the branch portions 37 each have a right-angle triangular shape having a first side 37a along the straight-line portion 135; a second side 37b perpendicular to the straight-line portion 135; and a third side 37c angled to the straight-line portion 135. The same material as that for the optical pattern 33 is solidly applied to the entire area surrounding by the three sides 37a to 37c. The third side 37c as an inclined side in the right-angle triangular shape branch portion 37 is longer than the adjacent first side 37a and the second side 37b. In addition, if a diffuser plate 130 (substrate 132) is placed in the normal position shown in FIG. 19, the third side 37c is inclined with a gradient descending leftward in FIG. 19. In addition, the first side 37a is longer than the second side 37b. The branch portions 37 are asymmetric with respect to the third line L3 passing through a center of the branch portion 37 and perpendicular to the straight-line portion 135.

If the diffuser plate 130 (substrate 132) is placed in the non-normal position reversed from the normal position shown in FIG. 19 around the first line L1, and if the diffuser plate 130 is placed in the non-normal position reversed from the normal position around the second line L2, the third sides 37c of the branch portions 37 in the discrimination pattern 134 have a gradient descending rightward, which is opposite to that in the normal position. Accordingly, it is possible to easily discriminate the normal position of the diffuser plate 130 and the non-normal position of the diffuser plate 130 reversed from the normal position.

According to the present embodiment as described above, the branch portions 37 are each formed in a triangular shape having the first side 37a along the straight-line portion 135 and the second side 37b and the third side 37c intersecting with the straight-line portion 135, and the second side 37b and the third side 37c are different in length. Accordingly, the second side 37b and the third side 37c intersecting with the straight-line portion 135 are different in length, which makes it possible to discriminate the position of the substrate 32 by a positional relationship between the second side 37b and the third side 37c. In addition, the branch portions 37 are each formed in a right-angled triangular shape in which the second side 37b is perpendicular to the straight-line portion 135 and the third side 37c is angled to the straight-line portion 135. This makes it easier to distinguish between the second side 37b and the third side 37c, thereby further improving workability of the discrimination.

As in the foregoing, the second embodiment of the present invention is described, but the present invention is not limited to the foregoing embodiment and may include modifications as described below, for example. In each of the modifications, the same members as those in the foregoing embodiment are given the same reference codes as those in the foregoing embodiment, and illustrations and descriptions of the members are omitted here.

<First Modification of the Second Embodiment>

A first modification of the second embodiment will be described below with reference to FIG. 20. In the present modification, a pair of discrimination patterns 134-1 is formed. The present modification can be said to be formed by applying the technical matter in the third modification of the first embodiment to the configuration of the second embodiment.

Figure 20:
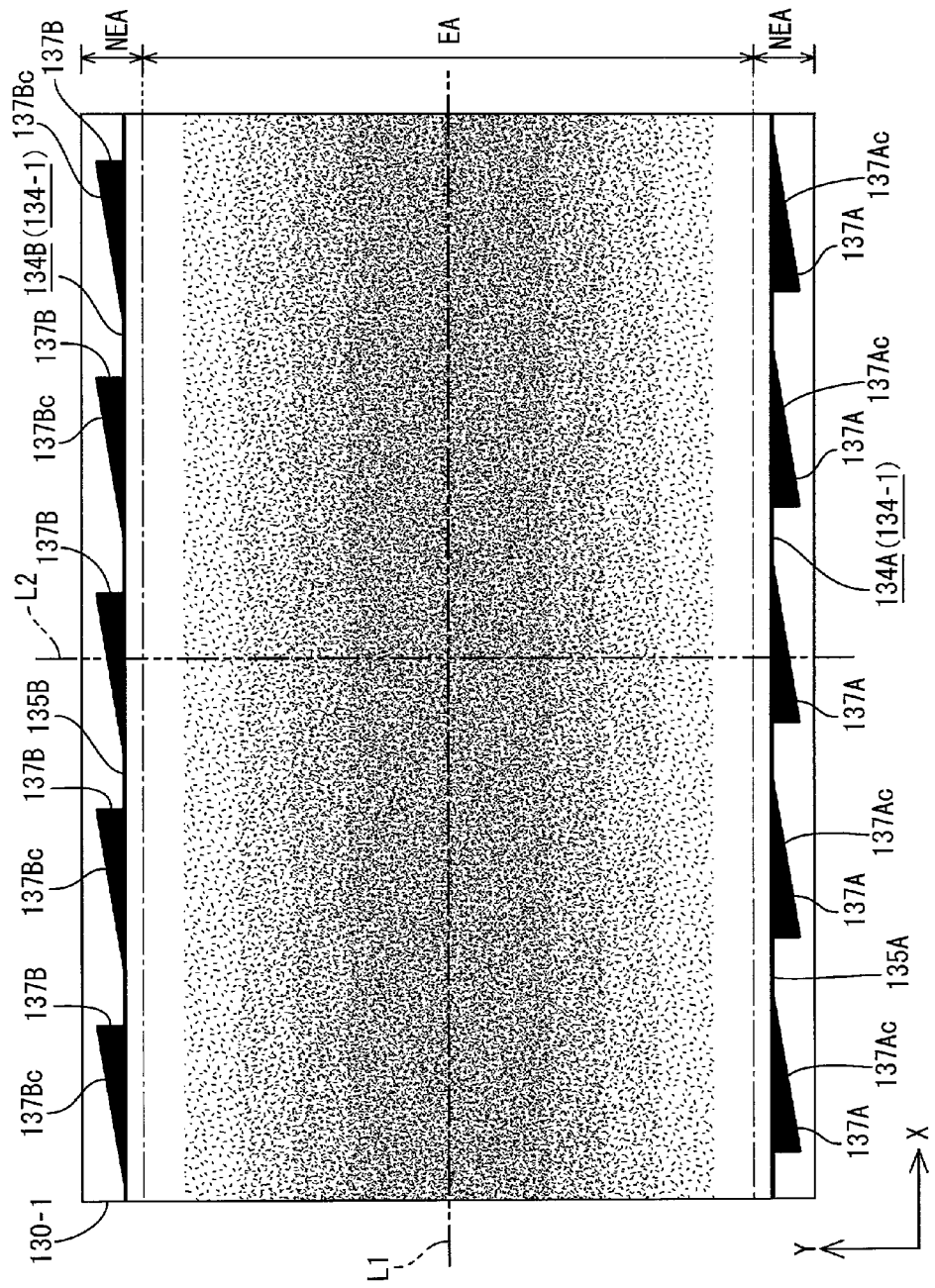
FIG. 20 is a plane view of a discrimination pattern on a diffuser plate according to a first modification of the second embodiment.

As shown in FIG. 20, the discrimination patterns 134-1 are formed at both end portions (both non-effective light-emitting region NEA) of a diffuser plate 130-1 (substrate 132-1) sandwiching the central portion (effective light-emitting region EA) along the shorter side, and are each formed by a first discrimination pattern 134A disposed at a lower end portion in FIG. 20 and a second discrimination pattern 134B disposed at an upper end portion in FIG. 20. The first discrimination pattern 134A is the same in shape as the discrimination pattern 134 described in the second embodiment, and therefore a detailed description on the same is omitted here. The second discrimination pattern 134B is formed by a straight-line portion 135B configured to pass over the entire substrate 132-1 along the longer side (X-axis direction); and five branch portions 137B protruding from the straight-line portion 135B toward end sides, that is, sides opposite to the effective light-emitting region EA, as with the first discrimination pattern 134A. The branch portions 137B of the second discrimination pattern 134B each have a third side 137Bc with a gradient descending leftward, which is the same as the gradient of the third side 137Ac in each of the branch portions 137A of the first discrimination pattern 134A. In addition, the first discrimination pattern 134A and the second discrimination pattern 134B are formed so as to be non-line-symmetric with regard to both of the first line L1 and the second line L2. Therefore, if the diffuser plate 130-1 is placed in the non-formal position reversed from the normal position shown in FIG. 20 around the first line L1, and if the diffuser plate 130-1 is placed in the non-normal position reversed from the normal position around the second line L2, the branch portions 137A and 137B in the both discrimination patterns 134A and 134B each have the third sides 137Ac and 137Bc with a gradient descending rightward, which is opposite to that in the normal position. This makes it easy to discriminate between the normal position of the diffuser plate 130-1 and the non-normal position of the diffuser plate 130-1 reversed from the normal position.

<Second Modification of the Second Embodiment>

A second modification of the second embodiment will be described with reference to FIG. 21. In the present modification, branch portions 137B-2 constituting a second discrimination pattern 134B-2 are modified in gradient from those in the first modification. The second modification can be said to be formed by applying the technical matter in the sixth modification of the first embodiment to the configuration of the second embodiment.

Figure 21:
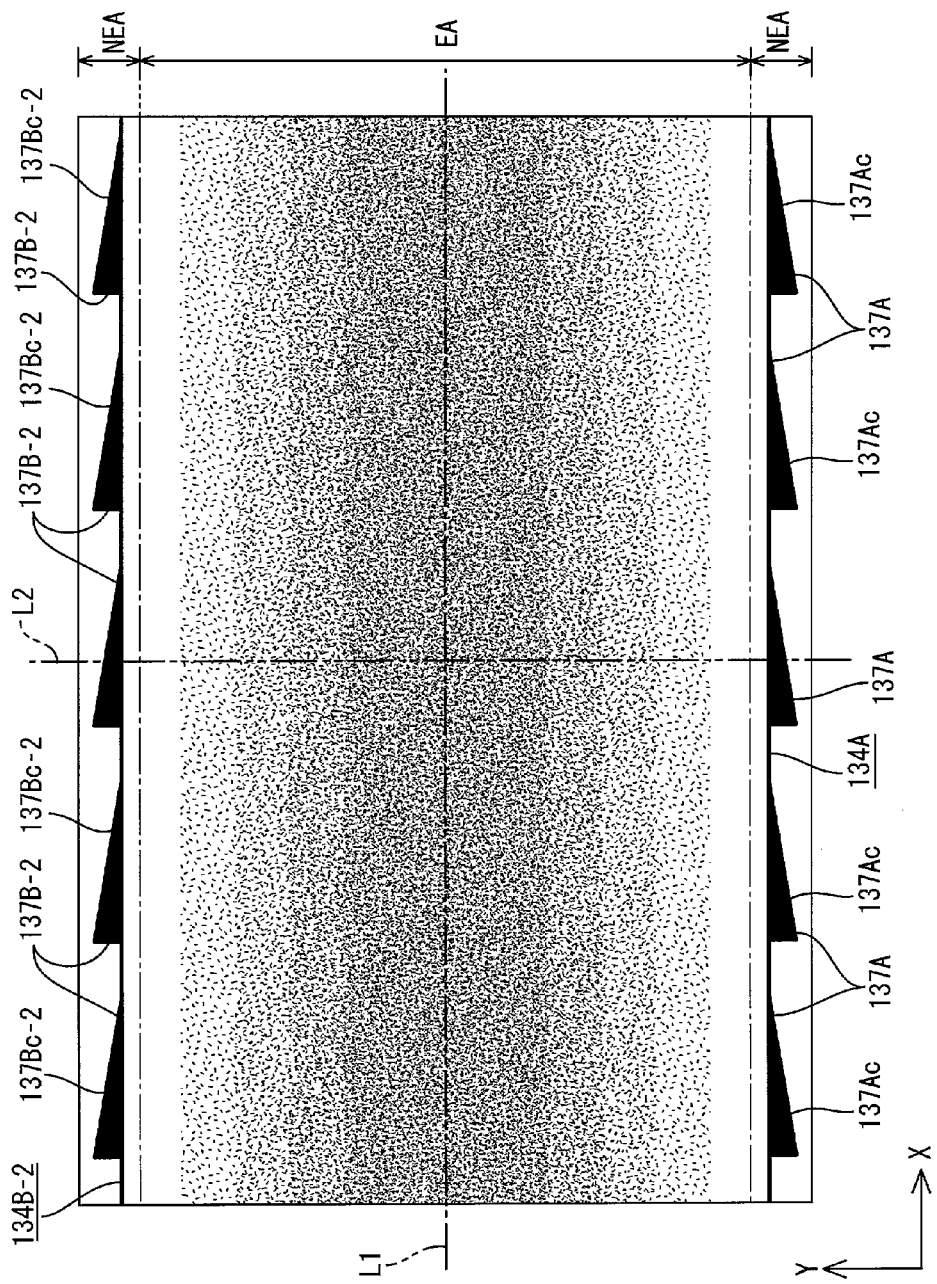
FIG. 21 is a plane view of a discrimination pattern on a diffuser plate according to a second modification of the second embodiment.

Third sides 137Bc-2 of the branch portions 137B-2 constituting the second discrimination pattern 134B-2 have each a gradient rising leftward as shown in FIG. 21, which is opposite to the gradient (descending leftward) of the third sides 137Ac of the branch portions 137A of the first discrimination pattern 134A. Therefore, the first discrimination pattern 134A and the second discrimination pattern 134B-2 are line-symmetric with respect to the first line L1. In this configuration, the first discrimination pattern 134A and the second discrimination pattern 134B-2 are non-line-symmetric with respect to the second line L2, which makes it possible to discriminate the non-normal position of the diffuser plate reversed from the normal position around the second line L2.

<Third Modification of the Second Embodiment>

A third modification of the second embodiment will be described with reference to FIG. 22. In the present modification, branch portions 37-3 are modified.

Figure 22:
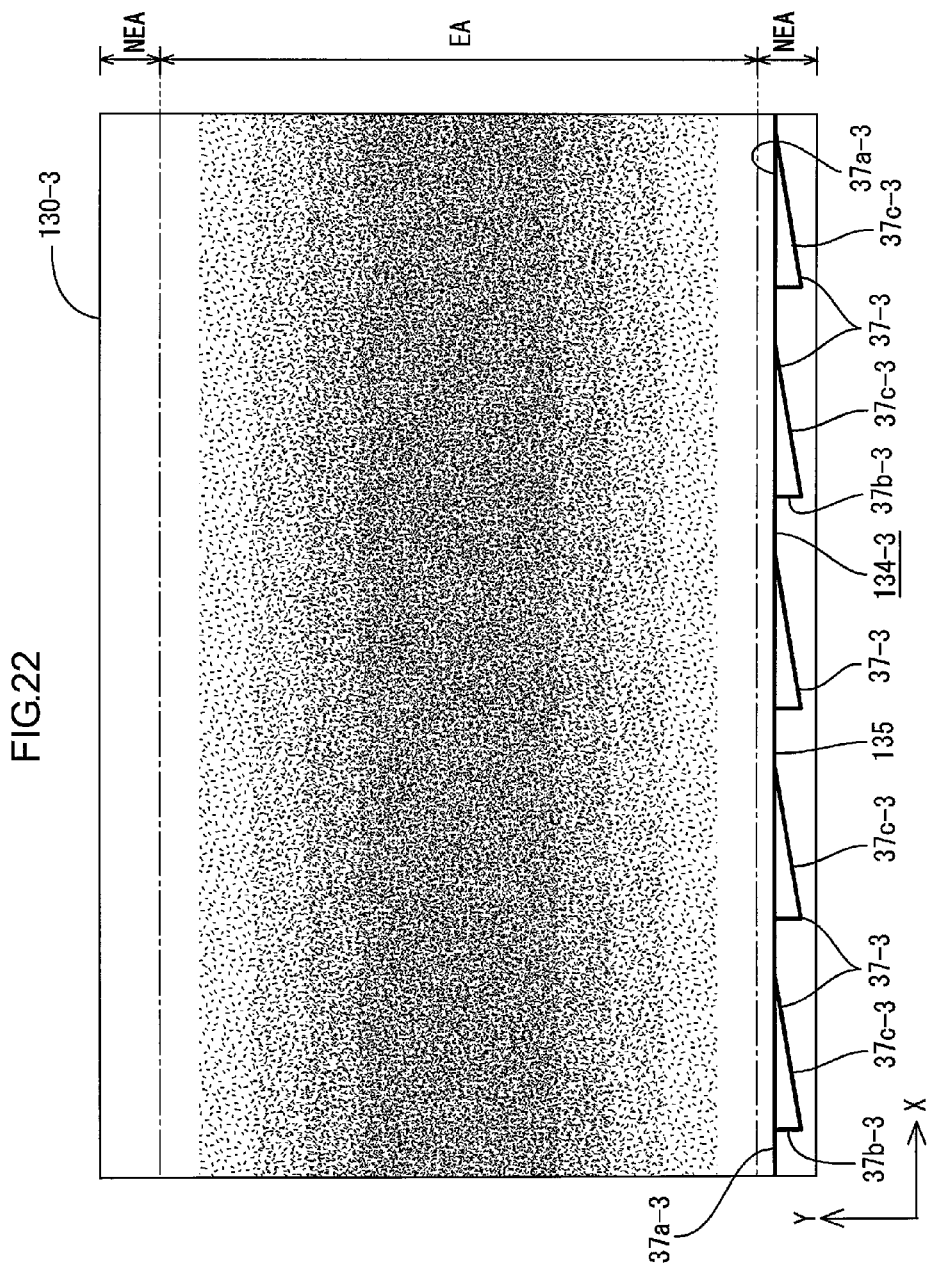
FIG. 22 is a plane view of a discrimination pattern on a diffuser plate according to a third modification of the second embodiment.

The branch portions 37-3 with a right-angle triangular shape are each formed by lines along the sides 37a-3 to 37c-3 as shown in FIG. 22. That is, the branch portions 37-3 each have a void region surrounded by the sides 37a-3 to 37c-3 where there exists no material for forming a discrimination pattern 134-3. Accordingly, it is possible to reduce a material cost for formation of the discrimination pattern 134-3, which makes it possible to reduce more preferably a manufacturing cost for a whole diffuser plate 130-3. The first sides 37a-3 are disposed so as to overlap the straight-line portion 135, and thus are formed by a part of the straight-line portion 135.

<Fourth Modification of the Second Embodiment>

Figure 23:
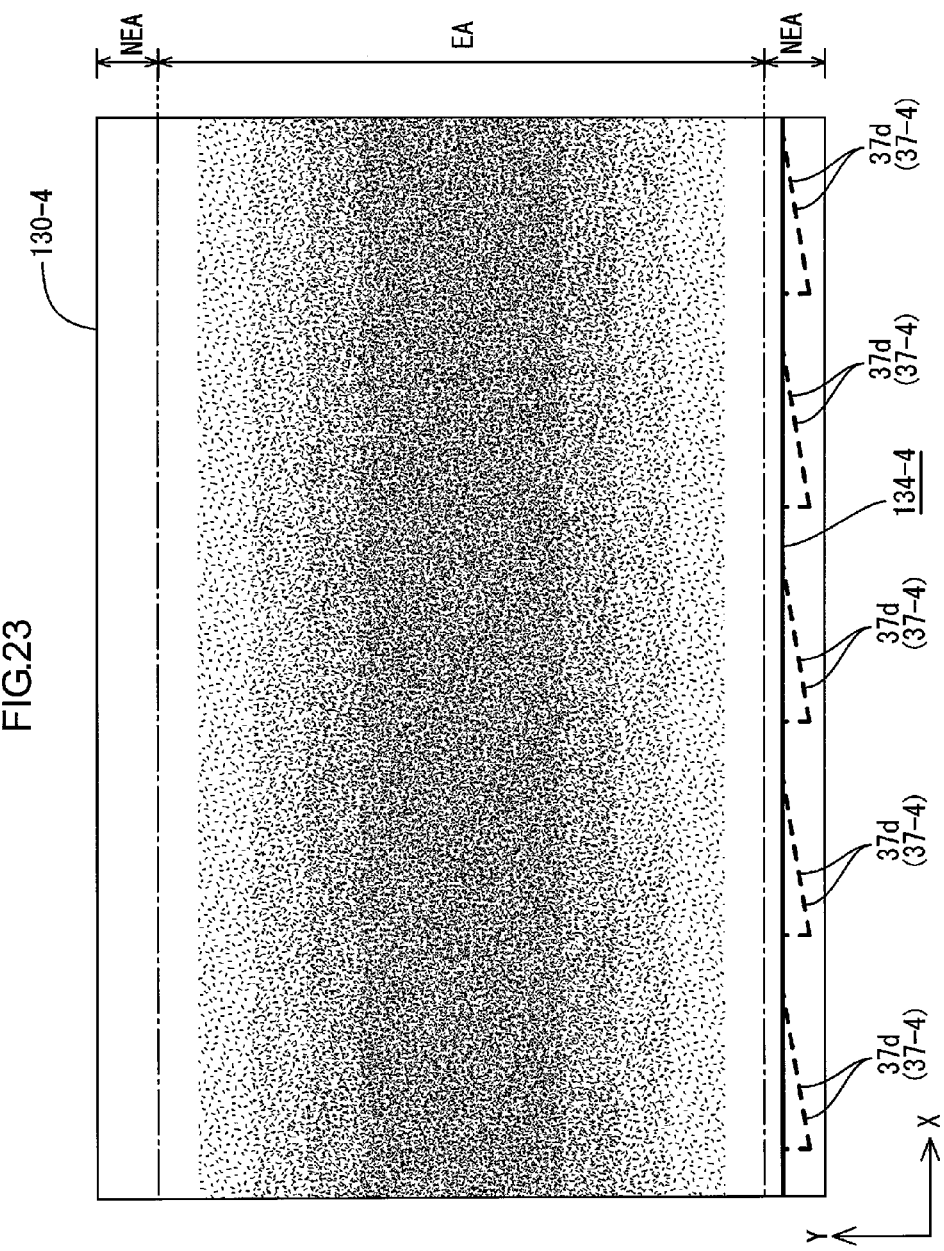
FIG. 23 is a plane view of a discrimination pattern on a diffuser plate according to a fourth modification of the second embodiment.

A fourth modification of the second embodiment will be described with reference to FIG. 23. In the present modification, branch portions 37-4 are modified from those in the third modification.

The branch portions 37-4 are formed by a plurality of intermittently disposed line segments 37d, as shown in FIG. 22. Accordingly, it is possible to further reduce a material cost for formation of a discrimination pattern 134-4, thereby reducing more preferably a manufacturing cost for a whole diffuser plate 130-4.

<Third Embodiment>

A third embodiment of the present invention will be described with reference to FIG. 24. In the third embodiment, branch portions 38 in a discrimination pattern 234 are modified in form from those in the first embodiment. The same structures, operations, and advantages as those in the first embodiment are not redundantly described here.

Figure 24:
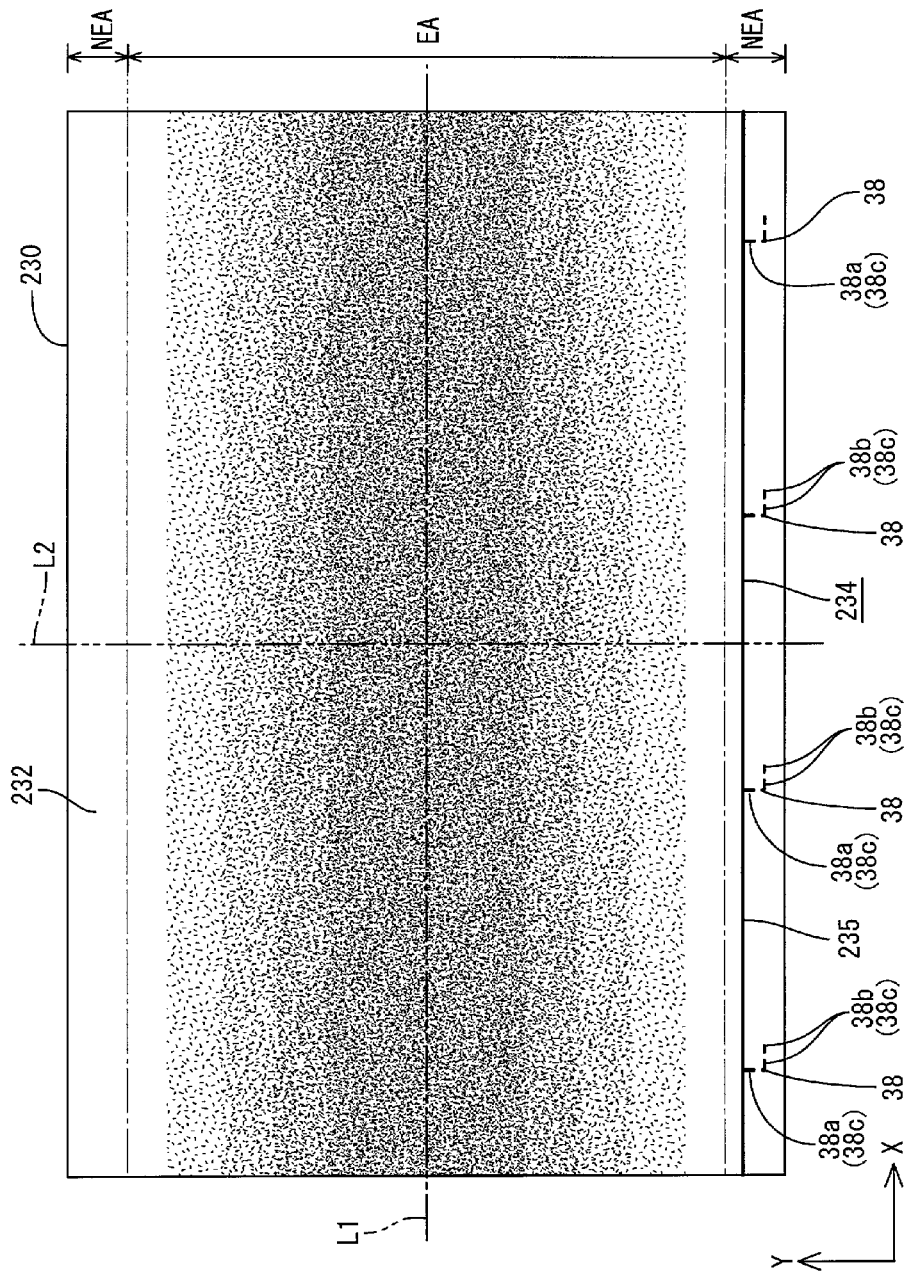
FIG. 24 is a plane view of a discrimination pattern on a diffuser plate according to a third embodiment of the present invention.

The branch portions 38 each have an L shape protruding from the straight-line portion 235 toward an end side (one side), that is, a side opposite to the effective light-emitting region EA, and are disposed at four locations parallel to each other at equal intervals along the straight-line portion 235, as shown in FIG. 24. Specifically, the branch portions 38 are each formed by a first portion 38a perpendicular to the straight-line portion 235 and a second portion 38b parallel to the straight-line portion 235. The first portions 38a are connected to the straight-line portion 235, whereas the second portions 38b are separated by length of the first portion 38a from the straight-line portion 235. The second portions 38b protrude from protruding distal portion of the first portions 38a to the right shown in FIG. 24. The branch portions 38 are each formed by a plurality of line segments 38c intermittently disposed over the entire length.

If a diffuser plate 230 (substrate 232) is placed in the non-normal position by reversing from the normal position shown in FIG. 24 around the first line L1, the discrimination pattern 234 is disposed at an upper end portion of the diffuser plate 230 shown in FIG. 24, that is, at an end portion opposite to that in the normal position. Meanwhile, if the diffuser plate 230 is placed in the non-normal position reversed from the normal position around the second line L2, the branch portions 38 of the discrimination pattern 234 each have the second portion 38b protruding from the first portion 38a to the left, that is, a side opposite to that in the normal position. This makes it easy to discriminate between the normal position of the diffuser plate 230 and the non-normal position of the diffuser plate 230 reversed from the normal position.

According to the present embodiment as described above, the branch portions 38 each have an L shape formed by the first portion 38a perpendicular to the straight-line portion 235 and the second portion 38b parallel to the straight-line portion 235. Accordingly, the discrimination pattern 234 can be recognized more easily by the L-shaped branch portion 38 formed by the first portions 38a perpendicular to the straight-line portion 235 and the second portions 38b parallel to the straight-line portion 235.

As in the foregoing, the third embodiment of the present invention is described above. However, the present invention is not limited to the foregoing embodiment, and may include modifications described below, for example. In the following modifications, the same members as those in the foregoing embodiment are given the same reference codes as those in the foregoing embodiment, and illustrations and descriptions of those members are omitted.

<First Modification of the Third Embodiment>

A first modification of the third embodiment will be described with reference to FIG. 25. In the present modification, a discrimination pattern 234-1 is modified in form. The present modification can be said to be formed by applying the technical matter of the first modification of the first embodiment to the configuration of the third embodiment.

Figure 25:
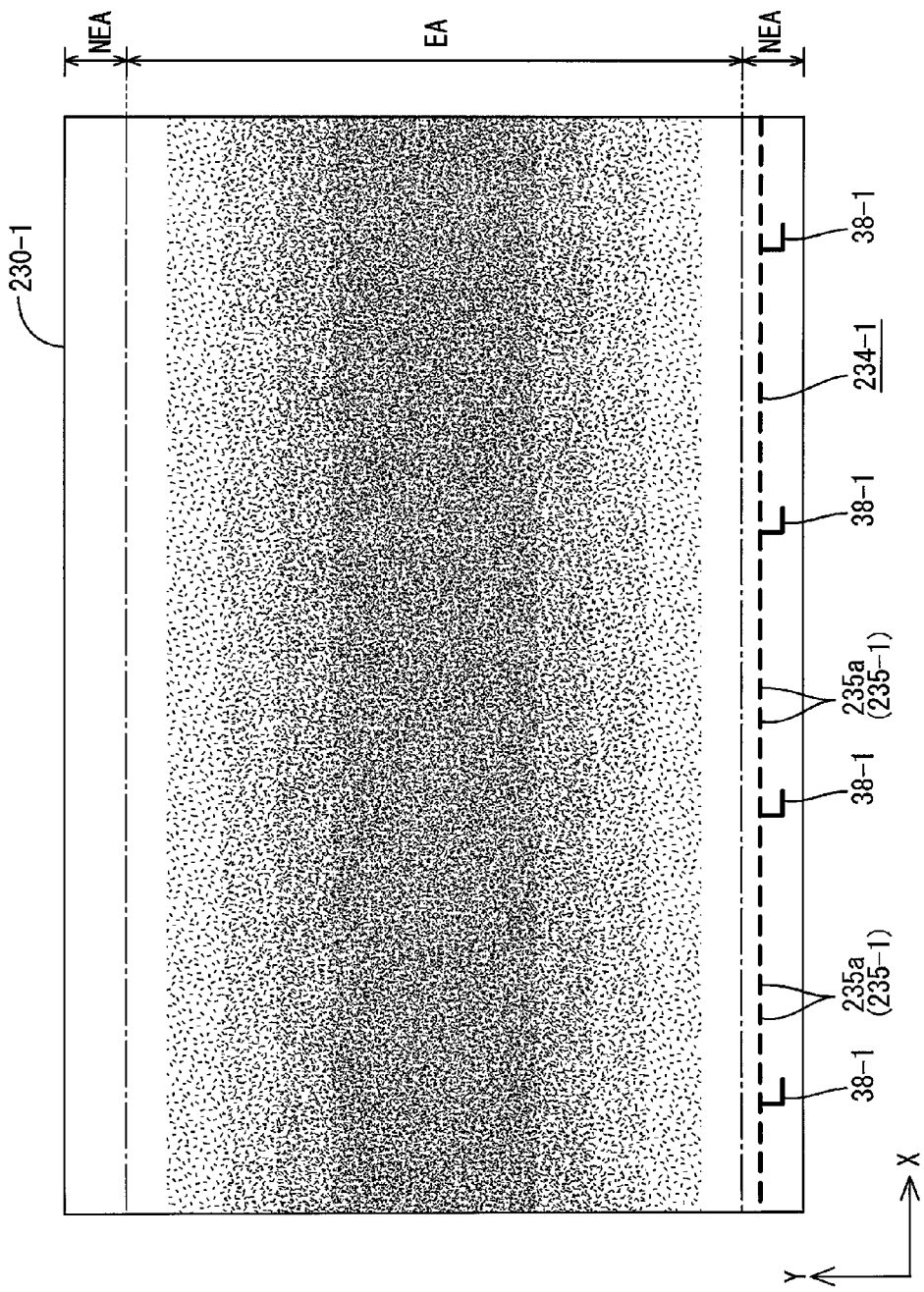
FIG. 25 is a plane view of a discrimination pattern on a diffuser plate according to a first modification of the third embodiment.

A straight-line portion 235-1 constituting the discrimination pattern 234-1 is formed by a plurality of intermittently disposed line segments 235a, as shown in FIG. 25. The line segments 235a are formed in a straight line along to the X-axis direction in which the straight-line portion 235-1 extends. Meanwhile, branch portions 38-1 continue for the entire length in a seamless manner. That is, in the present modification, the straight-line portion 235-1 and the branch portions 38-1 are reversed in form (continuous/discontinuous) from those in the third embodiment. Accordingly, it is possible to reduce material costs for formation of the straight-line portion 235-1 requiring a larger amount of material as compared to the branch portions 38-1, which is more preferred to reduction in manufacturing cost for a whole diffuser plate 230-1.

<Second Modification of the Third Embodiment>

A second modification of the third embodiment will be described with reference to FIG. 26. In the present modification, straight-line portions 235-1 of a discrimination pattern 234-2 are the same as those in the first modification of the third embodiment, and the branch portions 38 of the same are the same as those in the third embodiment. The modification can be said to be formed by applying the technical matter of the second modification of the first embodiment to the configuration of the third embodiment.

Figure 26:
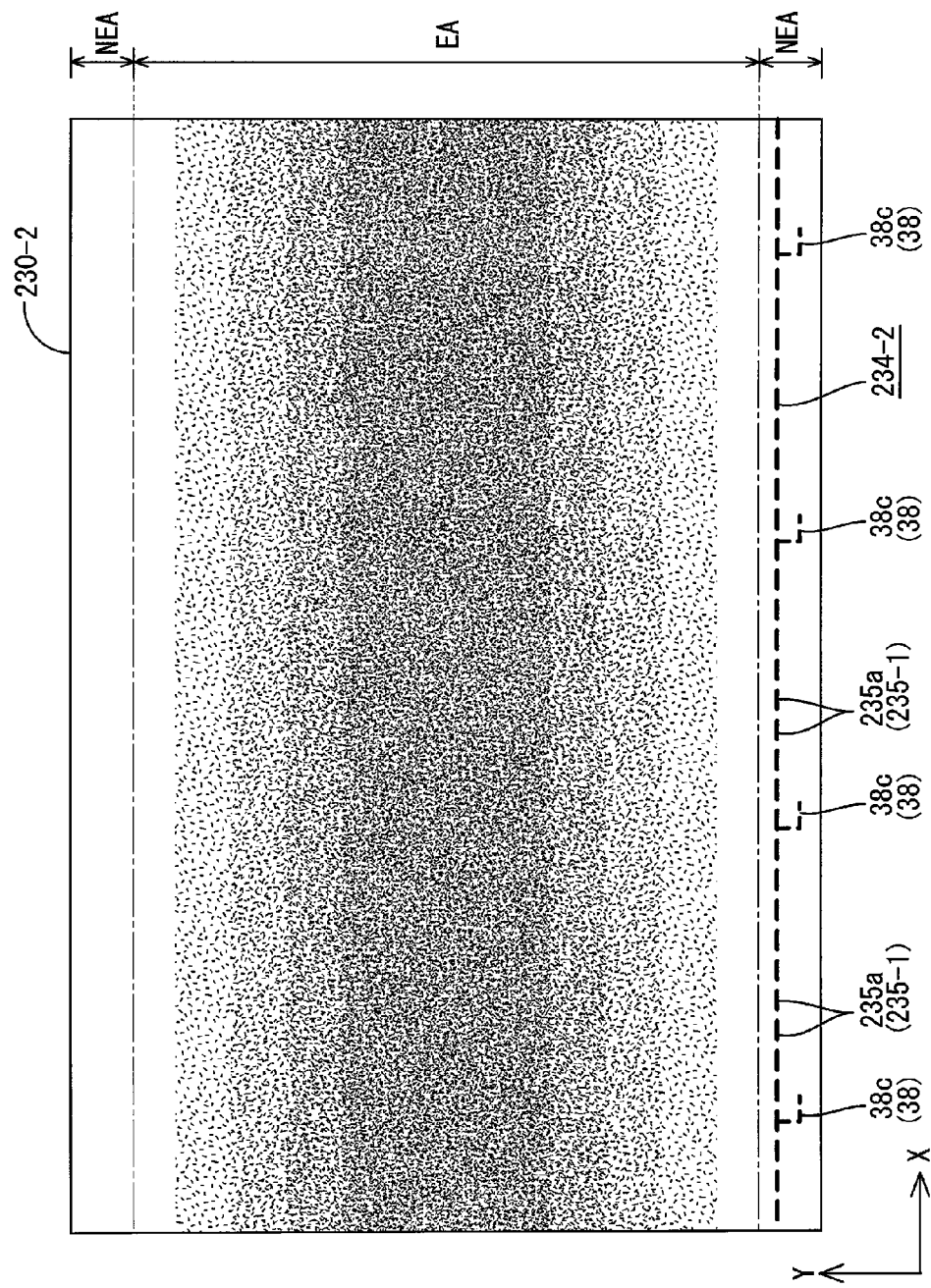
FIG. 26 is a plane view of a discrimination pattern on a diffuser plate according to a second modification of the third embodiment.

The straight-line portion 235-1 and the branch portions 38 constituting the discrimination pattern 234-2 are formed by a plurality of intermittently disposed line segments 235a and 38c as shown in FIG. 26. Accordingly, it is possible to further reduce a material cost for formation of the discrimination pattern 234-2 as compared to the case of the first modification of the third embodiment, thereby reducing more preferably a manufacturing cost for a whole diffuser plate 230-2.

<Third Modification of the Third Embodiment>

A third modification of the third embodiment will be described with reference to FIG. 27. In the present modification, a pair of discrimination patterns 234-3 similar to those in the first modification of the third embodiment is formed. The present modification can be said to be formed by applying the technical matter in the third modification of the first embodiment to the configuration of the first modification of the third embodiment.

Figure 27:
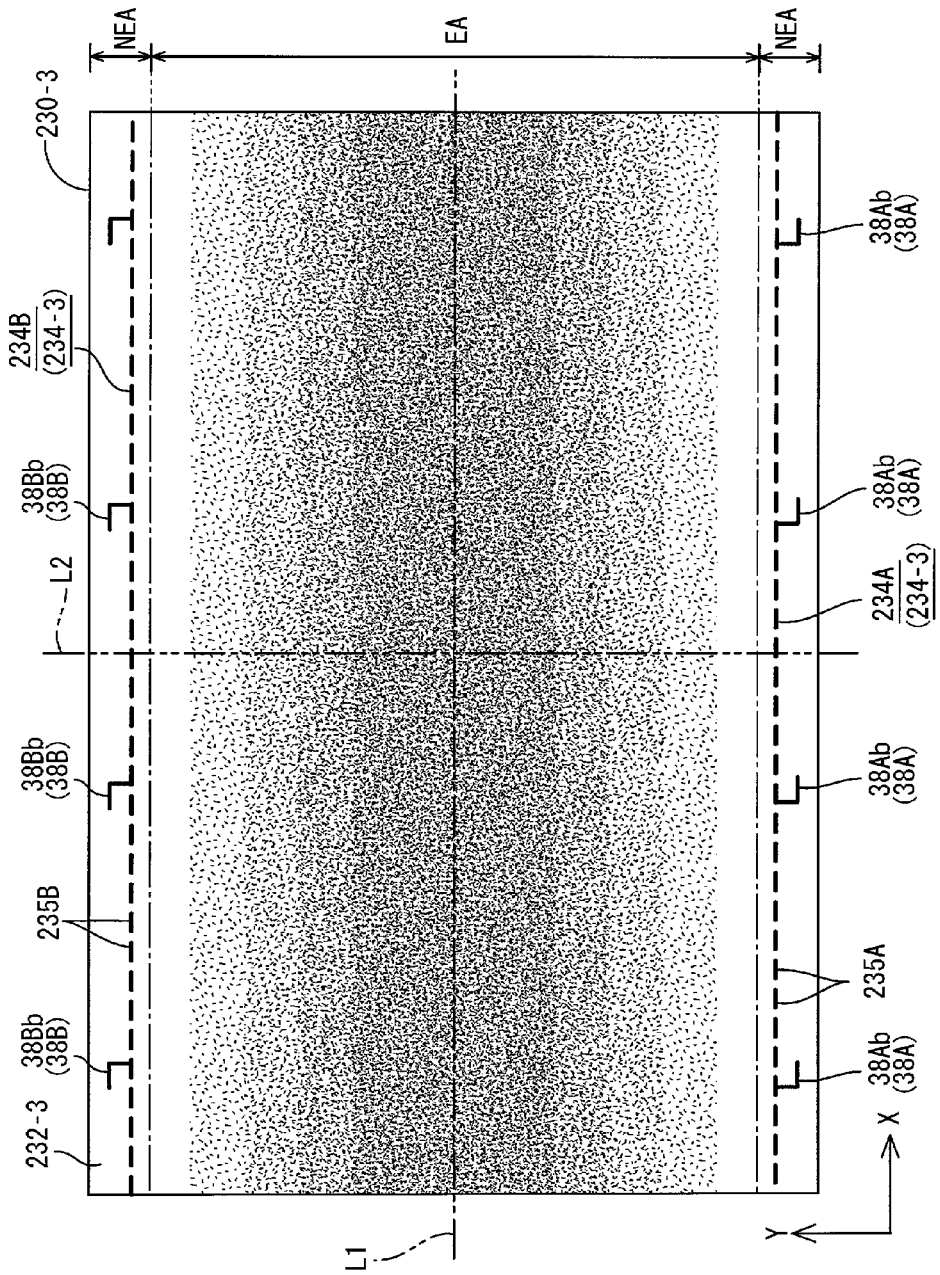
FIG. 27 is a plane view of a discrimination pattern on a diffuser plate according to a third modification of the third embodiment.

As shown in FIG. 27, the discrimination patterns 234-3 are formed at both end portions (both non-effective light-emitting regions NEA) sandwiching the central portion (effective light-emitting region EA) of a diffuser plate 230-3 (substrate 232-3) along the shorter side. The discrimination patterns 234-3 are formed by a first discrimination pattern 234A disposed at a lower end portion shown in FIG. 27 and a second discrimination pattern 234B disposed at an upper end portion shown in FIG. 27. The first discrimination pattern 234A is the same in shape as the discrimination pattern 234 in the third embodiment, and therefore detailed description on the same is omitted here. The second discrimination pattern 234B is formed by a straight-line portion 235B configured to pass over the entire substrate 232-3 along the longer side (X-axis direction); and four branch portions 38B protruding from the straight-line portion 235B toward end sides, that is, sides opposite to the effective light-emitting region EA, as with the first discrimination pattern 234A. The branch portions 38B are configured to have a second portions 38Bb protruded from a first portions 38Ba to the left shown in FIG. 27, that is, to a side opposite to the second portions 38Ab of the branch portions 38A in the first discrimination pattern 234A. In addition, the first discrimination pattern 234A and the second discrimination pattern 234B are formed so as to be non-line-symmetric with respect to both the first line L and the second line L2. Therefore, if the diffuser plate 230-3 is placed in the non-normal position reversed from the normal position shown in FIG. 27 around the first line L1, the two discrimination patterns 234A and 234B are reversed in vertical position, and thus the respective second portions 38Ab and 38Bb of the branch portions 38A and 38B protrude in directions opposite to those in the normal position. Meanwhile, if the diffuser plate 230-3 is placed in the non-normal position reversed from the normal position around the second line L2, the two discrimination patterns 234A and 234B are reversed in horizontal position, and thus the respective second portions 38Ab and 38Bb of the branch portions 38A and 38B in the discrimination patters 234A and 234B protrude in direction opposite to those in the normal position. This makes it easy to discriminate between the normal position of the diffuser plate 230-3 and the non-normal position of the diffuser plate 230-3 reversed from the normal position.

<Fourth Embodiment>

A fourth embodiment of the present invention will be described with reference to FIG. 28 or FIG. 29. In the fourth embodiment, cold cathode tubes 50 are used as a light source, and light source holding members 51 are added. The same structures, operations, and advantages as those in the first embodiment are not redundantly described here.

Figure 28:
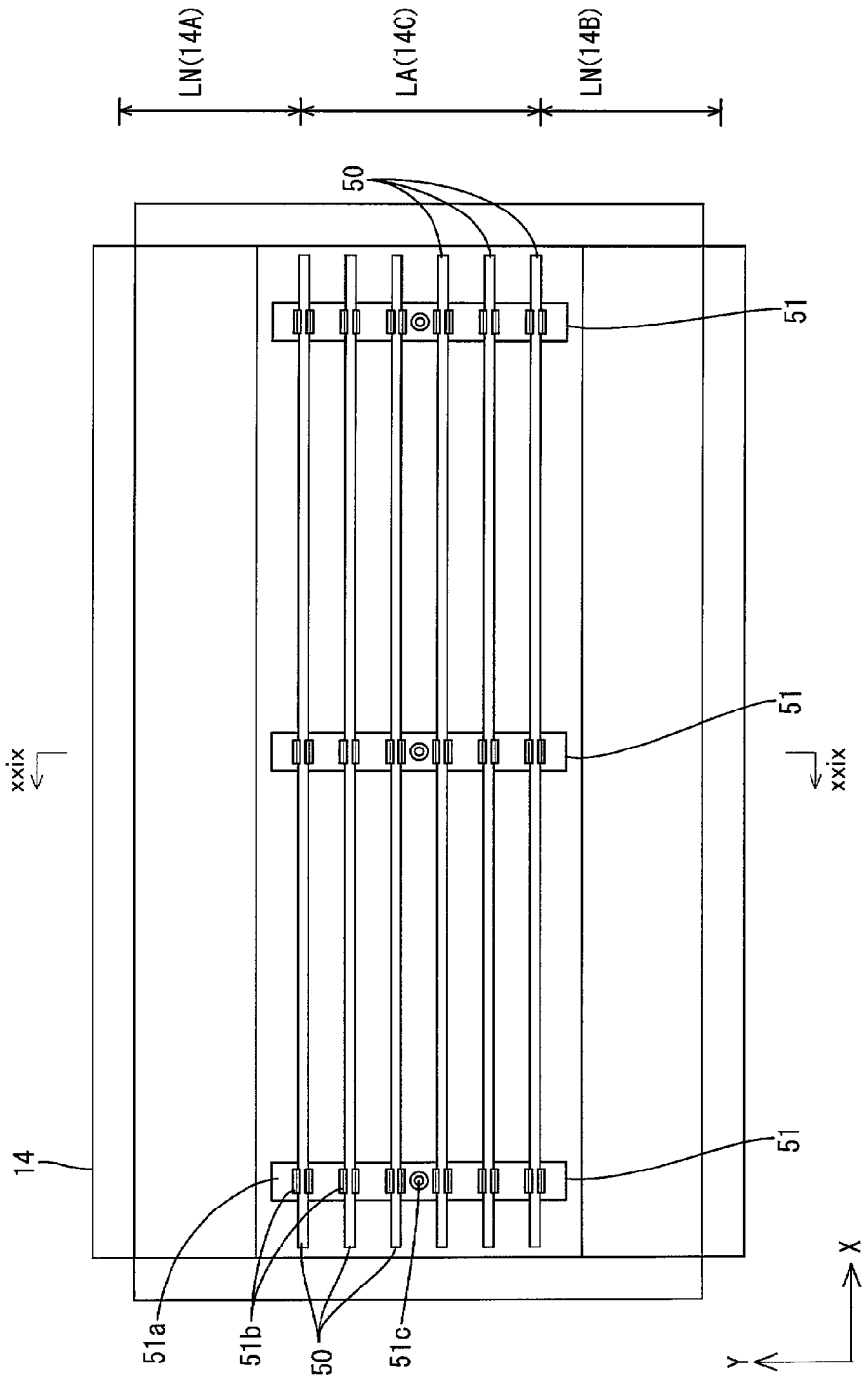
FIG. 28 is a plane view showing layout of cold cathode tubes and a light source holding member in a chassis according to a fourth embodiment of the present invention.
Figure 29:
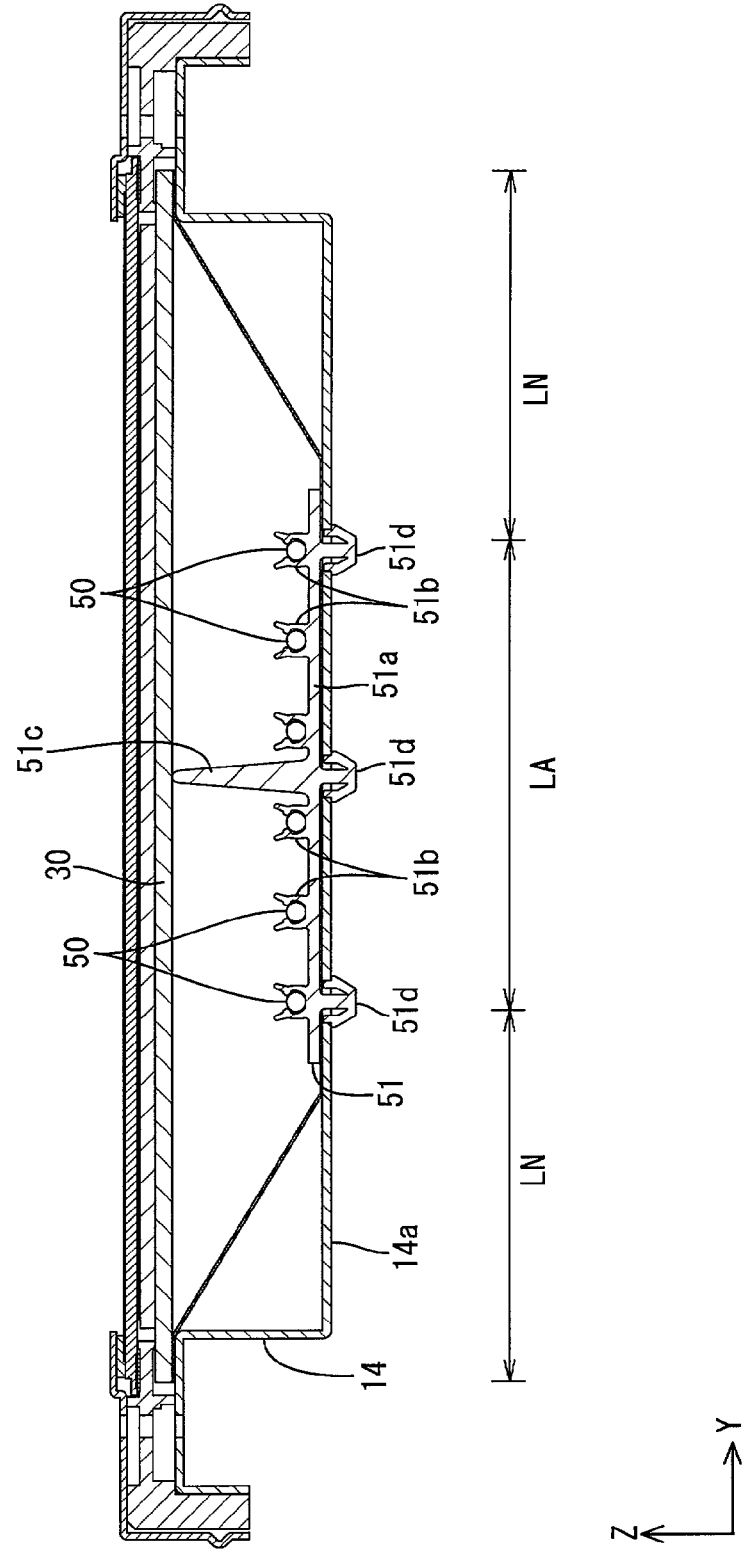
FIG. 29 is a cross section view of FIG. 28 taken along line xxix-xxix.

The cold cathode tubes 50 are long tubular (linear) as a whole, and each include a hollow long glass tube having sealed end portions and a pair of electrodes encapsulated on both end portions of the glass tube, as shown in FIGS. 28 and 29. The glass tubes each have mercury and rare gas or the like encapsulated therein and has a fluorescent material coating an inner wall surface thereof. The cold cathode tubes 50 have at both ends relay connectors (not shown) which are connected to lead terminals protruding from the electrodes to the outside of the glass tubes. The cold cathode tubes 50 are connected to an inverter board (not shown) mounted on the outer surface of the bottom plate 14a of the chassis 14 via the relay connectors, and are configured to control driving of the relay connectors. The outer diameter of the cold cathode tubes 50 is smaller than the outer diameter of the hot cathode tube 17 of the first embodiment (about 15.5 mm, for example), and is about 4 mm, for example.

The thus structured cold cathode tubes 50 are eccentrically provided and housed in the chassis 14 so as to have a length direction (axial direction) aligned to the longer side of the chassis 14 and arranged at six locations parallel to each other with predetermined space (alignment pitch) therebetween. More specifically, if the bottom plate 14a of the chassis 14 (a part facing the diffuser plate 30) is equally divided into a first end portion 14A along the shorter side; a second end portion 14B positioned facing the first end portion 14A; and a central portion 14C sandwiched between the first and second end portions, the cold cathode tubes 50 are disposed at the central portion 14C of the bottom plate 14a, thereby forming the light source placement region LA. The light source placement region LA according to the present embodiment is larger than that in the first embodiment. Meanwhile, the cold cathode tubes 50 are not disposed at the first end portion 14A and the second end portion 14B, thereby forming the light source non-placement regions LN. In addition, the light source holding members 51 holding the cold cathode tubes 50 are attached to the bottom plate 14a of the chassis 14. The light source holding members 51 are each formed by a body part 51a disposed along the bottom plate 14a; a light source holding part 51b protruding from the body part 51a to the front side and configured to hold the cold cathode tubes 50; a support part 51c protruding from the body part 51a to the front side and configured to support the diffuser plate 30 from the back side; and an attachment part 51d protruding from the body part 51a to the back side and attached to the bottom plate 14a.

<Fifth Embodiment>

A fifth embodiment of the present invention will be described with reference to FIG. 30 or 31. In the fifth embodiment, LEDs 60 are used as a light source. The same structures, operations, and advantages as those in the first embodiment are not redundantly described here.

Figure 30:
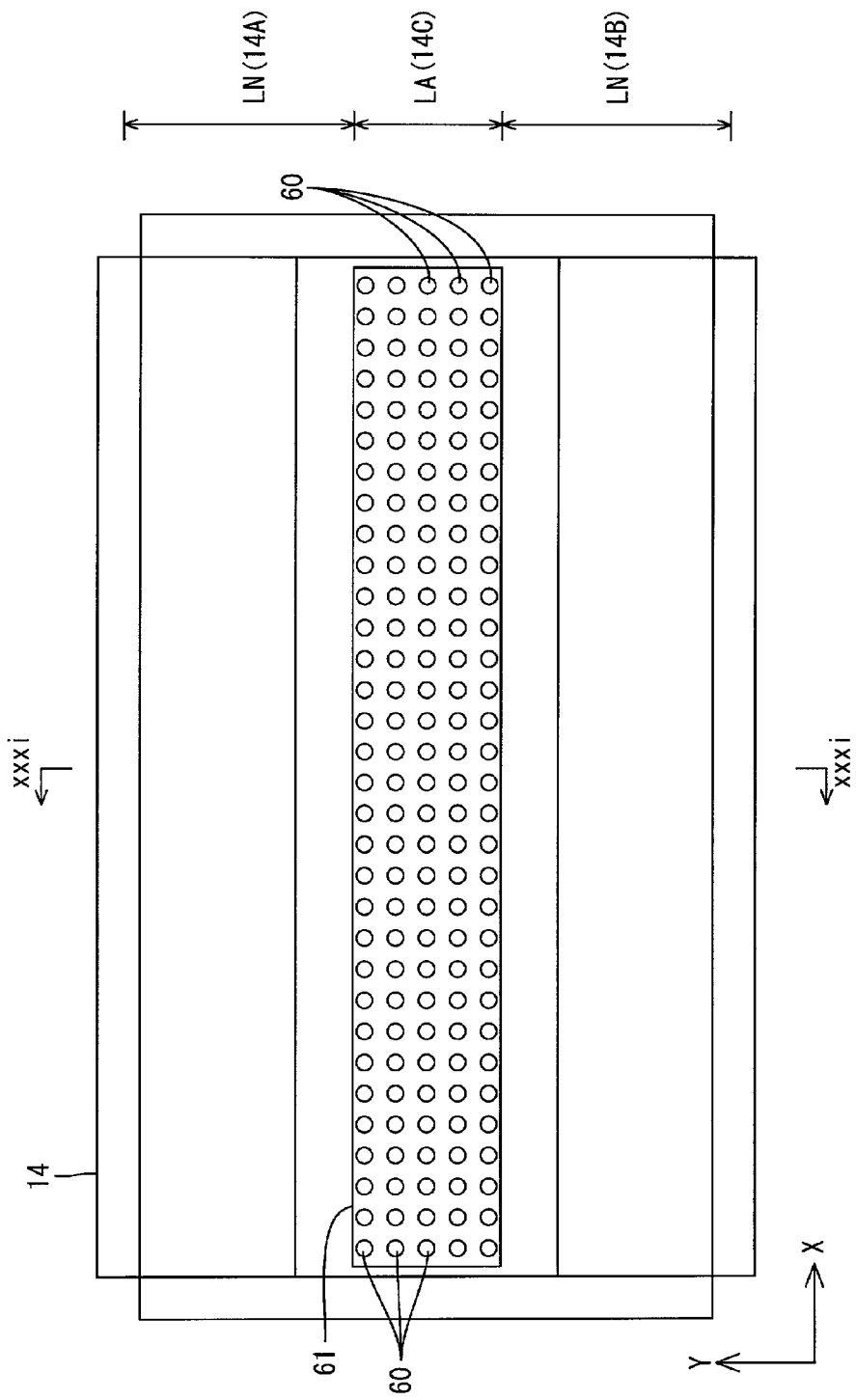
FIG. 30 is a plane view showing layout of LEDs in a chassis according to a fifth embodiment of the present invention.
Figure 31:
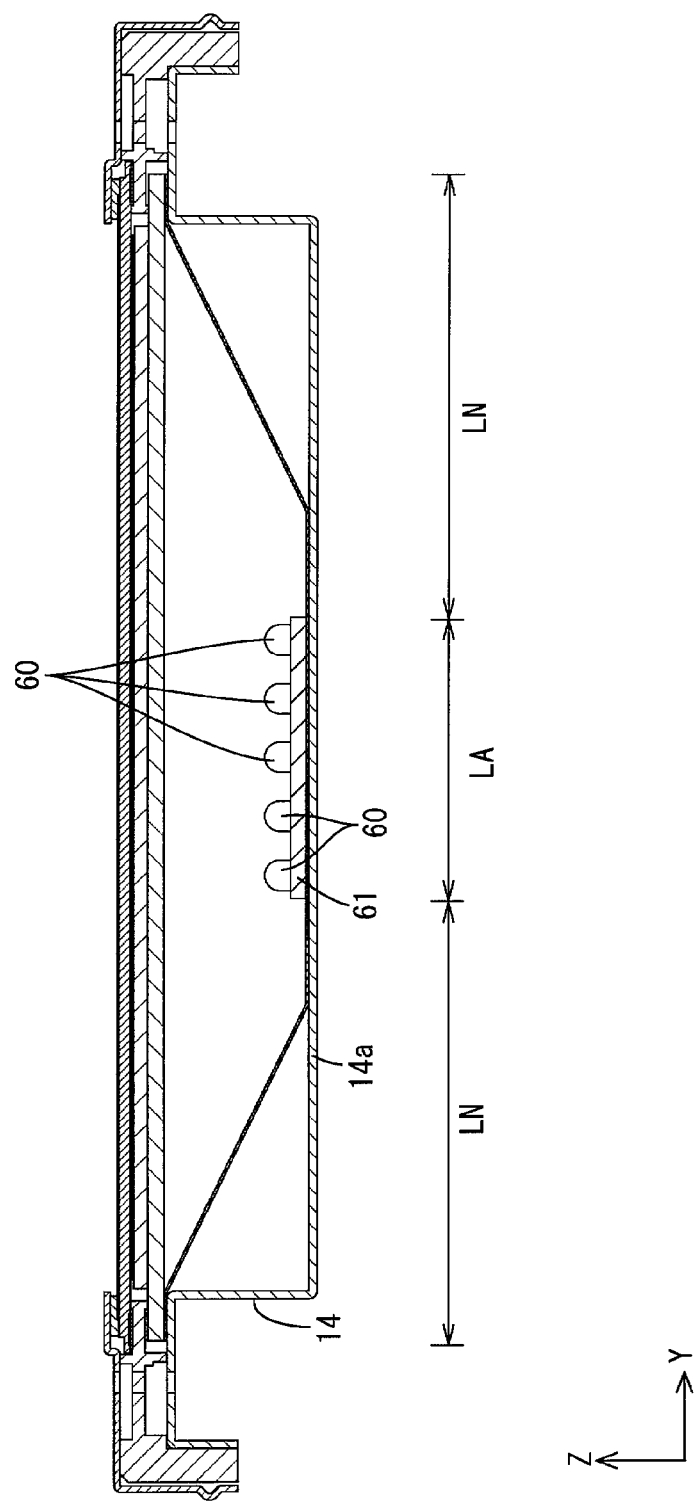
FIG. 31 is a cross section view of FIG. 30 taken along line xxxi-xxxi.

In the present embodiment, a large number of LEDs 60 as a light source are mounted on an LED board 61 stored in the chassis 14, thereby to constitute a linear light source extending along the X-axis direction as a whole, as shown in FIGS. 30 and 31. The LED board 61 is made of synthetic resin, and has a surface of a white color excellent in light reflectivity, and is fixed to the bottom plate 14a of the chassis 14 by a fixing means not shown. The LED board 61 has a horizontally long rectangular shape in a planar view, and is attached to the bottom plate 14a so as to have a longer side aligned to the longer side of the chassis 14. The shorter side dimension of the LED board 61 is smaller than the vertical dimension of the screen (the shorter side dimension of the chassis 14), and the longer side dimension of the LED board 61 is almost equal to the horizontal dimension of the screen (the longer side dimension of the chassis 14). In addition, the LED board 61 has a wiring pattern formed by a metal film on which the LEDs 60 are mounted at predetermined positions. The LED board 61 is connected to an external control board not shown from which power needed for illumination of the LEDs 60 is supplied to drive and control the LEDs 60.

The LEDs 60 are so-called surface-mounted components that are mounted on the surface of the LED board 61, and are numerously arranged parallel to each other on the front side of the LED board 61 in a grid-like pattern (in a matrix) along the X-axis direction and the Y-axis direction. The LEDs 60 are configured such that LED chips are encapsulated by means of a resin material on a board portion fixed to the LED board 61. The LED chips mounted on the board portion are classified under three types with different dominant emission wavelengths. Specifically, each of the LED chips emits single color light of R (red), G (green), or B (blue). The LEDs 60 are a top type in which the surface of the LEDs 60 opposite to the surface of the same mounted on the LED board 61 constitutes the light-emitting surface.

Assuming that the bottom plate 14a of the chassis 14 (portion facing the diffuser plate 30) is evenly divided along the shorter side into the first end portion 14A, the second end portion 14B positioned opposite to the first end portion 14A, and the central portion 14C sandwiched between the first and second end portions, the LED board 61 with the LEDs 60 numerously mounted is disposed at the central portion 14C of the bottom plate 14a, thereby to form the light source placement region LA. Meanwhile, the LED board 61 is not disposed at the first end portion 14A and the second end portion 14B of the bottom plate 14a, thereby to form the light source non-placement region LN. That is, the LEDs 60 and the LED board 61 form the light source placement region LA eccentric to the central portion of the bottom plate 14a of the chassis 14 along the shorter side.

<Other Embodiments>

The present invention is not limited to the embodiments appearing in the foregoing description and drawings, and the following embodiments are included in the technical scope of the present invention, for example.

Figure 32:
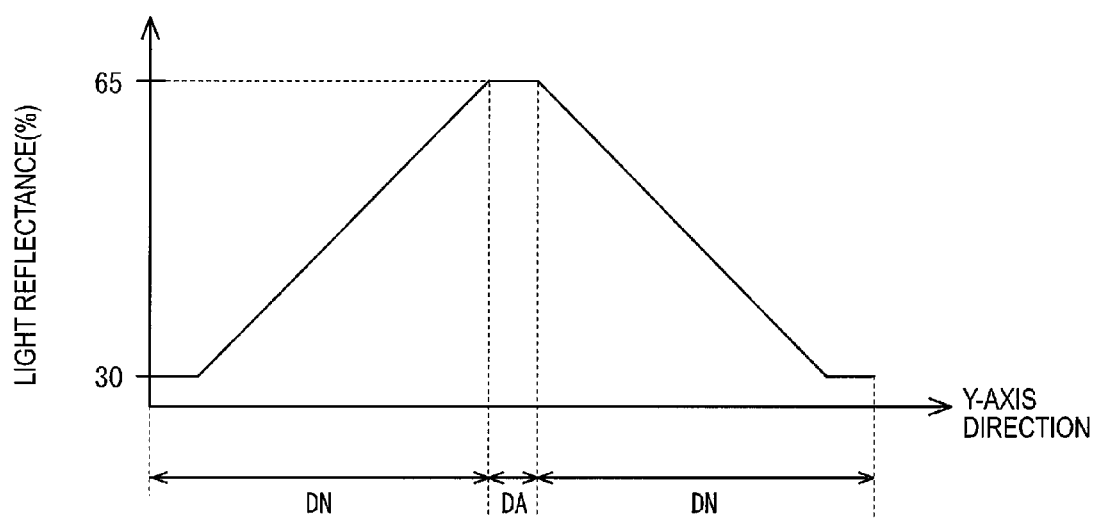
FIG. 32 is a graph showing changes in light reflectance along a shorter side of a diffuser plate according to another embodiment (1) of the present invention.

(1) Distribution of light reflectance given by the optical pattern to the diffuser plate may be a modification shown in FIG. 32. Specifically, as shown in FIG. 32, by adjusting distribution density of dots in the optical pattern, the light reflectance is set uniformly at generally 65% at the light source superimposed portion DA of the diffuser plate and becomes largest in the diffuser plate 30, whereas the light reflectance at the light source non-superimposed portion DN becomes continuously and gradually smaller (changes in a slop form) from a side near the light source superimposed portion DA toward a side distant from the light source superimposed portion DA and becomes 30% that is the smallest value at both end portions of the diffuser plate along the shorter side (Y-axis direction).

Figure 33:
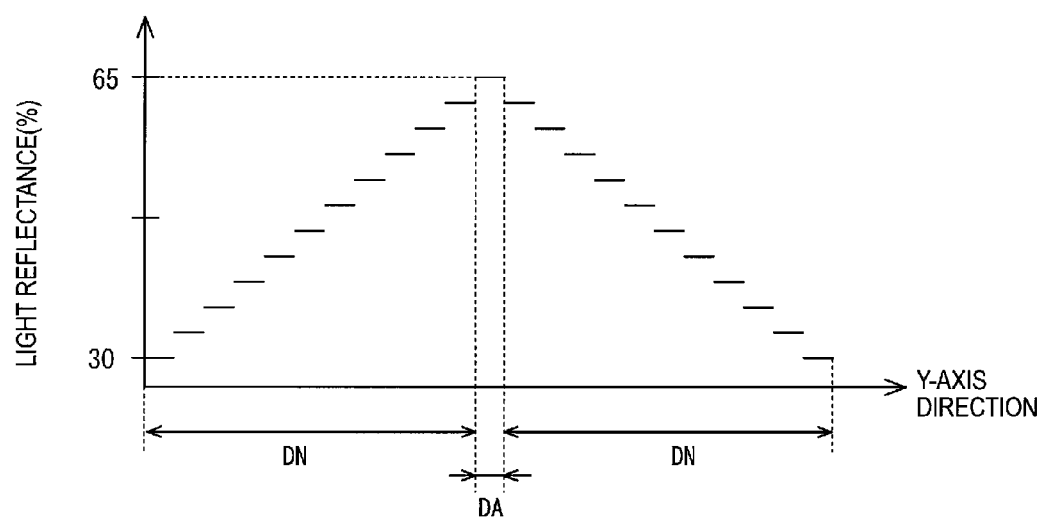
FIG. 33 is a graph showing changes in light reflectance along a shorter side of a diffuser plate according to another embodiment (2) of the present invention.

(2) Beside the foregoing distribution in (1), the aspect of distribution of light reflectance given by the optical pattern on the diffuser plate can be modified. Specifically, by adjusting the distribution density of dots in the optical pattern, the light reflectance can be made sequentially smaller in a stepwise manner from the light source superimposed portion DA to the light source non-superimposed portions DN, that is, in a stripe form along the shorter side (Y-axis direction), as shown in FIG. 33.

(3) In the foregoing embodiments, a reflection pattern and the discrimination pattern are printed directly on the substrate. Alternatively, the reflection pattern and the discrimination pattern may be printed in a transparent sheet as a member separate from the substrate, such that the sheet is attached to the substrate later.

(4) In the foregoing first embodiment, the inclined branch portions are formed in a leftward descending form in the normal position. Alternatively, for example, the branch portions may be configured to descend to the right, or the discrimination pattern may have a mixture of leftward-descending branch portions and rightward-descending branch portions. In addition, the angle of inclination of the inclined branch portions with respect to the straight-line portion may be changed as appropriate.

(5) In the foregoing first embodiment, the branch portions are angled to the straight-line portion. Alternatively, the branch portions may be configured to be perpendicular to the straight-line portion, for example.

(6) In the foregoing second embodiment, the branch portions each have a right-angle triangular shape with three sides different in length. Alternatively, the branch portions may have the shape of an isosceles right triangle, a regular triangle, a non-right triangle with three sides different in length, a non-isosceles right triangle, or the like. In addition, the branch portions may have the shape of a square, a pentagon, or the like.

(7) In the third embodiment, the branch portions have the L shape. Alternatively, the branch portions may have a J shape, V shape, U shape, or the like.

(8) As second and third modifications of the second embodiment and a further modification of the third modification of the third embodiment, the number of branch portions may be changed between a pair of discrimination patterns as in the fourth modification of the first embodiment.

(9) As second and third modifications of the second embodiment and a further modification of the third modification of the third embodiment, it is possible to set the number of branch portion to one in each of the paired discrimination patterns and dispose the branch portions at corners on the opposite side of the diffuser plate, as in the fifth modification of the first embodiment.

(10) As a further modification of the second embodiment, the straight-line portion may be formed by a plurality of intermittently disposed line segments as in the first modification of the first embodiment.

(11) As a further modification of the third modification of the foregoing second embodiment, the branch portions may be formed by a plurality of intermittently disposed line segments as in the first and third embodiments.

(12) As a further modification of the fourth modification of the foregoing second embodiment, both the straight-line portion and the branch portions may be configured by a plurality of line segments, as in the second modification of the first embodiment and the second modification of the third embodiment.

(13) In the foregoing embodiment, the discrimination pattern is disposed at one end portion or both end portions of the diffuser plate along the shorter side. However, the invention also includes an arrangement in which the discrimination pattern is disposed at one end portion or both end portions of the diffuser plate along the longer side.

(14) Besides the foregoing embodiments, the present invention also includes an arrangement in which the discrimination pattern is configured to be point-symmetric with respect to a central point of the diffuser plate.

(15) In the foregoing embodiments, the discrimination pattern is configured to be non-line-symmetric with respect to the first line and the second line or configured to be non-line-symmetric with respect to only the second line. However, the present invention includes an arrangement in which the discrimination pattern is configured to be non-line-symmetric with respect to only the first line (and is configured to be line-symmetric with respect to the second line).

(16) In the foregoing embodiments, the branch portions protrude from the straight-line portion to the end side. Alternatively, the branch portions may be configured to protrude from the straight-line portion to the central side (the effective light-emitting region side and the optical pattern side).

(17) In the foregoing embodiments, the branch portions protrude from the straight-line portion toward only one side. Alternatively, the branch portions may be configured to protrude from the straight-line portion to both sides.

(18) In the foregoing embodiments, the branch portions are asymmetric with respect to the third line passing through the center thereof. Alternatively, the branch portions may be configured to be symmetric with respect to the third line.

(19) In the foregoing embodiments, a plurality of branch portions is disposed with equal space therebetween. However, the present invention also includes an arrangement in which the branch portions are arranged with unequal pitches.

(20) In the foregoing embodiments, the straight-line portion passes over the diffuser plate along the entire length. However, the present invention also includes an arrangement in which the straight-line portion does not pass over the diffuser plate along the entire length.

(21) In the case where the straight-line portion or the branch portions are formed by a plurality of intermittent line segments, specific values of length and number of each line segment, and space between the line segments (arrangement pitches of the line segments) can be changed as appropriate.

(22) Besides in the foregoing embodiments, specific number and layout of the branch portions can be changed as appropriate.

(23) In the foregoing embodiments, the optical pattern is configured to be line-symmetric with respect to the first line and the second line. However, the present invention also includes an arrangement in which the optical pattern is configured to be non-line-symmetric with respect to the first line, an arrangement in which the optical pattern is configured to be non-line-symmetric with respect to the second line, and an arrangement in which the optical pattern is configured to be non-line-symmetric with respect to both the first line and the second line.

(24) In the foregoing embodiments, the dots constituting the optical pattern are formed in a round shape. However, the shape of the dots is not limited to this and may be any shape such as an oval shape, a polygonal shape, or the like.

(25) In the foregoing embodiments, a white-colored material is used for the optical pattern and the discrimination pattern. Alternatively, the diffuser plate may be given light reflectivity by using a silver-colored material for the optical pattern and the discrimination pattern, for example.

(26) In the foregoing embodiments, a material with excellent light reflectivity is used for the optical pattern and the discrimination pattern. Alternatively, the diffuser plate may be given light diffuseness by using a material with diffusing particles diffusing light for the optical pattern and the discrimination pattern, for example.

(27) In the foregoing embodiments, the optical pattern and the discrimination pattern are formed by printing on the surface of the substrate. However, the present invention also includes an arrangement in which the optical pattern and the discrimination pattern are formed by the use of another forming means such as metallic evaporation, for example. In this case, instead of a printer, an evaporation device may be introduced into a device for manufacturing the diffuser plate. In any case, the optical pattern and the discrimination pattern can be formed on the substrate by using the same device at the same step.

(28) In the foregoing embodiments, in the method of manufacturing the diffuser plate, the pattern forming step is first carried out to form the optical pattern and the discrimination pattern on a parent material for the substrate, and then the cutting step is carried out to cut the parent material. Alternatively, after the cutting step, the pattern forming step may be carried out to form the optical pattern and the discrimination pattern on the cut substrate.

(29) In the foregoing embodiments, the central portion of the chassis is set as light source placement region, and the first and second end portions of the same are set as light source non-placement regions. Besides, the present invention also includes an embodiment where at least one of the first and second end portions in the chassis is set as a light source placement region, and the other is set as a light source non-placement region. In this case, the first end portion and the central portion may be set as alight source placement region, or the second end portion and the central portion may be set as a light source placement region. In conjunction with the change of placement of the light sources as described above, the placement (range) of the optical pattern on the diffuser plate may also be changed. Further, in accordance with the change of placement of the optical pattern, the placement of the discrimination pattern may also be changed.

(30) In the foregoing embodiments, the light sources are eccentrically disposed in the chassis (including the light source placement region and the light source non-placement regions). Besides, the present invention is also applicable to an embodiment where the light sources are evenly disposed over the entire chassis.

(31) In the foregoing first to third embodiments, the one hot cathode tube is used as a light source. However, the number of the hot cathode tube(s) can be changed and may be two or more in the present invention. In the foregoing fourth embodiment, the six cold cathode tubes are used as a light source. However, the number of cold cathode tubes can be changed and may be five or less or seven or more in the present invention.

(32) In the foregoing first to fourth embodiments, a hot cathode tube or cold cathode tubes, which are a kind of fluorescent tube (linear light source), are used as a light source. Besides, the present invention also includes an arrangement using any other kind of fluorescent tube. In addition, the present invention also includes an arrangement using discharge tubes of kinds other than fluorescent tubes (such as mercury lamps).

(33) In the foregoing fifth embodiment, the LEDs, which are a kind of point light source, are used as a light source. Besides, the present invention also includes an arrangement using any other kind of point light source. Alternatively, a planar light source such as organic ELs may be used in the present invention.

(34) In the foregoing embodiments, one kind of light source is used. Besides, the present invention also includes an arrangement using in mixture a plurality of kinds of light sources. Specifically, hot cathode tubes and cold cathode tubes may be used in mixture, hot cathode tubes and LEDs may be used in mixture, or cold cathode tubes and LEDs may be used in mixture, or hot cathode tubes and cold cathode tubes and LEDs may be used in mixture.

(35) In the foregoing embodiments, the liquid crystal panel and the chassis are placed in portrait orientation with the shorter side aligned to the vertical direction. Besides, the present invention also includes an arrangement where the liquid crystal panel and the chassis are placed in portrait orientation with the longer side aligned to the vertical direction.

(36) In the foregoing embodiments, TFTs are used as a switching component of the liquid crystal display device. Besides, the present invention is also applicable to other liquid crystal display devices using a switching component other than TFTs (thin-film diodes (TFDs), for example). In addition, the present invention is also applicable to both liquid crystal display devices of color representation and liquid crystal display devices of black and white representation.

(37) In the foregoing embodiments, the liquid crystal display device uses the liquid crystal panel as a display panel. Besides, the present invention is also applicable to display devices using any other kind of display panel.

(38) In the foregoing embodiments, the television receiver includes a tuner. Besides, the present invention is also applicable to display devices not including a tuner.

(39) In the foregoing embodiments, the diffuser plate is exemplified as an optical member on which an optical pattern and a discrimination pattern are formed. However, the present invention also includes an arrangement in which an optical pattern and a discrimination pattern are formed on any other kind of an optical member, for example, a diffuser sheet, a lens sheet, a polarizing reflection sheet, or the like.

EXPLANATION OF SYMBOLS

10: Liquid crystal display device (Display device)
11: Liquid crystal panel (Display panel)
12: Backlight unit (Lighting device)
14: Chassis
14e: Opening
14A: First end portion
14B: Second end portion
14C: Central portion
15: Optical member
17: Hot cathode tube (Light source)
30, 130, and 230: Diffuser plate (Optical member)
30a: First plane (Formation surface)
32, 132, 232: Substrate
33: Optical pattern
33a: Dot
34, 134, and 234: Discrimination pattern
35, 135, and 235: Straight-line portion
35a: Line segment
36, 37, and 38: Branch portion
36a: Line segment
37a: First side 37b: Second side
37c: Third side
38a: First portion (Portion perpendicular to the straight-line portion)
38b: Second portion (Portion parallel to the straight-line portion)
50: Cold cathode tube (Light source)
60: LED (Light source)
AA: Display region
NAA: Non-display region
DA: Light source superimposed portion (Portion overlapping the light source placement region)
DN: Light source non-superimposed portion (Portion overlapping the light source non-placement region)
EA: Effective light-emitting region (Portion overlapping the central portion and the display region)
NEA: Non-effective light-emitting region (Portion overlapping the end portions and the non-display region)
LA: Light source placement region
LN: Light source non-placement region
L1: First line
L2: Second line
L3: Third line (Line)
TV: Television receiver

The invention claimed is:

1. An optical member, comprising:
a light-transmissive substrate;
an optical pattern formed on the substrate and applying an optical action to light; and
a discrimination pattern configured to discriminate between a first position of the substrate and a second position of the substrate reversed from the first position, formed on a surface of the substrate including the optical pattern, and made of a material the same as a material of the optical pattern; wherein
the discrimination pattern has a straight-line portion extending along a side of the substrate;
the discrimination pattern has a branch portion protruding sideways from the straight-line portion;
a plurality of the branch portions is disposed parallel to each other at equal space therebetween;
the branch portions are formed so as to be non-line-symmetric with respect to a line passing through the center of the branch portion and being perpendicular to the straight-line portion; and
the branch portions are each formed in the shape of a triangle having a first side along the straight-line portion and second and third sides intersecting with the straight-line portion, and the second and third sides being different in length.

2. The optical member according to claim 1, wherein the branch portions are each formed in the shape of a right-angled triangle in which the second side is perpendicular to the straight-line portion and the third side is angled to the straight-line portion.

3. The optical member according to claim 1, wherein the optical pattern and the discrimination pattern are made from a light-reflective material.

4. The optical member according to claim 3, wherein the optical pattern is formed by a large number of approximately point-like dots on the surface of the substrate where the optical pattern is formed.

5. The optical member according to claim 3, wherein the optical pattern and the discrimination pattern are colored in white.

6. A lighting device, comprising:
an optical member including:
a light-transmissive substrate;
an optical pattern formed on the substrate and applying an optical action to light; and
a discrimination pattern configured to discriminate between a first position of the substrate and a second position of the substrate reversed from the first position, formed on a surface of the substrate including the optical pattern, and made of a material the same as a material of the optical pattern;
a chassis having an opening on a light output side and the optical member disposed so as to cover the opening; and
a light source housed in the chassis and configured to radiate light to the optical member; wherein:
the chassis has a portion opposite to the optical member that is divided into a light source placement region wherein the light source is disposed and a light source non-placement region where the light source is not disposed;
the optical member has the optical pattern made of a light-reflective material and is formed such that a part overlapping the light source placement region is larger in light reflectance provided by the optical pattern than a part overlapping the light source non-placement region; and
the chassis has a part facing the optical member that is divided at least into a first end portion, a second end portion, and a central end portion, the second end portion being opposite to the first end portion, and the central portion being sandwiched between the first end portion and the second end portion; and
the central portion is the light source placement region, and the first end portion and the second end portion are the light source non-placement regions.

7. A display device comprising:
the lighting device according to claim 6; and
a display panel providing display by the use of light from the lighting device.

8. The display device according to claim 7, wherein:
the display panel is divided into a display region at a center displaying an image and a non-display region on end sides of the display region; and
in the optical member, the optical pattern is formed at a part overlapping the display region, whereas the discrimination pattern is formed at a part overlapping the non-display region.

9. The display device according to claim 7, wherein the display panel is a liquid crystal panel with liquid crystal encapsulated between a pair of substrates.

10. A television receiver comprising the display device according to claim 7.

* * * * *